(12) United States Patent
Nanba et al.

(10) Patent No.: US 12,466,905 B2
(45) Date of Patent: Nov. 11, 2025

(54) COMPOSITION AND METHOD FOR PRODUCING THE SAME

(71) Applicant: DAIKIN INDUSTRIES, LTD., Osaka (JP)

(72) Inventors: Yoshinori Nanba, Osaka (JP); Emi Yamamoto, Osaka (JP); Takuya Yamabe, Osaka (JP); Yohei Fujimoto, Osaka (JP); Kenji Ichikawa, Osaka (JP); Taketo Kato, Osaka (JP); Taku Yamanaka, Osaka (JP); Hirotoshi Yoshida, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 717 days.

(21) Appl. No.: 17/687,325

(22) Filed: Mar. 4, 2022

(65) Prior Publication Data

US 2022/0185917 A1 Jun. 16, 2022

Related U.S. Application Data

(63) Continuation of application No. PCT/JP2020/033762, filed on Sep. 7, 2020.

(30) Foreign Application Priority Data

Sep. 5, 2019 (JP) .................. 2019-162403
Nov. 19, 2019 (JP) .................. 2019-209164

(51) Int. Cl.
 *C08F 14/26* (2006.01)
(52) U.S. Cl.
 CPC .................... *C08F 14/26* (2013.01)
(58) Field of Classification Search
 CPC .... C08F 14/26; C08F 2/20; C08F 6/22; C08F 214/26; C08F 214/262; C08F 116/14; C08F 259/08; C08F 14/16; C08L 2205/03; C08L 27/18; C08L 51/003; C09D 127/18
 See application file for complete search history.

(56) References Cited

U.S. PATENT DOCUMENTS

| | | | | |
|---|---|---|---|---|
| 2003/0064267 A1* | 4/2003 | Hedhli | ................ | H01M 8/1081 521/38 |
| 2007/0015857 A1 | 1/2007 | Hoshikawa et al. | | |
| 2011/0021716 A1* | 1/2011 | Washino | ............. | C08F 214/265 525/359.1 |
| 2014/0200310 A1* | 7/2014 | Taira | ..................... | C08F 114/26 524/758 |
| 2015/0065624 A1 | 3/2015 | Tsuda et al. | | |
| 2017/0037195 A1 | 2/2017 | Tsuda et al. | | |
| 2020/0255551 A1 | 8/2020 | Taira et al. | | |
| 2020/0392266 A1 | 12/2020 | Nanba et al. | | |

FOREIGN PATENT DOCUMENTS

| | | | | |
|---|---|---|---|---|
| CN | 101223231 A | 7/2008 | | |
| CN | 104220517 A | 12/2014 | | |
| EP | 969055 A1 * | 1/2000 | ........... | C09D 127/18 |
| EP | 1 849 829 A1 | 10/2007 | | |
| EP | 3 760 649 A1 | 1/2021 | | |
| EP | 3 960 773 A1 | 3/2022 | | |
| JP | 11-181009 A | 7/1999 | | |
| JP | 2013-227550 A | 11/2013 | | |
| WO | 2007/007422 A1 | 1/2007 | | |
| WO | 2010/075494 A1 | 7/2010 | | |
| WO | 2012/082707 A1 | 6/2012 | | |
| WO | 2018/167190 A1 | 9/2018 | | |
| WO | WO2019168183 A1 * | 1/2019 | ................ | C08F 2/44 |
| WO | 2019/031617 A1 | 2/2019 | | |

OTHER PUBLICATIONS

Trevoort, "Melt-Processable Poly(tetrafluoroethylene)", 2000, Macromolecules, 33, 6460-6465. (Year: 2000).*
International Search Report for PCT/JP2020/033762 dated Nov. 17, 2020 [PCT/ISA/210].
Extended European Search Report dated Aug. 23, 2023 in European Application No. 20861189.7.
International Preliminary Report on Patentability (with translation of Written Opinion) dated Mar. 8, 2022, issued in International Application No. PCT/JP2020/033762.

* cited by examiner

*Primary Examiner* — Robert S Jones, Jr.
*Assistant Examiner* — Joshua Caleb Bledsoe
(74) *Attorney, Agent, or Firm* — Sughrue Mion, PLLC

(57) ABSTRACT

A composition containing a polytetrafluoroethylene, a polymer (I) containing a polymerization unit (I) based on a monomer represented by the general formula (I), a nonionic surfactant, and an aqueous medium, wherein a content of the polytetrafluoroethylene in the composition is 10% by mass or more based on the composition, and a content of the nonionic surfactant in the composition is 1.0% by mass or more based on the polytetrafluoroethylene, $$CX^1X^3=CX^2R(-CZ^1Z^2-A^0)_m \qquad (I)$$

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

13 Claims, 1 Drawing Sheet

COMPOSITION AND METHOD FOR PRODUCING THE SAME

CROSS-REERENCE TO RELATED APPLICATIONS

This application is a Rule 53(b) Continuation of International Application No. PCT/JP2020/033762 filed Sep. 7, 2020, which claims priority based on Japanese Patent Application No. 2019-162403 filed Sep. 5, 2019 and Japanese Patent Application No. 2019-209164 filed Nov. 19, 2019, the respective disclosures of which are incorporated herein by reference in their entirety.

TECHNICAL FIELD

The present disclosure relates to a composition comprising a polytetrafluoroethylene and a method for producing the same.

BACKGROUND ART

Patent Literature 1 discloses a method for producing an aqueous dispersion containing rod-shaped fine particles of polytetrafluoroethylene having an average aspect ratio of 2 or more, wherein tetrafluoroethylene is polymerized in the presence of a polymer composed of a polymerization unit represented by formula 1 or a copolymer composed of a polymerization unit represented by formula 1 and a polymerization unit represented by formula 2 (provided that the polymerization unit represented by formula 1 accounts for 40 mol % or more of all polymerization units): provided that in formula 1, $R^f$ is a perfluoroperfluoroalkylene group having 1 to 6 carbon atoms, and M is an alkali metal ion or an ammonium ion, and in formula 2, X is a fluorine atom or a chlorine atom.

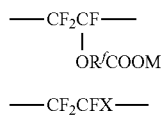

Formula 1

Formula 2

CITATION LIST

Patent Literature

Patent Literature 1: Japanese Patent Laid-Open No. 11-181009

SUMMARY

According to the present disclosure, there is provided a composition containing a polytetrafluoroethylene, a polymer (I) containing a polymerization unit (I) based on a monomer represented by the general formula (I), a nonionic surfactant, and an aqueous medium, wherein a content of the polytetrafluoroethylene in the composition is 10% by mass or more based on the composition, and a content of the nonionic surfactant in the composition is 1.0% by mass or more based on the polytetrafluoroethylene (in the present disclosure, sometimes referred to as "first composition"),

(I)

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

Effects

According to the present disclosure, it is possible to provide a novel composition comprising a polytetrafluoroethylene and a method for producing the same.

DESCRIPTION OF EMBODIMENTS

Figure 1B:
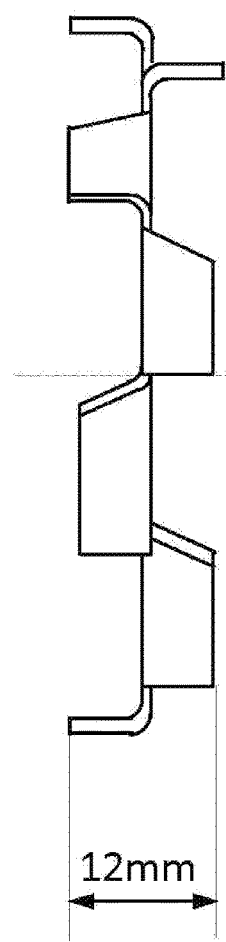
FIG. 1(b) is a left side view of the stirring blade used in the mechanical stability test.

Hereinafter, specific embodiments of the present disclosure will be described in detail, but the present disclosure is not limited to the following embodiments.

Before specifically describing the present disclosure, some terms used herein are defined or explained.

The team "organic group" as used herein means a group containing one or more carbon atoms or a group obtainable by removing one hydrogen atom from an organic compound.

Examples of the "organic group" include:
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents,
a cyano group,
a formyl group,
RaO—,
RaCO—,
RaSO$_2$—,
RaCOO—,
RaNRaCO—,
RaCONRa—,
RaOCO—,
RaOSO$_2$—, and
RaNRbSO$_2$—,
wherein each Ra is independently
an alkyl group optionally having one or more substituents,
an alkenyl group optionally having one or more substituents,
an alkynyl group optionally having one or more substituents,
a cycloalkyl group optionally having one or more substituents, a cycloalkenyl group optionally having one or more substituents, a cycloalkadienyl group optionally having one or more substituents, an aryl group optionally having one or more substituents, an aralkyl group optionally having one or more substituents, a non-aromatic heterocyclic group optionally having one or more substituents, or a heteroaryl group optionally having one or more substituents, and Rb is independently H or an alkyl group optionally having one or more substituents.

The organic group is preferably an alkyl group optionally having one or more substituents.

The team "substituent" as used herein means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxy amino group, a carbamoylamino group, a sulfamoylamino group, a halogen atom, a sulfamoylcarbamoyl group, a carbamoyl sulfamoyl group, a dialiphatic oxyphosphinyl group, and a diaromatic oxyphosphinyl group.

The aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8, preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12, preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8, preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12, preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8, preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total, preferably 1 to 4 carbon atoms in total, such as a methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, a 2-pyridinesulfonamide group, respectively.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8, preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group each may have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino groups having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

The ranges expressed by the endpoints as used herein each include all numerical values within the range (for example, the range of 1 to 10 includes 1.4, 1.9, 2.33, 5.75, 9.98, and the like).

The phrase "at least one" as used herein includes all numerical values equal to or greater than 1 (for example, at least 2, at least 4, at least 6, at least 8, at least 10, at least 25, at least 50, at least 100, and the like).

Next, the composition of the present disclosure and method for producing the same will be specifically described.

The first composition of the present disclosure contains a polytetrafluoroethylene, a polymer (I) containing a polymerization unit (I) based on a monomer represented by the general formula (I), a nonionic surfactant, and an aqueous medium. The first composition of the present disclosure has excellent precipitation stability.

The studies conducted by the present inventors have revealed that a composition containing a polytetrafluoroethylene and an aqueous medium can be stably and efficiently produced by polymerizing the tetrafluoroethylene in water using a polymer (I). It has also been found that high-molecular-weight polytetrafluoroethylene can be obtained in high yield by polymerizing the tetrafluoroethylene in an aqueous medium using the polymer (I).

The present disclosure also relates to a technique found based on these findings, and further relates to a technique for improving precipitation stability of a composition containing a polytetrafluoroethylene after being produced. Through new studies by the present inventors, it has been found that the precipitation stability of a composition containing a polytetrafluoroethylene and an aqueous medium is surprisingly improved by using the polymer (I) and a nonionic surfactant.

That is, since the first composition of the present disclosure contains the polymer (I) and the nonionic surfactant, polytetrafluoroethylene dispersed in an aqueous medium is less likely to precipitate. Therefore, even when the concentration of polytetrafluoroethylene in the composition increases, the viscosity of the composition is less likely to increase, and thus the composition of the present disclosure has excellent handleability. Further, since the composition exhibits excellent precipitation stability even when the composition contains a relatively large amount of polytetrafluoroethylene, products such as a coating film, an impregnated body, and a cast film can be produced with high efficiency by using the composition of the present disclosure, and molding defects during product production due to agglomerates of polytetrafluoroethylene or the like are less likely to occur.

In the first composition of the present disclosure, the stability retention time measured by the mechanical stability test of the composition is preferably 1.0 minutes or more. The stability retention time is, in the order of preference, 2.0 minutes or more, 5.0 minutes or more, 10.0 minutes or more, 15.0 minutes or more, 20.0 minutes or more, 30.0 minutes or more, 40.0 minutes or more, 50.0 minutes or more, or 60.0 minutes or more. Further, the stability retention time is, in the order of preference, 180.0 minutes or less and 120.0 minutes or less. When the composition of the present disclosure exhibits a stability retention time within the above range, polytetrafluoroethylene in the composition is less likely to precipitate, and the viscosity of the composition is less likely to increase. Therefore, the composition having a stability retention time within the above range is excellent in handleability, can produce a product such as a coating film, an impregnated body, or a cast film with high efficiency, and is less likely to cause molding failure during production of the product.

The second composition of the present disclosure contains a polytetrafluoroethylene, a polymer (I) containing a polymerization unit (I) based on a monomer represented by the general formula (I) and an aqueous medium, and the content of the polymer (1) is 2,000 mass ppm or less based on the composition. Since the content of the polymer (1) in the second composition of the present disclosure is small, excellent characteristics of polytetrafluoroethylene are sufficiently exhibited by using the second composition of the present disclosure.

The studies conducted by the present inventors have revealed that a composition containing a polytetrafluoroethylene and an aqueous medium can be stably and efficiently produced by polymerizing the tetrafluoroethylene in water using a polymer (I). It has also been found that high-molecular-weight polytetrafluoroethylene can be obtained in high yield by polymerizing the tetrafluoroethylene in an aqueous medium using the polymer (I).

The present disclosure also relates to a technique found based on these findings, and further relates to a technique for reducing the content of the polymer (I) in a composition containing a polytetrafluoroethylene after being produced. Through new studies of the present inventors, it has been found that the content of the polymer (I) in the composition can be surprisingly reduced by using a novel method.

That is, since the content of the polymer (I) in the second composition of the present disclosure is 2,000 mass ppm or less, when a product such as a coating film, an impregnated body, or a cast film is produced using the second composition of the present disclosure, the product can be obtained in which the polymer (I) is hardly contained and excellent characteristics of polytetrafluoroethylene sufficiently appear.

The second composition of the present disclosure preferably further contains a nonionic surfactant. By containing a nonionic surfactant, the precipitation stability of the composition can be improved. The second composition of the present disclosure preferably exhibits a stability retention time similar to that of the first composition of the present disclosure.

The second composition of the present disclosure preferably further contains an anionic hydrocarbon surfactant. By containing an anionic hydrocarbon-based surfactant, the precipitation stability of the composition can be improved.

A third composition of the present disclosure contains a polytetrafluoroethylene, a nonionic surfactant, an anionic hydrocarbon surfactant, and an aqueous medium, and is substantially free from a fluorine-containing surfactant.

There is a need for compositions that are substantially free from a fluorine-containing surfactant and have excellent precipitation stability. Although the third composition of the present disclosure is substantially free from a fluorine-containing surfactant, polytetrafluoroethylene dispersed in an aqueous medium is less likely to precipitate because the third composition contains a nonionic surfactant and an anionic hydrocarbon surfactant. Therefore, even when the concentration of polytetrafluoroethylene in the composition increases, the viscosity of the composition is less likely to increase, and thus the composition of the present disclosure has excellent handleability. Further, since the composition exhibits excellent precipitation stability even when the composition contains a relatively large amount of polytetrafluoroethylene, products such as a coating film, an impregnated body, and a cast film can be produced with high efficiency by using the composition of the present disclosure.

The third composition of the present disclosure preferably further contains a polymer (I) containing a polymerization unit (I) based on a monomer represented by the general formula (I). By containing the polymer (I), the precipitation stability of the composition can be improved. The third composition of the present disclosure preferably exhibits a stability retention time similar to that of the first composition of the present disclosure.

Hereinafter, the configurations of the first composition, the second composition, and the third composition of the present disclosure will be described in more detail.

<Polytetrafluoroethylene>

Polytetrafluoroethylene (PTFE) is usually stretchable, fibrillatable, and non-molten secondary processible. The non-molten secondary processible means a property that the melt flow rate cannot be measured at a temperature higher than the crystal melting point, that is, a property that does not easily flow even in the melting temperature region, in conformity with ASTM D 1238 and D 2116.

The PTFE may be a tetrafluoroethylene (TFE) homopolymer or a modified PTE containing a TFE unit and a modifying monomer unit.

The modifying monomer is not limited as long as it can be copolymerized with TFE, and examples thereof include fluoromonomers and non-fluoromonomers.

Examples of the non-fluoromonomer include, but not limited to, a monomer represented by the general formula:

$$CH_2=CR^{Q1}\text{-}LR^{Q2}$$

wherein $R^{Q1}$ represents a hydrogen atom or an alkyl group; L represents a single bond, —CO—O—*, —O—CO—*, or —O—; * represents the binding position with $R^{Q2}$. $R^{Q2}$ represents a hydrogen atom, an alkyl group, or a nitrile group.

Examples of the non-fluoromonomer include methyl acrylate, methyl methacrylate, ethyl acrylate, ethyl methacrylate, propyl acrylate, propyl methacrylate butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Among these, the non-fluoromonomer is preferably butyl methacrylate, vinyl acetate, or acrylic acid.

Examples of the fluoromonomer include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); fluoro(alkyl vinyl ether); (perfluoroalkyl) ethylenes; and perfluoroallyl ethers.

Further, one kind or a plurality of kinds of the modifying monomers may be used.

Examples of the fluoro(alkyl vinyl ether) include, but are not limited to, a unsaturated perfluoro compound represented by the general formula (A):

$$CF_2=CF\text{---}ORf \qquad (A)$$

wherein Rf represents a perfluoroorganic group. The "perfluoroorganic group" as used herein means an organic group in which all hydrogen atoms bonded to the carbon atoms are replaced by fluorine atoms. The perfluoroorganic group optionally has ether oxygen.

Examples of the fluoro(alkyl vinyl ether) include perfluoro(alkyl vinyl ether) (PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group.

Examples of the fluoro(alkyl vinyl ether) further include those represented by the general formula (A) in which Rf is a perfluoro(alkoxyalkyl) group having 4 to 9 carbon atoms; those in which Rf is a group represented by the following formula:

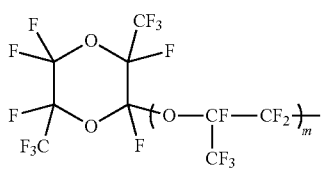

wherein m represents 0 or an integer of 1 to 4; and those in which Rf is a group represented by the following formula:

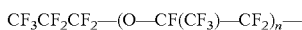

CF$_3$CF$_2$CF$_2$—(O—CF(CF$_3$)—CF$_2$)$_n$— wherein n is an integer of 1 to 4.

Examples of hydrogen-containing fluoroolefins include CH$_2$=F$_2$, CFH=CH$_2$, CFH=CF$_2$, CF$_2$=CFCF$_3$, CH$_2$=CFCF$_3$, CH$_2$=CHCF$_3$, CHF=CHCF$_3$ (E-form), and CHF=CHCF$_3$ (Z-form).

The fluoro(alkyl vinyl ether) is preferably at least one selected from the group consisting of perfluoro(methyl vinyl ether) (PMVE), perfluoro(ethyl vinyl ether) (PEVE), and perfluoro(propyl vinyl ether) (PPVE), and more preferably PMVE.

Examples of the (perfluoroalkyl)ethylene (PFAE) include, but are not limited to, (perfluorobutyl) ethylene (PFBE), (perfluorohexyl) ethylene, (perfluorooctyl) ethylene.

Examples of the perfluoroallyl ether include fluoromonomers represented by the general formula:

CF$_2$=CF—CF$_2$—ORf wherein Rf represents a perfluoroorganic group.

Rf in the above general formula is the same as Rf in the general formula (A). Rf is preferably a perfluoroalkyl group having 1 to 10 carbon atoms or a perfluoroalkoxyalkyl group having 1 to 10 carbon atoms. Perfluoroallyl ether is preferably at least one selected from the group consisting of CF$_2$=CF—CF$_2$—O—CF$_3$, CF$_2$=CF—CF$_2$—O—C$_2$F$_5$, CF$_2$=CF—CF$_2$—O—C$_3$F$_7$, and CF$_2$=CF—CF$_2$—O—C$_4$F$_9$, more preferably at least one selected from the group consisting of CF$_2$=CF—CF$_2$—O—C$_2$F$_5$, CF$_2$=CF—CF$_2$—O—C$_3$F$_7$, and CF$_2$=CF—CF$_2$—O—C$_4$F$_9$, and still more preferably CF$_2$=CF—CF$_2$—O—CF$_2$CF$_2$CF$_3$.

In the modified PTFE, the content of the modifying monomer unit is preferably in the range of 0.00001 to 1.0% by mass based on all polymerization units. The lower limit thereof is preferably 0.0001% by mass, more preferably 0.001% by mass, and still more preferably 0.005% by mass. The upper limit of the content of the modifying monomer unit is 0.90% by mass, 0.50% by mass, 0.30% by mass, 0.20% by mass, 0.15% by mass, 0.10% by mass, and 0.05% by mass in the order of preference. The team "modifying monomer unit" as used herein means a portion of the molecular structure of the modified PTFE as a part derived from the modifying monomer.

The modifying monomer is also preferably exemplified by a comonomer (3) having a monomer reactivity ratio of 0.1 to 8. The presence of the comonomer (3) makes it possible to obtain PTFE particles having a small particle size, and to thereby obtain a composition having excellent precipitation stability.

The monomer reactivity ratio in the copolymerization with TFE is a value obtained by dividing a rate constant when the propagating radical reacts with TFE when the propagating radical is less than a repeating unit based on TFE by a rate constant when the propagating radical reacts with a comonomer. The lower this value is, the more reactive the comonomer is with TFE. The monomer reactivity ratio can be calculated by copolymerizing the TFE and the comonomer, determining the compositional features in the polymer formed immediately after initiation, and calculating the reactivity ratio by Fineman-Ross equation.

The copolymerization is performed using 3,600 g of deionized degassed water, 1,000 mass ppm of ammonium perfluorooctanoate based on the water, and 100 g of paraffin wax contained in an autoclave made of stainless steel with an internal volume of 6.0 L at a pressure of 0.78 MPaG and a temperature of 70° C. A comonomer in an amount of 0.05 g, 0.1 g, 0.2 g, 0.5 g, or 1.0 g is added to the reactor, and then 0.072 g of ammonium persulfate (20 mass ppm based on the water) is added thereto. To maintain the polymerization pressure at 0.78 MPaG, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The composition in the resulting polymer is calculated by appropriate combination of NMR, FT-IR, elemental analysis, and X-ray fluorescence analysis depending on the types of the monomers.

The comonomer (3) having a monomer reactivity ratio of 0.1 to 8 is preferably at least one selected from the group consisting of comonomers represented by the formulas (3a) to (3d):

CH$_2$=CH—Rf$^1$     (3a)

wherein Rf$^1$ is a perfluoroalkyl group having 1 to 10 carbon atoms;

CF$_2$=CF—O—Rf$^2$     (3b)

wherein Rf$^2$ is a perfluoroalkyl group having 1 to 2 carbon atoms;

CF$_2$=CF—O—(CF$_2$)$_n$CF=CF$_2$     (3c)

wherein n is 1 or 2; and

(3d)

wherein X$^3$ and X$^4$ are each F, Cl, or a methoxy group; and Y is represented by the formula Y1 or Y2;

—CF=CF—     (Y1)

(Y2)

in the formula Y2, Z and Z' are each F or a fluorinated alkyl group having 1 to 3 carbon atoms.

The content of the comonomer (3) unit is preferably in the range of 0.00001 to 1.0% by mass based on all polymerization units of the modified PTE. The lower limit thereof is more preferably 0.0001% by mass, still more preferably 0.001% by mass, further preferably 0.005% by mass, and particularly preferably 0.009% by mass. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

The modifying monomer is preferably at least one selected from the group consisting of hexafluoropropylene, chlorotrifluoroethylene, vinylidene fluoride, fluoro(alkyl vinyl ether), (perfluoroalkyl)ethylene, ethylene, and modifying monomers having a functional group capable of reacting by radical polymerization and a hydrophilic group, in view of obtaining a composition having a small average primary particle size of the modified polytetrafluoroethylene, a small aspect ratio of primary particles, and excellent precipitation stability. The use of the modifying monomer allows for obtaining a composition having a smaller average primary particle size, a smaller aspect ratio of the primary particles, and excellent precipitation stability. Also, a composition having a smaller amount of uncoagulated polymer can be obtained.

It is also preferable that the modifying monomer contains a modifying monomer having a functional group capable of reacting by radical polymerization and a hydrophilic group (hereinafter, referred to as "modifying monomer (A)").

The presence of the modifying monomer (A) makes it possible to obtain PTFE particles having a small primary particle size, and to thereby obtain a composition having excellent precipitation stability. Further, the amount of the uncoagulated polymer can be reduced. Further, the aspect ratio of the primary particles can be made small.

PTFE containing a unit and a modifying monomer (A) unit can be obtained, for example, by polymerizing TFE and a modifying monomer (A) in an aqueous medium. The amount of the modifying monomer (A) used in the polymerization is preferably an amount exceeding 0.1 mass ppm of the aqueous medium, more preferably an amount exceeding 0.5 mass ppm, still more preferably an amount exceeding 1.0 mass ppm, further preferably 5 mass ppm or more, and particularly preferably 10 mass ppm or more. When the amount of the modifying monomer (A) used is too small, the average primary particle size of the obtained PTFE may not be reduced. The amount of the modifying monomer (A) used may be in the above range, but the upper limit may be, for example, 5,000 mass ppm.

Since the modifying monomer (A) is highly water-soluble, even when the composition contains an unreacted modifying monomer (A), the modifying monomer (A) can be easily removed from the composition by a method such as concentration, coagulation, or washing.

Examples of the hydrophilic group in the modifying monomer (A) include —NH$_2$, —PO$_3$M, —P(O)(OM)$_2$, —OPO$_3$M, —OP(O)(OM)$_2$, —SO$_3$M, —OSO$_3$M, and —COOM, wherein M is H, a metal atom, NR$^7_4$, imidazolium optionally having a substituent, pyridinium optionally having a substituent, or phosphonium optionally having a substituent, wherein R$^7$ is H or an organic group, and may be the same or different, and any two thereof may be bonded to each other to form a ring. Of these, the hydrophilic group is preferably —SO$_3$M or —COOM.

The alkyl group is preferable as the organic group in R$^7$.

R$^7$ is preferably H or a C$_{1-10}$ organic group, more preferably H or a C$_{1-4}$ organic group, and still more preferably H or a C$_{1-4}$ alkyl group.

Examples of the metal atom include monovalent and divalent metal atoms, alkali metals (Group 1) and alkaline earth metals (Group 2), and preferred is Na, K, or Li.

Examples of the "functional group capable of reacting by radical polymerization" in the modifying monomer (A) include a group having an ethylenically unsaturated bond such as a vinyl group and an allyl group. The group having an ethylenically unsaturated bond may be represented by the following formula:

CX$^e$X$^g$=CX$^f$R— wherein X$^e$, X$^f$ and X$^g$ are each independently F, Cl, H, CF$_3$, CF$_2$H, CFH$_2$ or CH$_3$; and R is a linking group. The linking group R include linking groups as R$^a$ which will be described later. Preferred are groups having an unsaturated bond, such as —CH=CH$_2$, —CFH$_2$, —CH=CF$_2$, —CF=CF$_2$, —CH$_2$—CH=H$_2$, —CF$_2$—CF=CH$_2$, —CF$_2$—CF=CF$_2$, —(C=O)—CH=CH$_2$, —(C=O)—CF=CH$_2$, —(C=O)—CH=CF$_2$, —(C=O)—CF=CF$_2$, —(C=O)—C(CH$_3$)=CH$_2$, —(C=O)—C(CF$_3$)=CH$_2$, —(C=O)—C(CH$_3$)=CF$_2$, —(C=O)—C(CF$_3$)=CF$_2$, —O—CH$_2$—CH=CH$_2$, —O—CF$_2$—CF=CH$_2$, —O—CH$_2$—CH=CF$_2$, and —O—CF$_2$—CF=CF$_2$.

Since the modifying monomer (A) has a functional group capable of reacting by radical polymerization, it is presumed that when used in the polymerization, it reacts with a TFE at the initial stage of the polymerization reaction and forms particles with high stability having a hydrophilic group derived from the modifying monomer (A). Therefore, it is considered that the number of particles increases when the polymerization is performed in the presence of the modifying monomer (A).

The polymerization may be performed in the presence of one or more of the modifying monomers (A).

In the polymerization, a compound having an unsaturated bond may be used as the modifying monomer (A).

The modifying monomer (A) is preferably a compound represented by the general formula (4A):

$$CX^iX^k=CX^jR^a-(CZ^1Z^2)_k-Y^3 \qquad (4A)$$

wherein X$^i$, X$^j$, and X$^k$ are each independently F, Cl, H, or CF$_3$; Y$^3$ is a hydrophilic group; R$^a$ is a linking group; Z$^1$ and Z$^2$ are each independently H, F, or CF$_3$; and k is 0 or 1.

Examples of the hydrophilic group include —NH$_2$, —PO$_3$M, —P(O)(OM)$_2$, —OPO$_3$M, —OP(O)(OM)$_2$, —SO$_3$M, —OSO$_3$M, and —COOM, wherein M is H, a metal atom, NR$^7_4$, imidazolium optionally having a substituent, pyridinium optionally having a substituent, or phosphonium optionally having a substituent, wherein R$^7$ is H or an organic group, and may be the same or different, and any two thereof may be bonded to each other to foam a ring. Of these, the hydrophilic group is preferably —SO$_3$M or —COOM. R$^7$ is preferably H or a C$_{1-10}$ organic group, more preferably H or a C$_{1-4}$ organic group, and still more preferably H or a C$_{1-4}$ alkyl group.

Examples of the metal atom include monovalent and divalent metal atoms, alkali metals (Group 1) and alkaline earth metals (Group 2), and preferred is Na, K, or Li.

The use of the modifying monomer (4A) allows for obtaining a composition having a smaller average primary particle size and excellent precipitation stability. Also, the aspect ratio of the primary particles can be made smaller.

R$^a$ is a linking group. The "linking group" as used herein refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

$R^a$ is preferably a catenary heteroatom such as oxygen, sulfur, or nitrogen, or a divalent organic group.

When $R^a$ is a divalent organic group, the hydrogen atom bonded to the carbon atom may be replaced by a halogen other than fluorine, such as chlorine, and may or may not contain a double bond. Further, $R^a$ may be linear or branched, and may be cyclic or acyclic. $R^a$ may also contain a functional group (e.g., ester, ether, ketone, amine, halide, etc.).

$R^a$ may also be a fluorine-free divalent organic group or a partially fluorinated or perfluorinated divalent organic group.

$R^a$ may be, for example, a hydrocarbon group in which a fluorine atom is not bonded to a carbon atom, a hydrocarbon group in which some of the hydrogen atoms bonded to a carbon atom are replaced by fluorine atoms, a hydrocarbon group in which all of the hydrogen atoms bonded to the carbon atoms are replaced by fluorine atoms, $-(C=O)-$, $-(C=O)-O-$, or a hydrocarbon group containing $-(C=O)-$, and these groups optionally contain an oxygen atom, optionally contain a double bond, and optionally contain a functional group.

$R^a$ is preferably $-(C=O)-$, $-(C=O)-O-$, or a hydrocarbon group having 1 to 100 carbon atoms that optionally contains an ether bond and optionally contains a carbonyl group, wherein some or all of the hydrogen atoms bonded to the carbon atoms in the hydrocarbon group may be replaced by fluorine.

$R^a$ is preferably at least one selected from $-(CH_2)_a-$, $-(CF_2)_a-$, $-O-(CF_2)_a-$, $-(CF_2)_a-O-(CF_2)_b-$, $-O(CF_2)_a-O-(CF_2)_b-$, $-(CF_2)_a-[O-(CF_2)_b]_c-$, $-O(CF_2)_a-[O-(CF_2)_b]_c-$, $-[(CF_2)_a-O]_b-[(CF_2)_c-O]_d-$, $-O[(CF_2)_a-O]_b-[(CF_2)_c-O]_d-$, $-O-[CF_2CF(CF_3)O]_a-(CF_2)_b-$, $-(C=O)-$, $-(C=O)-O-$, $-(C=O)-(CH_2)_a-$, $-(C=O)-(CF_2)_a-$, $-(C=O)-O-(CH_2)_a-$, $-(C=O)-O-(CF_2)_a-$, $-(C=O)-[(CH_2)_a-O]_b-$, $-(C=O)-[(CF_2)_a-O]_b-$, $-(C=O)-O[(CH_2)_a-O]_b-$, $-(C=O)-O[(CF_2)_a-O]_b-$, $-(C=O)-O[(CH_2)_a-O]_b-(CH_2)_c-$, $-(C=O)-O[(CF_2)_a-O]_b-(CF_2)_c-$, $-(C=O)-(CH_2)_a-O-(CH_2)_b-$, $-(C=O)-(CF_2)_a-O-(CF_2)_b-$, $-(C=O)-O-(CH_2)_a-O-(CH_2)_b-$, $-(C=O)-O-(CF_2)_a-O-(CF_2)_b-$, $-(C=O)-O-C_6H_4-$, and combinations thereof.

In the formula, a, b, c, and d are independently at least 1 or more. a, b, c and d may independently be 2 or more, 3 or more, 4 or more, 10 or more, or 20 or more. The upper limits of a, b, c, and d are 100, for example.

Specific examples suitable for $R^a$ include $-CF_2-O-$, $-CF_2-O-CF_2-$, $-CF_2-O-CH_2-$, $-CF_2-O-CH_2CF_2-$, $-CF_2-O-CF_2CF_2-$, $-CF_2-O-CF_2CH_2-$, $-CF_2-O-CF_2CF_2CH_2-$, $-CF_2-O-CF(CF_3)-$, $-CF_2-O-CF(CF_3)CF_2-$, $-CF_2-O-CF(CF_3)CF_2-O-$, $-CF_2-O-CF(CF_3)CH_2-$, $-(C=O)-$, $-(C=O)-O-$, $-(C=O)-(CH_2)-$, $-(C=O)-(CF_2)-$, $-(C=O)-O-(CH_2)-$, $-(C=O)-O-(CF_2)-$, $-(C=O)-[(CH_2)_2-O]_n-$, $-(C=O)-[(CF_2)_2-O]_2-$, $-(C=O)-O[(CH_2)_2-O]_n-$, $-(C=O)-O[(CF_2)_2-O]_n-$, $-(C=O)-O[(CH_2)_2-O]_n-(CH_2)-$, $-(C=O)-O[(CF_2)_2-O]_n-(CF_2)-$, $-(C=O)-(CH_2)_2-O-(CH_2)-$, $-(C=O)-(CF_2)_2-O-(CF_2)-$, $-(C=O)-O-(CH_2)_2-O-(CH_2)-$, $-(C=O)-O-(CF_2)_2-O-(CF_2)-$, and $-(C=O)-O-C_6H_4-$. In particular, preffered for $R^a$ among these is $-CF_2-O-$, $-CF_2-O-CF_2-$, $-CF_2-O-CF_2CF_2-$, $-CF_2-O-CF(CF_3)-$, $-CF_2-O-CF(CF_3)CF_2-$, $-CF_2-O-CF(CF_3)CF_2-O-$, $-(C=O)-$, $-(C=O)-O-$, $-(C=O)-(CH_2)-$, $-(C=O)-O-(CH_2)-$, $-(C=O)-O[(CH_2)_2-O]_n-$, $-(C=O)-O[(CH_2)_2-O]_n-(CH_2)-$, $-(C=O)-(CH_2)_2-O-(CH_2)-$, or $-(C=O)-O-C_6H_4-$.

In the formula, n is an integer of 1 to 10.

$-R^a-(CZ^1Z^2)_k-$ in the general formula (4A) is preferably $-CF_2-O-CF_2-$, $-CF_2-O-CF(CF_3)-$, $-CF_2-O-C(CF_3)_2-$, $-CF_2-O-CF_2'CF_2-$, $-CF_2-O-CF_2-CF(CF_3)-$, $-CF_2-O-CF_2C(CF_3)_2-$, $-CF_2-O-CF_2CF_2-CF_2-$, $-CF_2-O-CF_2CF_2-CF(CF_3)-$, $-CF_2-O-CF_2CF_2-C(CF_3)_2-$, $-CF_2-O-CF(CF_3)-CF_2-$, $-CF_2-O-CF(CF_3)-CF(CF_3)-$, $-CF_2-O-CF(CF_3)-C(CF_3)_2-$, $-CF_2-O-CF(CF_3)-CF(CF_3)-$, $-CF_2-O-CF(CF_3)-C(CF_3)_2-$, $-CF_2-O-CF(CF_3)CF_2-CF(CF_3)-$, $-CF_2-O-CF(CF_3)CF_2-C(CF_3)_2-$, $-CF_2-O-CF(CF_3)CF_2-O-CF_2-$, $-CF_2-O-CF(CF_3)CF_2-O-CF(CF_3)-$, $-CF_2-O-CF(CF_3)CF_2-O-C(CF_3)_2-$, $-(C=O)-$, $-(C=O)-O-$, $-(C=O)-(CH_2)-$, $-(C=O)-(CF_2)-$, $-(C=O)-O-(CH_2)-$, $-(C=O)-O-(CF_2)-$, $-(C=O)-[(CH_2)_2-O]_n-(CH_2)-$, $-(C=O)-[(CF_2)_2-O]_n-(CF_2)-$, $-(C=O)-[(CH_2)_2-O]_n-(CH_2)-(CH_2)-$, $-(C=O)-[(CF_2)_2-O]_n-(CF_2)-(CF_2)-$, $-(C=O)-O[(CH_2)_2-O]_n-(CF_2)-$, $-(C=O)-O[(CH_2)_2-O]_n-(CH_2)-(CH_2)-$, $-(C=O)-O[(CF_2)_2-O]_n-(CF_2)-$, $-(C=O)-O[(CF_2)_2-O]_n-(CF_2)-(CF_2)-$, $-(C=O)-(CH_2)_2-O-(CH_2)-(CH_2)-$, $-(C=O)-(CF_2)_2-O-(CF_2)-(CF_2)-$, $-(C=O)-O-(CH_2)_2-O-(CH_2)-(CH_2)-$, $-(C=O)-O-(CF_2)_2-O-(CF_2)-(CF_2)-$, $-(C=O)-O-(CH_2)_2-O-(CH_2)-C(CF_3)_2-$, $-(C=O)-O-(CF_2)_2-O-(CF_2)-C(CF_3)_2-$, or $-(C=O)-O-C_6H_4-C(CF_3)_2-$, and is more preferably $-CF_2-O-CF(CF_3)-$, $-CF_2-O-CF_2-CF(CF_3)-$, $-CF_2-O-CF_2CF_2-CF(CF_3)-$, $-CF_2-O-CF(CF_3)-CF(CF_3)-$, $-CF_2-O-CF(CF_3)CF_2-CF(CF_3)-$, $-CF_2-O-CF(CF_3)CF_2-O-CF(CF_3)-$, $-(C=O)-$, $-(C=O)-O-(CH_2)-$, $-(C=O)-O-(CH_2)-(CH_2)-$, $-(C=O)-O[(CH_2)_2-O]_n-(CH_2)-(CH_2)-$, $-(C=O)-O-(CH_2)_2-O-(CH_2)-C(CF_3)_2-$, or $-(C=O)-O-C_6H_4-C(CF_3)_2-$.

In the formula, n is an integer of 1 to 10.

Specific examples of the compound represented by the general formula (4A) include compounds represented by the following formulas:

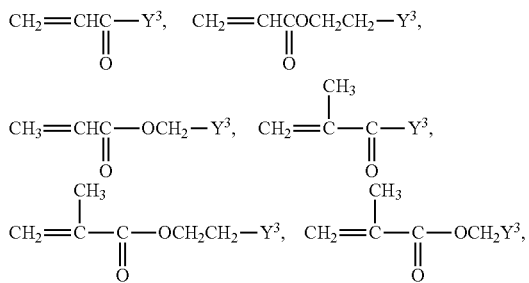

-continued

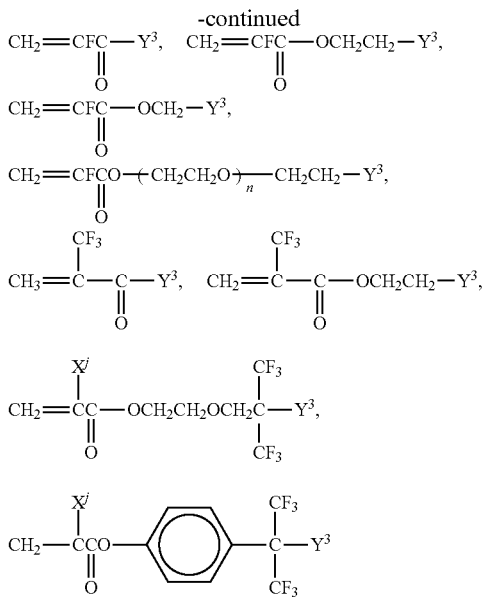

wherein $X^j$ and $Y^3$ are as described above; and n is an integer of 1 to 10.

$R^a$ is preferably a divalent group represented by the general formula (r1):

$$-(C=O)_h-(O)_i-CF_2-O-(CX^6_2)_e-\{O-CF(CF_3)\}_f-(O)_g- \quad (r1)$$

wherein $X^6$ is each independently H, F, or $CF_3$; e is an integer of 0 to 3; f is an integer of 0 to 3; g is 0 or 1; h is 0 or 1; and i is 0 or 1, and is also preferably a divalent group represented by the general formula (r2):

$$-(C=O)_h-(O)_i-CF_2-O-(CX^7_2)_e-(O)_g- \quad (r2)$$

wherein $X^7$ is each independently H, F, or $CF_3$; e is an integer of 0 to 3; g is 0 or 1; h is 0 or 1; and i is 0 or 1.

—$R^a$—$(CZ^1Z^2)_k$— in the general formula (4A) is also preferably a divalent group represented by the general formula (t1):

$$-(C=O)_h-(O)_i-CF_2-O-(CX^6_2)_e-\{O-CF(CF_3)\}_f-(O)_g-CZ^1Z_2- \quad (t1)$$

wherein $X^6$ is each independently H, F, or $CF_3$; e is an integer of 0 to 3; f is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t1).

Also, in the general formula (4A), —$R^a$—$(CZ^1Z^2)_k$— is preferably a divalent group represented by the general formula (t2):

$$-(C=O)_h-(O)_i-CF_2-O-(CX^7_2)_e-(O)_g13 \atop CZ^1Z^2- \quad (t2)$$

wherein $X^7$ is each independently H, F, or $CF_3$; e is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t2).

The compound represented by the general formula (4A) also preferably has a C—F bond and does not have a C—H bond, in the portion excluding the hydrophilic group ($Y^3$). In other words, in the general formula (4A), $X^i$, $X^j$, and $X^k$ are all F, and $R^a$ is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4A) may be partially fluorinated. In other words, the compound represented by the general formula (4A) also preferably has at least one hydrogen atom bonded to a carbon atom and at least one fluorine atom bonded to a carbon atom, in the portion excluding the hydrophilic group ($Y^3$).

The compound represented by the general formula (4A) is also preferably a compound represented by the following formula (4A-a):

$$CF_2=CF-O-Rf^0-Y^3 \quad (4A\text{-}a)$$

wherein $Y^3$ is a hydrophilic group; and $Rf^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4A) is also preferably a compound represented by the following formula (4A-b):

$$CH_2=CH-O-Rf^0-Y^3 \quad (4A\text{-}b)$$

wherein $Y^3$ is a hydrophilic group; and $Rf^0$ is a perfluorinated divalent linking group as defined in the formula (4A-a).

In a preferred embodiment, in the general formula (4A), $Y^3$ is —$OSO_3M$. Examples of the compound represented by the general formula (4A) when $Y^3$ is —$OSO_3M$ include $CF_2=CF(OCF_2CF_2CH_2OSO_3M)$, $CH_2=CH((CF_2)_4CH_2OSO_3M)$, $CF_2=CF(O(CF_2)_4CH_2OSO_3M)$, $CF_2=CF(OCF_2CF(CF_3)CH_2OSO_3M)$, $CF_2=CF(OCF_2CF(CF_3)OCF_2CF_2CH_2OSO_3M)$, $CH_2=CH((CF_2)_4CH_2OSO_3M)$, $CF_2=CF(OCF_2CF_2SO_2N(CH_3)CH_2CH_2OSO_3M)$, $CH_2=CH(CF_2CF_2CH_2OSO_3M)$, $CF_2=CF(OCF_2CF_2CF_2CF_2SO_2N(CH_3)CH_2CH_2OSO_3M)$, and $CH_2=CH(CF_2CF_2CH_2OSO_3M)$. In the formula, M is the same as above.

In a preferred embodiment, in the general formula (4A), $Y^3$ is —$SO_3M$. Examples of the polymerization unit based on the compound represented by the general formula (4A) when $Y^3$ is —$SO_3M$ include $CF_2=CF(OCF_2CF_2SO_3M)$, $CF_2=CF(O(CF_2)_4SO_3M)$, $CF_2F(OCF_2CF(CF_3)SO_3M)$, $CF_2=CF(OCF_2CF(CF_3)OCF_2CF_2SO_3M)$, $CH_2=CH(CF_2CF_2SO_3M)$, $CF_2=CF(OCF_2CF(CF_3)OCF_2CF_2CF_2SO_3M)$, $CH_2=CH((CF_2)_4SO_3M)$, $CH_2=CH(CF_2CF_2SO_3M)$, and $CH_2=CH((CF_2)_3SO_3M)$. In the formula, M is the same as above.

In a preferred embodiment, in the general formula (4A), $Y^3$ is —COOM. Examples of the compound represented by the general formula (4A) when $Y^3$ is —COOM include $CF_2=CF(OCF_2CF_2COOM)$, $CF_2=CF(OCF_2CF_2CF_2COOM)$, $CF_2=CF(O(CF_2)_5COOM)$, $CF_2=CF(OCF_2CF(CF_3)COOM)$, $CF_2=CF(OCF_2CF(CF_3)O(CF_2)_nCOOM)$ (n is greater than 1), $CH_2=CH(CF_2CF_2COOM)$, $CH_2H((CF_2)_4COOM)$, $CH_2=CH(CF_2CF_2COOM)$, $CH_2H((CF_2)_3COOM)$, $CF_2F(OCF_2CF_2SO_2NR'CH_2COOM)$, $CF_2=CF(O(CF_2)_4SO_2NR'CH_2COOM)$, $CF_2=CF(OCF_2CF(CF_3)SO_2NR'CH_2COOM)$, $CF_2=CF(OCF_2CF(CF_3)OCF_2CF_2SO_2NR'CH_2COOM)$, $CH_2=CH(CF_2CF_2SO_2NR'CH_2COOM)$, $CF_2=CF(OCF_2CF(CF_3)OCF_2CF_2CF_2SO_2NR'CH_2COOM)$, $CH_2=$ CH((CF$_2$)$_4$SO$_2$NR'CH$_2$COOM), CH$_2$=CH(CF$_2$CF$_2$SO$_2$NR'CH$_2$COOM), and CH$_2$=CH((CF$_2$)$_3$SO$_2$NR'CH$_2$COOM). In the formula, R' is an H or a C$_{1-4}$ alkyl group, and M is the same as above.

In a preferred embodiment, in the general formula (4), Y$^3$ is preferably —OPO$_3$M or —OP(O)(OM)$_2$. Examples of the compound represented by the general formula (4A) when Y$^3$ is —OPO$_3$M or —P(O)(OM)$_2$ include CF$_2$=CF(OCF$_2$CF$_2$CH$_2$OP(O)(OM)$_2$), CF$_2$=CF(O(CF$_2$)$_4$CH$_2$OP(O)(OM)$_2$), CF$_2$=CF(OCF$_2$CF(CF$_3$)CH$_2$OP(O)(OM)$_2$), CF$_2$=CF(OCF$_2$CF(CF$_3$)OCF$_2$CF$_2$CH$_2$OP(O)(OM)$_2$), CF$_2$=CF(OCF$_2$CF$_2$SO$_2$N(CH$_3$)CH$_2$CH$_2$OP(O)(OM)$_2$), CF$_2$=CF(OCF$_2$CF$_2$CF$_2$CF$_2$SO$_2$N(CH$_3$)CH$_2$CH$_2$OP(O)(OM)$_2$), CH$_2$=CH(CF$_2$CF$_2$CH$_2$OP(O)(OM)$_2$), CH$_2$=CH((CF$_2$)$_4$CH$_2$OP(O)(OM)$_2$), CH$_2$=CH(CF$_2$CF$_2$CH$_2$OP(O)(OM)$_2$), and CH$_2$=CH((CF$_2$)$_3$CH$_2$OP(O)(OM)$_2$). In the formula, M is the same as above.

In a preferred embodiment, in the general formula (4A), Y$^3$ is preferably —PO$_3$M or —P(O)(OM)$_2$. Examples of the compound represented by the general formula (4) when Y$^3$ is —PO$_3$M or —OP(O)(OM)$_2$ include CF$_2$=CF(OCF$_2$CF$_2$P(O)(OM)$_2$), CF$_2$=CF(O(CF$_2$)$_4$P(O)(OM)$_2$), CF$_2$=CF(OCF$_2$CF(CF$_3$)P(O)(OM)$_2$), CF$_2$=CF(OCF$_2$CF(CF$_3$)OCF$_2$CF$_2$P(O)(OM)$_2$), CH$_2$=CH(CF$_2$CF$_2$P(O)(OM)$_2$), CH$_2$CH((CF$_2$)$_4$P(O)(OM)$_2$), CH$_2$=CH(CF$_2$CF$_2$P(O)(OM)$_2$), and CH$_2$=CH((CF$_2$)$_3$P(O)(OM)$_2$), wherein M is the same as above.

The compound represented by the general formula (4A) is preferably at least one selected from the group consisting of:

a compound represented by the general formula (5A):

$$CX_2=CY(-CZ_2-O-Rf-Y^3) \quad (5A)$$

wherein X is the same or different and is —H or —F; Y is —H, —F, an alkyl group, or a fluorine-containing alkyl group; Z is the same or different and —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and Y$^3$ is as described above;

a compound represented by the general formula (6A):

$$CX_2=CY(-O-Rf-Y^3) \quad (6A)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and Y$^3$ is as described above; and a compound represented by the general formula (7A):

$$CX_2=CY(-Rf-Y^3) \quad (7A)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and Y$^3$ is as described above.

In the general formula (5A), each X is —H or —F. X may be both —F, or at least one thereof may be —H. For example, one thereof may be —F and the other may be —H, or both may be —H.

In the general formula (5A), Y is —H, —F, an alkyl group, or a fluorine-containing alkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Y is preferably —H, —F, or —CF$_3$, and more preferably —F.

In the general formula (5A), Z is the same or different and is —H, —F, an alkyl group, or a fluoroalkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Z is preferably —H, —F, or —CF$_3$, and more preferably —F.

In the general formula (5A), at least one of X, Y, and Z preferably contains a fluorine atom. For example, X may be —H, and Y and Z may be —F.

In the general formula (5A), Rf is a fluorine-containing alkylene group having 1 to 40 carbon atoms or a fluorine-containing alkylene group having 2 to 100 carbon atoms and having an ether bond. The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF(CF$_3$)—, —CF(CF$_3$)CF$_2$—, and —CF(CF$_3$)CH$_2$—. The fluorine-containing alkylene group is preferably a perfluoroalkylene group.

The fluorine-containing alkylene group having an ether bond preferably has 3 or more carbon atoms. Further, the fluorine-containing alkylene group having an ether bond preferably has 60 or less, more preferably 30 or less, and still more preferably 12 or less carbon atoms. The fluorine-containing alkylene group having an ether bond is also preferably a divalent group represented by the following formula:

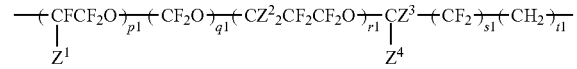

wherein Z$^1$ is F or CF$_3$; Z$^2$ and Z$^3$ are each H or F; Z$^4$ is H, F, or CF$_3$; p1+q1+r1 is an integer of 1 to 10; s1 is 0 or 1; and t1 is an integer of 0 to 5.

Specific examples of the fluorine-containing alkylene group having an ether bond include —CF(CF$_3$)CF$_2$—O—CF(CF$_3$)—, —(CF(CF$_3$)CF$_2$—O)$_n$—CF(CF$_3$)— (wherein n is an integer of 1 to 10), —CF(CF$_3$)CF$_2$—O—CF(CF$_3$)CH$_2$—, —(CF(CF$_3$)CF$_2$—O)$_n$—CF(CF$_3$)CH$_2$— (wherein n is an integer of 1 to 10), —CH$_2$CF$_2$CF$_2$O—CH$_2$CF$_2$CH$_2$—, —CF$_2$CF$_2$CF$_2$O—CF$_2$CF$_2$—, —CF$_2$CF$_2$CF$_2$O—CF$_2$CF$_2$CH$_2$—, —CF$_2$CF$_2$O—CF$_2$—, and —CF$_2$CF$_2$O—CF$_2$CH$_2$—. The fluorine-containing alkylene group having an ether bond is preferably a perfluoroalkylene group.

In the general formula (5A), Y$^3$ is preferably —COOM, —SO$_3$M, or —OSO$_3$M, wherein M is H, a metal atom, NR$^7$$_4$, imidazolium optionally having a substituent, pyridinium optionally having a substituent, or phosphonium optionally having a substituent, wherein R$^7$ is H or an organic group, and may be the same or different, and any two thereof may be bonded to each other to form a ring. The alkyl group is preferable as the organic group in $R^7$. $R^7$ is preferably H or a $C_{1-10}$ organic group, more preferably H or a $C_{1-4}$ organic group, and still more preferably H or a $C_{1-4}$ alkyl group. Examples of the metal atom include alkali metals (Group 1) and alkaline earth metals (Group 2), and preferred is Na, K, or Li. M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —Na, —K, or —$NH_4$, particularly preferably —Na or —$NH_4$, and most preferably —$NH_4$. $Y^3$ is preferably —COOM or —$SO_3M$, and more preferably —COOM.

The compound represented by the general formula (5A) is preferably a compound (5a) represented by the general formula (5a):

$$CH_2F(-CF_2-O-Rf-Y^3) \qquad (5a)$$

wherein Rf and $Y^3$ are as described above.

Specific examples of the compound represented by the general formula (5b) include a compound represented by the following formula:

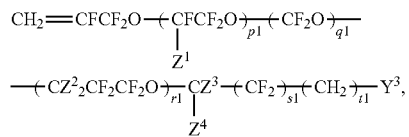

wherein $Z^1$ is F or $CF_3$; $Z^2$ and $Z^3$ are each H or F; $Z^4$ is H, F, or $CF_3$; p1+q1+r1 is an integer of 0 to 10; s1 is 0 or 1; t1 is an integer of 0 to 5; and $Y^3$ is as described above, with the proviso that when $Z^3$ and $Z^4$ are both H, p1+q1+r1+s1 is not 0. More specifically, preferred examples thereof include:

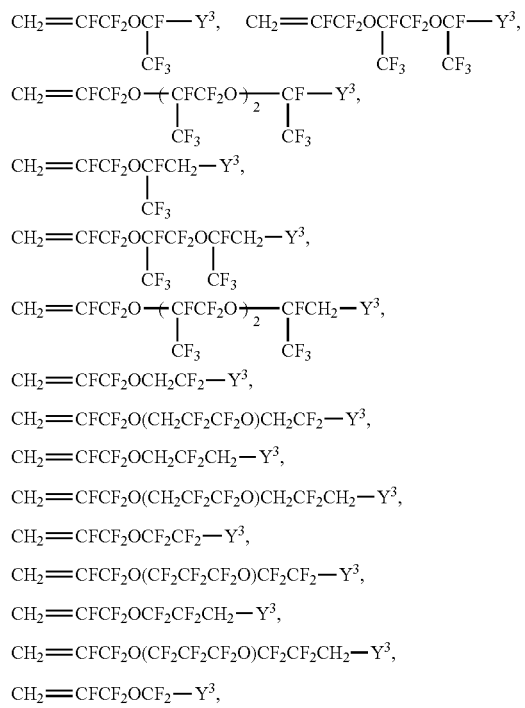

Of these,

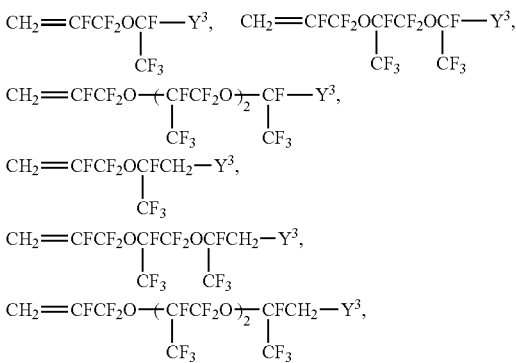

are preferable.

In the compound represented by the general formula (5a), $Y^3$ in the formula (5a) is preferably —COOM. Specifically, the monomer represented by the general formula (5a) is preferably at least one selected from the group consisting of $CH_2$=$CFCF_2OCF(CF_3)COOM$ and $CH_2$=$CFCF_2OCF(CF_3)CF_2OCF(CF_3)COOM$ (wherein M is as defined above), and more preferably $CH_2$=$CFCF_2OCF(CF_3)COOM$.

The compound represented by the general formula (5A) is preferably a compound (5b) represented by the general formula (5b):

$$CX^2_2=CFCF_2-O-(CF(CF_3)CF_2O)_{n5}-CF(CF_3)-Y^3 \qquad (5b)$$

wherein each $X^2$ is the same, and each represent F or H; n5 represents 0 or an integer of 1 to 10, and $Y^3$ is as defined above.

In the general formula (5b), n5 is preferably 0 or an integer of 1 to 5, more preferably 0, 1, or 2, and still more preferably 0 or 1 from the viewpoint of precipitation stability of the resulting composition. $Y^3$ is preferably —COOM from the viewpoint of obtaining appropriate water-solubility and precipitation stability of the composition, and M is preferably H or $NH_4$ from the viewpoint of being less likely to remain as impurities and improving the heat resistance of the resulting molded body.

Examples of the compound represented by the general formula (5c) include $CH_2$=$CFCF_2OCF(CF_3)COOM$ and $CH_2$=$CFCF_2OCF(CF_3)CF_2OCF(CF_3)COOM$, wherein M is as defined above.

Examples of the compound represented by the general formula (5A) further include a compound represented by the general formula (5c):

$$CF_2=CFCF_2-O-Rf-Y^3 \qquad (5c)$$

wherein Rf and $Y^3$ are as described above.

More specific examples thereof include:

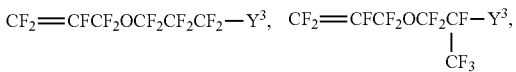

-continued $$CF_2\!=\!CFCF_2OCF_2CF_2CF_2CH_2\!-\!Y^3,$$

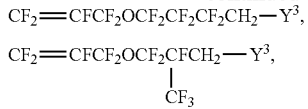

or the like.

In the general formula (6A), each X is —H or —F. X may be both —F, or at least one thereof may be —H. For example, one thereof may be —F and the other may be —H, or both may be —H.

In the general formula (6A), Y is —H, —F, an alkyl group, or a fluorine-containing alkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Y is preferably —H, —F, or —$CF_3$, and more preferably —F.

In the general formula (6A), at least one of X and Y preferably contains a fluorine atom. For example, X may be —H, and Y and Z may be —F.

In the general formula (6A), Rf is a fluorine-containing alkylene group having 1 to 40 carbon atoms or a fluorine-containing alkylene group having 2 to 100 carbon atoms and having an ether bond. The fluorine-containing alkylene group preferably has 2 or more carbon atoms. Further, the fluorine-containing alkylene group preferably has 30 or less carbon atoms, more preferably 20 or less carbon atoms, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

In the general formula (6A), $Y^3$ is preferably —COOM, —$SO_3M$, or —$OSO_3M$, wherein M is H, a metal atom, $NR^7_4$, imidazolium optionally having a substituent, pyridinium optionally having a substituent, or phosphonium optionally having a substituent, wherein $R_7$ is H or an organic group, and may be the same or different, and any two thereof may be bonded to each other to form a ring.

The alkyl group is preferable as the organic group of $R^7$. $R^7$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —Na, —K, or —$NH_4$, particularly preferably —Na or —$NH_4$, and most preferably —$NH_4$.

$Y^3$ is preferably —COOM or —$SO_3M$, and more preferably —COOM.

The compound represented by the general formula (6A) is preferably at least one selected from the group consisting of compounds represented by the general formulas (6a), (6b), (6c), (6d), and (6e):

$$CF_2\!=\!CF\!-\!O\!-\!(CF_2)_{n1}\!-\!Y^3 \quad (6a)$$

wherein n1 represents an integer of 1 to 10, and $Y^3$ is as defined above;

$$CF_2\!=\!CF\!-\!O\!-\!(CF_2C(CF_3)F)_{n2}\!-\!Y^3 \quad (6b)$$

wherein n2 represents an integer of 1 to 5, and $Y^3$ is as defined above;

$$CF_2\!=\!CF\!-\!O\!-\!(CFX^1)_{n3}\!-\!Y^3 \quad (6c)$$

wherein $X^1$ represents F or $CF_3$; n3 represents an integer of 1 to 10; and $Y^3$ is as defined above;

$$CF_2\!=\!CF\!-\!O\!-\!(CF_2CFX^1O)_{n4}\!-\!(CF_2)_{n6}\!-\!Y^3 \quad (6d)$$

wherein n4 represents an integer of 1 to 10; n6 represents an integer of 1 to 3; and $Y^3$ and $X^1$ are as defined above; and $$CF_2\!=\!CF\!-\!O\!-\!(CF_2CF_2CFX^1O)_{n5}\!-\!CF_2CF_2CF_2\!-\!Y^3 \quad (6e)$$

wherein n5 represents an integer of 0 to 10, and $Y^3$ and $X^1$ are the same as defined above.

In the general formula (6a), n1 is preferably an integer of 5 or less, and more preferably an integer of 2 or less. $Y^3$ is preferably —COOM from the viewpoint of obtaining appropriate water-solubility and excellent precipitation stability of the composition, and M is preferably H or $NH_4$ from the viewpoint of being less likely to remain as impurities and improving the heat resistance of the resulting molded body.

Examples of the compound represented by the general formula (6a) include $CF_2\!=\!CF\!-\!O\!-\!CF_2COOM$, $CF_2\!=\!CF(OCF_2CF_2COOM)$, and $CF_2\!=\!CF(OCF_2CF_2CF_2COOM)$ (wherein, M is the same as defined above).

In the general formula (6b), n2 is preferably an integer of 3 or less from the viewpoint of precipitation stability of the resulting composition, $Y^3$ is preferably —COOM from the viewpoint of obtaining appropriate water-solubility and excellent precipitation stability of the composition, and M is preferably H or $NH_4$ from the viewpoint of being less likely to remain as impurities and improving the heat resistance of the resulting molded body.

In the general formula (6c), n3 is preferably an integer of 5 or less from the viewpoint of water-solubility, $Y^3$ is preferably —COOM from the viewpoint of obtaining appropriate water-solubility and excellent precipitation stability of the composition, and M is preferably H or $NH_4$ from the viewpoint of improving precipitation stability.

In the formula (6d), $X^1$ is preferably —$CF_3$ from the viewpoint of precipitation stability of the composition, n4 is preferably an integer of 5 or less from the viewpoint of water-solubility, $Y^3$ is preferably —COOM from the viewpoint of obtaining appropriate water-solubility and excellent precipitation stability of the composition, and M is preferably H or $NH_4$.

Examples of the compound represented by the general formula (6d) include $CF_2\!=\!CFOCF_2CF(CF_3)OCF_2CF_2COOM$, $CF_2\!=\!CFOCF_2CF(CF_3)OCF_2COOM$, and $CF_2FOCF_2CF(CF_3)OCF_2CF_2CF_2COOM$ (wherein M represents H, $NH_4$, or an alkali metal).

In the general formula (6e), n5 is preferably an integer of 5 or less from the viewpoint of water-solubility, $Y^3$ is preferably —COOM from the viewpoint of obtaining appropriate water-solubility and excellent precipitation stability of the composition, and M is preferably H or $NH_4$.

Examples of the compound represented by the general formula (6e) include $CF_2\!=\!CFOCF_2CF_2CF_2COOM$ (wherein M represents H, $NH_4$, or an alkali metal).

In the general formula (7A), Rf is preferably a fluorine-containing alkylene group having 1 to 40 carbon atoms. In the general formula (7A), at least one of X and Y preferably contains a fluorine atom.

The compound represented by the general formula (7A) is preferably at least one selected from the group consisting of:
a compound represented by the general formula (7a):

  (7a)

wherein n1 represents an integer of 1 to 10; and $Y^3$ is as defined above; and
a compound represented by the general formula (7b):

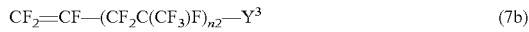  (7b)

wherein n2 represents an integer of 1 to 5; and $Y^3$ is as defined above.

$Y^3$ is preferably —$SO_3M$ or —COOM, and M is preferably H, a metal atom, $NR^7_4$, imidazolium optionally having a substituent, pyridinium optionally having a substituent, or phosphonium optionally having a substituent. $R^7$ represents H or an organic group.

In the general formula (7a), n1 is preferably an integer of 5 or less, and more preferably an integer of 2 or less. $Y^3$ is preferably —COOM from the viewpoint of obtaining appropriate water-solubility and excellent precipitation stability of the composition, and M is preferably H or $NH_4$ from the viewpoint of being less likely to remain as impurities and improving the heat resistance of the resulting molded body. Examples of the compound represented by the general formula (7a) include $CF_2$=$CFCF_2COOM$, wherein, M is as defined above.

In the general formula (7b), n2 is preferably an integer of 3 or less from the viewpoint of precipitation stability of the resulting composition, $Y^3$ is preferably —COOM from the viewpoint of obtaining appropriate water-solubility and excellent precipitation stability of the composition, and M is preferably H or $NH_4$ from the viewpoint of being less likely to remain as impurities and improving the heat resistance of the resulting molded body.

The modifying monomer preferably contains a modifying monomer (A), and preferably contains at least one selected from the group consisting of compounds represented by the general formulas (5a), (5b), (6a), (6b), (6c), and (6d), and more preferably contains a compound represented by the general formula (5a) or (5b).

When the modifying monomer contains the modifying monomer (A), the content of the modifying monomer (A) unit is preferably in the range of 0.00001 to 1.0% by mass based on the total polymerization unit of PTE. The lower limit thereof is preferably 0.0001% by mass, more preferably 0.001% by mass, still more preferably 0.005% by mass, and particularly preferably 0.009% by mass. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

In the present disclosure, the contents of the respective compound units constituting PTE can be calculated herein by any appropriate combination of NMR, FT-IR, elemental analysis, and X-ray fluorescence analysis in accordance with the types of the compounds. Further, the contents of the respective compound units constituting PTFE can also be obtained by calculation from the amount of the added modifying monomer used in the polymerization.

The PTFE may have a core-shell structure. Examples of the PTFE having a core-shell structure include modified PTFE containing a core of high-molecular-weight PTFE and a shell of lower-molecular-weight PTFE or modified PTE in the particle. Examples of such modified PTFE include PTFE described in Japanese National Publication of International Patent Application No. 2005/527652.

PTFE preferably has an average primary particle size of 150 nm or more, and more preferably 180 nm or more. The larger the average primary particle size of PTFE, the more the increase in paste extrusion pressure can be suppressed and the film-formability is excellent when paste extrusion molding is performed using the powder. The upper limit thereof may be, but is not limited to, 500 nm. From the viewpoint of productivity in the polymerization step, the upper limit is preferably 400 nm, and more preferably 350 nm. The average primary particle size is determined by diluting an aqueous dispersion of PTFE with water to a solid concentration of 0.15% by mass, measuring the transmittance of projected light at 550 nm to the unit length of the obtained diluted latex, and measuring the number-reference length average primary particle size determined by measuring the directional diameter by transmission electron microscope to prepare a calibration curve, and determining the particle size from the measured transmittance of projected light of 550 nm of each sample using the calibration curve.

The average primary particle size can be determined by dynamic light scattering. The average primary particle size may be determined by preparing an aqueous dispersion with a solid concentration being adjusted to 1.0% by mass and using dynamic light scattering at 25° C. with 70 measurement processes, wherein the solvent (water) has a refractive index of 1.3328 and the solvent (water) has a viscosity of 0.8878 mPa·s. The dynamic light scattering may use, for example, ELSZ-1000S (manufactured by Otsuka Electronics Co., Ltd.).

The aspect ratio of the primary particles of the PTFE is preferably less than 2.00, more preferably 1.90 or less, still more preferably 1.80 or less, further preferably 1.70 or less, still further preferably 1.60 or less, and particularly preferably 1.50 or less. The aspect ratio is more preferably 1.45 or less, still more preferably 1.40 or less, further preferably 1.35 or less, still further preferably 1.30 or less, particularly preferably 1.20 or less, and most preferably 1.10 or less. When measuring in an aqueous dispersion, the aspect ratio is determined by observing an aqueous dispersion of the PTFE diluted to have a solid concentration of about 1% by mass with a scanning electron microscope (SEM), performing image processing on 400 or more particles selected at random, and averaging the ratios of the major axis to the minor axis. When measuring a powder of the PTE, the aspect ratio is obtained by irradiating a powder of the PTFE with an electron beam, adding the powder of the PTE to an aqueous solution of a fluorosurfactant, and redispersing the powder of the PTE with ultrasonic waves to obtain an aqueous dispersion of the PTFE. The aspect ratio is determined from the aqueous dispersion of the PTFE by the same method as the method for measuring the above aqueous dispersion.

The standard specific gravity (SSG) of the PTFE is preferably 2.280 or less, more preferably 2.210 or less, still more preferably 2.200 or less, further preferably 2.190 or less, and particularly preferably 2.180 or less. The SSG is also preferably 2.130 or more. The SSG is determined by the water replacement method in conformity with ASTM D 792 using a sample molded in conformity with ASTM D 4895-89.

The PTFE preferably has a peak temperature in the range of 333 to 347° C. More preferably, the peak temperature is 335° C. or more and 345° C. or less. The peak temperature is a temperature corresponding to the maximum value in the heat-of-fusion curve when PTFE having no history of being heated to a temperature of 300° C. or more is heated at a rate of 10° C./min using a differential scanning calorimeter (DSC). The peak temperature can be specified as a temperature corresponding to a maximum value appearing in a differential thermal analysis (DTA) curve obtained by raising the temperature of PTFE, which has no history of heating to a temperature of 300° C. or higher, under a condition of 10° C./min using TG-DTA (thermogravimetric-differential thermal analyzer).

The content of PTFE in the composition of the present disclosure is preferably 10% by mass or more, more preferably 20% by mass or more, still more preferably 30% by mass or more, particularly preferably 40% by mass or more, and most preferably 50% by mass or more based on the composition. The upper limit of the content of PTFE in the composition may be, but not limited to, 80% by mass or less, 75% by mass or less, or 70% by mass or less. The content of PTFE in the composition can be adjusted by means of concentration, dilution or the like.

The content of PTFE in the composition of the present disclosure can be determined by measuring the solid concentration of the composition, the content of the polymer (I) in the composition, and the content of the nonionic surfactant in the composition, and subtracting the contents of the polymer (I) and the nonionic surfactant from the solid concentration of the composition. The solid concentration of the composition is a value obtained by drying 1 g of the composition in an air dryer at 150° C. for 30 minutes, measuring the mass of the non-volatile matter, and calculating the percentage of the mass of the non-volatile matter relative to the mass (1 g) of the composition. The method for measuring the content of the polymer (I) and the nonionic surfactant is as described in the Examples.

The content of the polymer (I) contained in the composition of the present disclosure can be measured by solid-state NMR.

Further, the polymer measurement methods are described in International Publication No. WO 2014/099453, International Publication No. WO 2010/075497, International Publication No. WO 2010/075496, International Publication No. WO 2011/008381, International Publication No. WO 2009/055521, International Publication No. WO 1987/007619, Japanese Patent Laid-Open No. 61-293476, International Publication No. WO 2010/075494, International Publication No. WO 2010/075359, International Publication No. WO 2012/082454, International Publication No. WO 2006/119224, International Publication No. WO 2013/085864, International Publication No. WO 2012/082707, International Publication No. WO 2012/082703, International Publication No. WO 2012/082454, International Publication No. WO 2012/082451, International Publication No. WO 2006/135825, International Publication No. WO 2004/067588, International Publication No. WO 2009/068528, Japanese Patent Laid-Open No. 2004-075978, Japanese Patent Laid-Open No. 2001-226436, International Publication No. WO 1992/017635, International Publication No. WO 2014/069165, Japanese Patent Laid-Open No. 11-181009, and the like. The method for measuring the content of the polymer (I) may be any of the polymer measurement methods respectively described in these documents.

<Polymer (I)>

The composition of the present disclosure contains a polymer (I). The polymer (I) contains a polymerization unit (I) based on a monomer represented by the general formula (I). The polymer (I) preferably contains two or more polymerization units (I):

$$CX^1X^3=CX^2R(-CZ^1Z^2-A^0)_m \quad (I)$$

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

$X^2$ is preferably F, Cl, H, or $CF_3$. Further, $Z^1$ and $Z^2$ are preferably F or $CF_3$.

In the present disclosure, the anionic group includes a functional group that imparts an anionic group, e.g., an acid group such as —COOH and an acid base such as —COONH$_4$, in addition to anionic groups such as a sulfate group and a carboxylate group. The anionic group is preferably a sulfate group, a carboxylate group, a phosphate group, a phosphonate group, a sulfonate group, or —C(CF$_3$)$_2$OM wherein M is —H, a metal atom, —NR$^7_4$, imidazolium optionally having a substituent, pyridinium optionally having a substituent, or phosphonium optionally having a substituent, and R$^7$ is H or an organic group.

The polymer (I) may contain the polymerization unit (I) that is based solely on one monomer represented by the general formula (I), or may contain the polymerization unit (I) based on two or more monomers represented by the general formula (I).

R is a linking group. The "linking group" as used herein is a (m+1)-valent linking group, and refers to a divalent group when m is 1. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

m is an integer of 1 or more and is preferably 1 or 2 and more preferably 1. When m is an integer of 2 or more, $Z^1$, $Z^2$, and $A^0$ may be the same or different.

Next, a suitable configuration wherein m is 1 in the general formula (I) will now be described.

R is preferably a catenary heteroatom such as oxygen, sulfur, or nitrogen, or a divalent organic group.

When R is a divalent organic group, the hydrogen atom bonded to the carbon atom may be replaced by a halogen other than fluorine, such as chlorine, and may or may not contain a double bond. Further, R may be linear or branched, and may be cyclic or acyclic. R may also contain a functional group (e.g., ester, ether, ketone, amine, halide, etc.).

R may also be a fluorine-free divalent organic group or a partially fluorinated or perfluorinated divalent organic group.

R may be, for example, a hydrocarbon group in which a fluorine atom is not bonded to a carbon atom, a hydrocarbon group in which some of the hydrogen atoms bonded to a carbon atom are replaced by fluorine atoms, or a hydrocarbon group in which all of the hydrogen atoms bonded to the carbon atoms are replaced by fluorine atoms, and these groups optionally contain an oxygen atom, optionally contain a double bond, and optionally contain a functional group.

R is preferably a hydrocarbon group having 1 to 100 carbon atoms that optionally contains an ether bond, wherein some or all of the hydrogen atoms bonded to the carbon atoms in the hydrocarbon group may be replaced by fluorine.

R is preferably at least one selected from $-(CH_2)_a-$, $-(CF_2)_a-$, $-O-(CF_2)_a-$, $-(CF_2)_a-O-(CF_2)_b-$, $-O(CF_2)_a-O-(CF_2)_b-$, $-(CF_2)_a-[O-(CF_2)_b]_c-$, $-O(CF_2)_a-[O-(CF_2)_b]_c-$, $-[(CF_2)_a-O]_b-[(CF_2)_c-O]_d-$, $-O[(CF_2)_a-O]_b-[(CF_2)_c-O]_d-$, $-O-[CF_2CF(CF_3)O]_a-(CF_2)_b-$, $-[CF_2CF(CF_3)O]_d-$, $-[CF(CF_3)CF_2O]_a-$, $-(CF_2)_a-O-[CF(CF_3)CF_2O]_a-$, $-(CF_2)_a-O-[CF(CF_3)CF_2O]_a-(CF_2)_b-$, and combinations thereof.

In the formula, a, b, c, and d are independently at least 1 or more. a, b, c and d may independently be 2 or more, 3 or more, 4 or more, 10 or more, or 20 or more. The upper limits of a, b, c, and d are 100, for example.

R is preferably a divalent group represented by the general formula (r1):

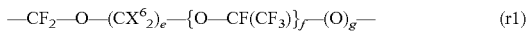
$$-CF_2-O-(CX^6_2)_e-\{O-CF(CF_3)\}_f-(O)_g- \quad (r1)$$

wherein $X^6$ is each independently H, F, or $CF_3$; e is an integer of 0 to 3; f is an integer of 0 to 3; and g is 0 or 1, and is preferably a divalent group represented by the general formula (r2):

$$-CF_2-O-(CX^7_2)_e-(O)_g- \quad (r2)$$

wherein $X^7$ is each independently H, F, or $CF_3$; e is an integer of 0 to 3; and g is 0 or 1.

Specific examples suitable for R include $-CF_2-O-$, $-CF_2-O-CF_2-$, $-CF_2-O-CH_2-$, $-CF_2-O-CH_2CF_2-$, $-CF_2-O-CF_2CF_2-$, $-CF_2-O-CF_2CH_2-$, $-CF_2-O-CF_2CF_2CH_2-$, $-CF_2-O-CF(CF_3)-$, $-CF_2-O-CF(CF_3)CF_2-$, $-CF_2-O-CF(CF_3)CF_2-O-$, $-CF_2-O-CF(CF_3)CF_2-O-CF_2-$, and $-CF_2-O-CF(CF_3)CH_2-$. In particular, R is preferably a perfluoroalkylene group optionally containing an oxygen atom, and, specifically, $-CF_2-O-$, $-CF_2-O-CF_2-$, $-CF_2-O-CF_2CF_2-$, $-CF_2-O-CF(CF_3)-$, $-CF_2-O-CF(CF_3)CF_2-$, or $-CF_2-O-CF(CF_3)CF_2-O-$ is preferable.

$-R-CZ^1Z^2-$ in the general formula (I) is preferably one represented by the general formula (s1):

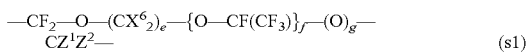
$$-CF_2-O-(CX^6_2)_e-\{O-CF(CF_3)\}_f-(O)_g-CZ^1Z^2- \quad (s1)$$

(wherein $X^6$ is each independently H, F, or $CF_3$; e is an integer of 0 to 3; f is an integer of 0 to 3; g is 0 or 1; and $Z^1$ and $Z^2$ are each independently H, F, an alkyl group, or a fluorine-containing alkyl group), and more preferably, in the formula (s1), $Z^1$ and $Z^2$ are F or $CF_3$, and further preferably one is F, and the other is $CF_3$.

Further, $-R-CZ^1Z^2-$ in the general formula (I) is preferably one represented by the general formula (s2):

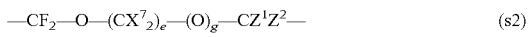
$$-CF_2-O-(CX^7_2)_e-(O)_g-CZ^1Z^2- \quad (s2)$$

(wherein $X^7$ is each independently H, F, or $CF_3$; e is an integer of 0 to 3; g is 0 or 1; and $Z^1$ and $Z^2$ are each independently H, F, an alkyl group, or a fluorine-containing alkyl group), and more preferably, in the formula (s2), $Z^1$ and $Z^2$ are F or $CF_3$, and further preferably one is F, and the other is $CF_3$.

$-R-CZ^1Z^2-$ in the above general formula (I) is preferably $-CF_2-O-CF_2-$, $-CF_2-O-CF(CF_3)-$, $-CF_2-O-C(CF_3)_2-$, $-CF_2-O-CF_2-CF_2-$, $-CF_2-O-CF_2-CF(CF_3)-$, $-CF_2-O-CF_2-C(CF_3)_2-$, $-CF_2-O-CF_2CF_2-CF_2-$, $-CF_2-O-CF_2CF_2-CF(CF_3)-$, $-CF_2-O-CF_2CF_2-C(CF_3)_2-$, $-CF_2-O-CF(CF_3)-CF_2-$, $-CF_2-O-CF(CF_3)-CF(CF_3)-$, $-CF_2-O-CF(CF_3)-C(CF_3)_2-$, $-CF_2-O-CF(CF_3)-CF_2-$, $-CF_2-O-CF(CF_3)CF_2-CF(CF_3)-$, $-CF_2-O-CF(CF_3)CF_2-C(CF_3)_2-$, $-CF_2-O-CF(CF_3)CF_2-O-CF_2-$, $-CF_2-O-CF(CF_3)CF_2-O-CF(CF_3)-$, or $-CF_2-O-CF(CF_3)CF_2-O-C(CF_3)_2-$, and more preferably $-CF_2-O-CF(CF_3)-$, $-CF_2-O-CF_2-CF(CF_3)-$, $-CF_2-O-CF_2CF_2-CF(CF_3)-$, $-CF_2-O-CF(CF_3)-CF(CF_3)-$, $-CF_2-O-CF(CF_3)CF_2-CF(CF_3)-$, or $-CF_2-O-CF(CF_3)CF_2-O-CF(CF_3)-$.

It is also preferable that the polymer (I) is highly fluorinated. Except for the anionic group ($A^0$) such as a phosphate group moiety (such as $CH_2OP(O)(OM)_2$) and a sulfate group moiety (such as $CH_2OS(O)_2OM$), 80% or more, 90% or more, 95% or more, or 100% of C—H bonds in the polymer (I) are replaced with C—F bonds.

The polymer (I) also preferably has a C—F bond and does not have a C—H bond, in the portion excluding the anionic group ($A^0$). In other words, in the general formula (I), $X^1$, $X^2$, and $X^3$ are all F, and R is preferably a perfluoroalkylene group having one or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The polymer (I) may be partially fluorinated. In other words, the polymer (I) also preferably has at least one hydrogen atom bonded to a carbon atom and at least one fluorine atom bonded to a carbon atom, in the portion excluding the anionic group ($A^0$).

The anionic group ($A^0$) may be $-SO_3M$, $-OSO_3M$, $-COOM$, $-SO_2NR'CH_2COOM$, $-CH_2OP(O)(OM)_2$, $[-CH_2O]_2P(O)(OM)$, $-CH_2CH_2OP(O)(OM)_2$, $[-CH_2CH_2O]_2P(O)(OM)$, $-CH_2CH_2OSO_3M$, $-P(O)(OM)_2$, $-SO_2NR'CH_2CH_2OP(O)(OM)_2$, $[-SO_2NR'CH_2CH_2O]_2P(O)(OM)$, $-CH_2OSO_3M$, $-SO_2NR'CH_2CH_2OSO_3M$, or $-C(CF_3)_2OM$. Among these, $-SO_3M$, $-COOM$, or $-P(O)(OM)_2$ is preferable, $-SO_3M$ or $-COOM$ is more preferable, and $-COOM$ is still more preferable.

M is H, a metal atom, $NR^7_4$, imidazolium optionally having a substituent, pyridinium optionally having a substituent, or phosphonium optionally having a substituent, and $R^7$ is H or an organic group.

Examples of the metal atom include alkali metals (Group 1) and alkaline earth metals (Group 2), and preferred is Na, K, or Li.

M is preferably —H, a metal atom, or $-NR^7_4$, more preferably —H, an alkali metal (Group 1), an alkaline earth metal (Group 2), or $-NR^7_4$, still more preferably —H, —Na, —K, —Li, or $-NH_4$, further preferably —Na, —K, or $-NH_4$, particularly preferably —Na or $-NH_4$, and most preferably $-NH_4$.

In the polymer (I), each polymerization unit (I) may have a different anionic group or may have the same anionic group.

The polymer (I) is also preferably a polymer containing a polymerization unit (Ia) based on a monomer represented by the general formula (Ia):

$$CF_2=CF-O-Rf^0-A^0 \quad (Ia)$$

wherein $A^0$ is an anionic group; and $Rf^0$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The polymer (I) is also preferably a polymer containing a polymerization unit (Ib) based on a monomer represented by the general formula (Ib):

$$CH_2=CH-O-Rf^0-A^0 \quad (Ib)$$

wherein $A^0$ is an anionic group, and $Rf^0$ is a perfluorinated divalent linking group as defined by the formula (Ia).

In a preferred embodiment, in the general formula (I), $A^0$ is a sulfate group. $A^0$ is, for example, —$CH_2OSO_3M$, —$CH_2CH_2OSO_3M$, or —$SO_2NR'CH_2CH_2OSO_3M$, wherein R' is H or an alkyl group having 1 to 4 carbon atoms, and M is the same as above.

When $A^0$ is a sulfate group, examples of the monomer represented by the general formula (I) include $CF_2$=CF($OCF_2CF_2CH_2OSO_3M$), $CH_2$=CH(($CF_2)_4CH_2OSO_3M$), $CF_2$=CF(O($CF_2)_4CH_2OSO_3M$), $CF_2$=CF($OCF_2CF(CF_3)CH_2OSO_3M$), $CF_2$=CF($OCF_2CF(CF_3)OCF_2CF_2CH_2OSO_3M$), $CH_2$=CH(($CF_2)_4CH_2OSO_3M$), $CF_2$=CF($OCF_2CF_2SO_2N(CH_3)CH_2CH_2OSO_3M$), $CH_2$=CH($CF_2CF_2CH_2OSO_3M$), $CF_2$=CF($OCF_2CF_2CF_2CF_2SO_2N(CH_3)CH_2CH_2OSO_3M$), and $CH_2$=CH($CF_2CF_2CF_2CH_2OSO_3M$). In the formula, M is the same as above.

In a preferred embodiment, in the general formula (I), $A^0$ is a sulfonate group. $A^0$ is, for example, —$SO_3M$, wherein M is the same as above.

When $A^0$ is a sulfonate group, examples of the monomer represented by the general formula (I) include $CF_2$=CF($OCF_2CF_2SO_3M$), $CF_2$=CF(O($CF_2)_3SO_3M$), $CF_2$=CF(O($CF_2)_4SO_3M$), $CF_2$=CF($OCF_2CF(CF_3)SO_3M$), $CF_2$=CF($OCF_2CF(CF_3)OCF_2CF_2SO_3M$), $CH_2$=CH($CF_2CF_2SO_3M$), $CF_2$=CF($OCF_2CF(CF_3)OCF_2CF_2CF_2CF_2SO_3M$), $CH_2$=CH(($CF_2)_4SO_3M$), $CH_2$=CH($CF_2CF_2SO_3M$), and $CH_2$=CH(($CF_2)_3SO_3M$). In the formula, M is the same as above.

In a preferred embodiment, in the general formula (I), $A^0$ is a carboxylate group. $A^0$ is, for example, —COOM or —$SO_2NR'CH_2COOM$, wherein R' is H or an alkyl group having 1 to 4 carbon atoms, and M is the same as above. When $A^0$ is a carboxylate group, examples of the monomer represented by the general formula (I) include $CF_2$=CF($OCF_2CF_2COOM$), $CF_2$=CF(O($CF_2)_3COOM$), $CF_2$=CF(O($CF_2)_4COOM$), $CF_2$=CF(O($CF_2)_5COOM$), $CF_2$=CF($OCF_2CF(CF_3)COOM$), $CF_2$=CF($OCF_2CF(CF_3)O(CF_2)_nCOOM$) (n is greater than 1), $CH_2$=CH($CF_2CF_2COOM$), $CH_2$=CH(($CF_2)_4COOM$), $CH_2H(CF_2CF_2COOM$), $CH_2$=CH(($CF_2)_3COOM$), $CF_2$=CF($OCF_2CF_2SO_2NR'CH_2COOM$), $CF_2$=CF(O($CF_2)_4SO_2NR'CH_2COOM$), $CF_2$=CF($OCF_2CF(CF_3)SO_2NR'CH_2COOM$), $CF_2$=CF($OCF_2CF(CF_3)OCF_2CF_2SO_2NR'CH_2COOM$), $CH_2$=CH($CF_2CF_2SO_2NR'CH_2COOM$), $CF_2$=CF($OCF_2CF(CF_3)OCF_2CF_2CF_2CF_2SO_2NR'$ $CH_2COOM$), $CH_2$=CH(($CF_2)_4SO_2NR'$ $CH_2COOM$), $CH_2H(CF_2CF_2SO_2NR'CH_2COOM$), and $CH_2$=CH(($CF_2)_3SO_2NR'CH_2COOM$). In the formula, R' is H or an alkyl group having 1 to 4 carbon atoms, and M is the same as above.

In a preferable embodiment, in the general formula (I), $A^0$ is a phosphate group. $A^0$ is, for example, —$CH_2OP(O)(OM)_2$, [—$CH_2O]_2P(O)(OM)$, —$CH_2CH_2OP(O)(OM)_2$, [—$CH_2CH_2O]_2P(O)(OM)$, [—$SO_2NR'CH_2CH_2O]_2P(O)$ (OM), or —$SO_2NR'CH_2CH_2OP(O)(OM)_2$, wherein R' is an alkyl group having 1 to 4 carbon atoms, and M is the same as above.

When $A^0$ is a phosphate group, examples of the monomer represented by the general formula (I) include $CF_2$=CF($OCF_2CF_2CH_2OP(O)(OM)_2$), $CF_2$=CF(O($CF_2)_4CH_2OP(O)(OM)_2$), $CF_2$=CF($OCF_2CF(CF_3)CH_2OP(O)(OM)_2$), $CF_2$=CF($OCF_2CF(CF_3)OCF_2CF_2CH_2OP(O)(OM)_2$), $CF_2$=CF($OCF_2CF_2SO_2N(CH_3)CH_2CH_2OP(O)(OM)_2$), $CF_2$=CF($OCF_2CF_2CF_2CF_2SO_2N(CH_3)CH_2CH_2OP(O)(OM)_2$), $CH_2$=CH($CF_2CF_2CH_2OP(O)(OM)_2$), $CH_2$=CH(($CF_2)_4CH_2OP(O)(OM)_2$), $CH_2$=CH($CF_2CF_2CH_2OP(O)(OM)_2$), and $CH_2$=CH(($CF_2)_3CH_2OP(O)(OM)_2$). In the formula, M is the same as above.

In a preferable embodiment, in the general formula (I), $A^0$ is a phosphonate group. When $A^0$ is a phosphonate group, examples of the monomer represented by the general formula (I) include $CF_2$=CF($OCF_2CF_2P(O)(OM)_2$), $CF_2$=CF(O($CF_2)_4P(O)(OM)_2$), $CF_2$=CF($OCF_2CF(CF_3)P(O)(OM)_2$), $CF_2$=CF($OCF_2CF(CF_3)OCF_2CF_2$=CP(O)(OM)_2$), $CH_2$=CH($CF_2CF_2P(O)(OM)_2$), $CH_2$=CH(($CF_2)_4P(O)(OM)_2$), $CH_2$=CH($CF_2CF_2P(O)(OM)_2$), and $CH_2$=CH(($CF_2)_3P(O)(OM)_2$), wherein M is the same as above.

The polymer (I) is preferably a polymer (1) containing a polymerization unit (1) based on a monomer represented by general formula (1):

$$CX_2=CY(-CZ_2-O-Rf-A) \quad (1)$$

wherein X is the same or different and is —H or —F; Y is —H, —F, an alkyl group, or a fluorine-containing alkyl group; Z is the same or different and is —H, —F, an alkyl group, or a fluoroalkyl group; Rf is a fluorine-containing alkylene group having 1 to 40 carbon atoms or a fluorine-containing alkylene group having 2 to 100 carbon atoms and having an ether bond; and A is —COOM, —$OSO_3M$, or $C(CF_3)_2OM$, wherein M is —H, a metal atom, —$NR^7_4$, imidazolium optionally having a substituent, pyridinium optionally having a substituent, or phosphonium optionally having a substituent, and $R^7$ is H or an organic group, provided that at least one of X, Y, and Z contains a fluorine atom.

When the composition of the present disclosure contains the polymer (1), the precipitation stability of the composition is further improved. When a composition containing PTFE is produced by using the polymer (I), the composition can be produced more stably and efficiently by using the polymer (1) as the polymer (I), and a high-molecular-weight PTFE can be obtained in a high yield. The fluorine-containing alkylene group having 2 to 100 carbon atoms and having an ether bond is an alkylene group which does not include a structure wherein an oxygen atom is an end and which contains an ether bond between carbon atoms.

In the general formula (1), each X is —H or —F. X may be both —F, or at least one thereof may be —H. For example, one thereof may be —F and the other may be —H, or both may be —H.

In the general formula (1), Y is —H, —F, an alkyl group, or a fluorine-containing alkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Y is preferably —H, —F, or —CF$_3$, and more preferably —F.

In the general formula (1), Z is the same or different and is —H, —F, an alkyl group, or a fluoroalkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Z is preferably —H, —F, or —CF$_3$, and more preferably —F.

In the general formula (1), at least one of X, Y, and Z contains a fluorine atom. For example, X may be —H, and Y and Z may be —F.

In the general formula (1), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. Further, the fluorine-containing alkylene group preferably has 30 or less carbon atoms, more preferably 20 or less carbon atoms, and still more preferably 10 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF(CF$_3$)—, —CF(CF$_3$)CF$_2$—, and —CF(CF$_3$)CH$_2$—. The fluorine-containing alkylene group is preferably a perfluoroalkylene group.

The fluorine-containing alkylene group having an ether bond preferably has 3 or more carbon atoms. Further, the fluorine-containing alkylene group having an ether bond preferably has 60 or less, more preferably 30 or less, and still more preferably 12 or less carbon atoms. The fluorine-containing alkylene group having an ether bond is also preferably a divalent group represented by the general formula:

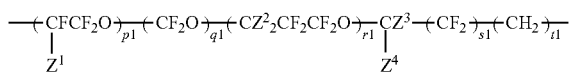

wherein $Z^1$ is F or CF$_3$; $Z^2$ and $Z^3$ are each H or F; $Z^4$ is H, F, or CF$_3$; p1+q1+r1 is an integer of 1 to 10; s1 is 0 or 1; and t1 is an integer of 0 to 5.

Specific examples of the fluorine-containing alkylene group having an ether bond include —CF(CF$_3$)CF$_2$—O—CF(CF$_3$)—, —(CF(CF$_3$)CF$_2$—O)$_n$—CF(CF$_3$)— (wherein n is an integer of 1 to 10), —CF(CF$_3$)CF$_2$—O—CF(CF$_3$)CH$_2$—, —(CF(CF$_3$)CF$_2$—O)$_n$—CF(CF$_3$)CH$_2$— (wherein n is an integer of 1 to 10), —CH$_2$CF$_2$CF$_2$O—CH$_2$CF$_2$CH$_2$—, —CF$_2$CF$_2$CF$_2$O—CF$_2$CF$_2$—, —CF$_2$CF$_2$CF$_2$O—CF$_2$CF$_2$CH$_2$—, —CF$_2$CF$_2$O—CF$_2$—, and —CF$_2$CF$_2$O—CF$_2$CH$_2$—. The fluorine-containing alkylene group having an ether bond is preferably a perfluoroalkylene group.

In the general formula (1), A is —COOM, —SO$_3$M, —OSO$_3$M, or —C(CF$_3$)$_2$OM, wherein M is —H, a metal atom, —NR$^7$$_4$, imidazolium optionally having a substituent, pyridinium optionally having a substituent, or phosphonium optionally having a substituent, and R$^7$ is H or an organic group.

R$^7$ is preferably H or a C$_{1-10}$ organic group, more preferably H or a C$_{1-4}$ organic group, and still more preferably H or a C$_{1-4}$ alkyl group.

Examples of the metal atom include alkali metals (Group 1) and alkaline earth metals (Group 2), and preferred is Na, K, or Li.

M is preferably —H, a metal atom, or —NR$^7$$_4$, more preferably —H, an alkali metal (Group 1), an alkaline earth metal (Group 2), or —NR$^7$$_4$, still more preferably —H, —Na, —K, —Li, or —NH$_4$, further preferably —Na, —K, or —NH$_4$, particularly preferably —Na or —NH$_4$, and most preferably —NH$_4$.

A is preferably —COOM or —SO$_3$M, and more preferably —COOM.

The monomer represented by the general formula (1) is exemplified by a fluoroallyl ether compound represented by the general formula (1a):

wherein each X is the same, and each represent F or H; n5 represents 0 or an integer of 1 to 10; and A is as defined above.

In the general formula (1a), n5 is preferably 0 or an integer of 1 to 5, more preferably 0, 1, or 2, and still more preferably 0 or 1 from the viewpoint of obtaining PTFE particles having a small primary particle size.

The polymer (1) may be a homopolymer of the fluoroallyl ether compound represented by the general formula (1a), or may be a copolymer with further monomer.

The polymerization unit (1) is preferably a polymerization unit (1A) based on a monomer represented by the general formula (1A):

wherein Rf and A are as described above.

The polymer (1) may be a homopolymer of the monomer represented by the general formula (1A), or may be a copolymer with a further monomer.

Specific examples of the monomer represented by the formula (1A) include a monomer represented by the general formula:

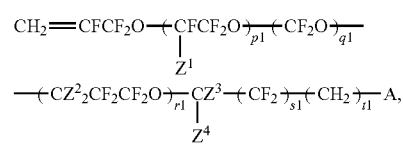

wherein $Z^1$ is F or CF$_3$; $Z^2$ and $Z^3$ are each H or F; $Z^4$ is H, F, or CF$_3$; p1+q1+r1 is an integer of 0 to 10; s1 is 0 or 1; t1 is an integer of 0 to 5, with the proviso that when $Z^3$ and $Z^4$ are both H, p1+q1+r1+s1 is not 0; and A is as defined above. More specifically, preferred examples thereof include:

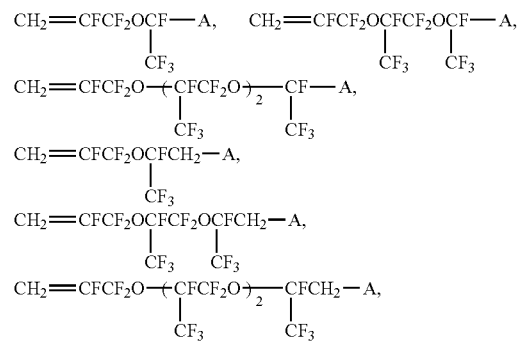

-continued

CH$_2$=CFCF$_2$OCH$_2$CF$_2$—A,

CH$_2$=CFCF$_2$O(CH$_2$CF$_2$CF$_2$O)CH$_2$CF$_2$—A,

CH$_2$=CFCF$_2$OCH$_2$CF$_2$CH$_2$—A,

CH$_2$=CFCF$_2$O(CH$_2$CF$_2$CF$_2$O)CH$_2$CF$_2$CH$_2$—A,

CH$_2$=CFCF$_2$OCF$_2$CF$_2$—A,

CH$_2$=CFCF$_2$O(CF$_2$CF$_2$CF$_2$O)CF$_2$CF$_2$—A,

CH$_2$=CFCF$_2$OCF$_2$CF$_2$CH$_2$—A,

CH$_2$=CFCF$_2$O(CF$_2$CF$_2$CF$_2$O)CF$_2$CF$_2$CH$_2$—A,

CH$_2$=CFCF$_2$OCF$_2$—A,

CH$_2$=CFCF$_2$O(CF$_2$CF$_2$O)CF$_2$—A,

CH$_2$=CFCF$_2$OCF$_2$CH$_2$—A,

CH$_2$=CFCF$_2$O(CF$_2$CF$_2$O)CF$_2$CH$_2$—A,

Of these,

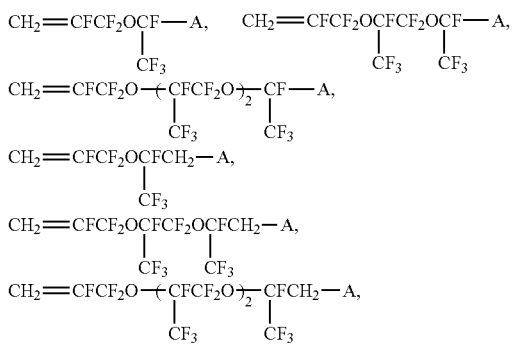

are preferable.

In the monomer represented by the general formula (1A), A in the formula (1A) is preferably —COOM. Specifically, the monomer represented by the general formula (1A) is preferably at least one selected from the group consisting of CH$_2$=CFCF$_2$OCF(CF$_3$)COOM and CH$_2$=CFCF$_2$OCF(CF$_3$)CF$_2$OCF(CF$_3$)COOM (wherein M is as defined above), and more preferably CH$_2$=CFCF$_2$OCF(CF$_3$)COOM.

Examples of the monomer represented by the general formula (1) further include monomers represented by the following formulas:

CF$_2$=CFCF$_2$—O—Rf-A wherein Rf and A are as described above.

More specific examples thereof include:

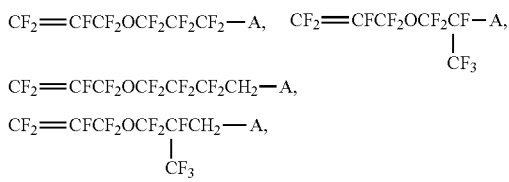

or the like.

The polymer (I) is also preferably a polymer (2) containing a polymerization unit (2) based on a monomer represented by general formula (2):

CX$_2$=CY(—O—Rf-A)  (2)

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and A is as described above.

In the general formula (2), each X is —H or —F. X may be both —F, or at least one thereof may be —H. For example, one thereof may be —F and the other may be —H, or both may be —H.

In the general formula (2), Y is —H, —F, an alkyl group, or a fluorine-containing alkyl group. The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms. The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms. Y is preferably —H, —F, or —CF$_3$, and more preferably —F.

In the general formula (2), at least one of X and Y preferably contains a fluorine atom. For example, X may be —H, and Y and Z may be —F.

In the general formula (2), Rf is a fluorine-containing alkylene group having 1 to 40 carbon atoms or a fluorine-containing alkylene group having 2 to 100 carbon atoms and having an ether bond. The fluorine-containing alkylene group having 2 to 100 carbon atoms and having an ether bond is an alkylene group which does not include a structure wherein an oxygen atom is an end and which contains an ether bond between carbon atoms.

The fluorine-containing alkylene group of Rf preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF(CF$_3$)—, —CF(CF$_3$)CF$_2$—, and —CF(CF$_3$)CH$_2$—. The fluorine-containing alkylene group is preferably a perfluoroalkylene group.

The monomer represented by the general formula (2) is preferably at least one selected from the group consisting of monomers represented by the general formulas (2a), (2b), (2c), (2d), and (2e):

CF$_2$=CF—O—(CF$_2$)$_{n1}$-A  (2a)

wherein n1 represents an integer of 1 to 10, and A is as defined above;

CF$_2$=CF—O—(CF$_2$C(CF$_3$)F)$_{n2}$-A  (2b)

wherein n2 represents an integer of 1 to 5, and A is as defined above;

CF$_2$=CF—O—(CFX$^1$)$_{n3}$-A  (2c)

wherein X$^1$ represents F or CF$_3$; n3 represents an integer of 1 to 10; and A is as defined above;

CF$_2$=CF—O—(CF$_2$CFX$^1$O)$_{n4}$—(CF$_2$)$_{n6}$-A  (2d)

wherein n4 represents an integer of 1 to 10; n6 represents an integer of 1 to 3; and A and X$^1$ are as defined above; and CF$_2$=CF—O—(CF$_2$CF$_2$CFX$^1$O)$_{n5}$—CF$_2$CF$_2$CF$_2$-A  (2e)

wherein n5 represents an integer of 0 to 10, and A and $X^1$ are the same as defined above.

In the general formula (2a), n1 is preferably an integer of 5 or less, and more preferably an integer of 2 or less.

Examples of the monomer represented by the general formula (2a) include $CF_2$=CF—O—$CF_2$COOM, $CF_2$=CF($OCF_2CF_2$COOM), $CF_2$=CF(O($CF_2$)$_3$COOM), and $CF_2$=CF($OCF_2CF_2SO_3$M), wherein M is as defined above.

In the general formula (2b), n2 is preferably an integer of 3 or less from the viewpoint of precipitation stability of the resulting composition.

In the general formula (2c), n3 is preferably an integer of 5 or less from the viewpoint of water-solubility, A is preferably —COOM, and M is preferably H or $NH_4$.

In the general formula (2d), $X^1$ is preferably —$CF_3$ from the viewpoint of precipitation stability of the composition, n4 is preferably an integer of 5 or less from the viewpoint of water-solubility, A is preferably —COOM, and M is preferably H or $NH_4$.

Examples of the monomer represented by the general formula (2d) include $CF_2$=CFOCF$_2$CF(CF$_3$)OCF$_2$CF$_2$COOM, $CF_2$=CFOCF$_2$CF(CF$_3$)OCF$_2$COOM, and $CF_2$=CFOCF$_2$CF(CF$_3$)OCF$_2$CF$_2$CF$_2$COOM (wherein M represents H, $NH_4$, or an alkali metal).

In the general formula (2e), n5 is preferably an integer of 5 or less from the viewpoint of water-solubility, A is preferably —COOM, and M is preferably H or $NH_4$.

Examples of the monomer represented by the general formula (2e) include $CF_2$=CFOCF$_2$CF$_2$CF$_2$COOM (wherein M represents H, $NH_4$, or an alkali metal).

The polymer (I) is also preferably a polymer (3) containing a polymerization unit (3) based on a monomer represented by general formula (3):

$$CX_2=CY(-Rf-A) \quad (3)$$

wherein X is the same or different and is —H or —F; Y is —H, —F, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and A is as described above.

The fluorine-containing alkylene group having 2 to 100 carbon atoms and having an ether bond is an alkylene group which does not include a structure wherein an oxygen atom is an end and which contains an ether bond between carbon atoms.

In the general formula (3), Rf is preferably a fluorine-containing alkylene group having 1 to 40 carbon atoms. In the general formula (3), at least one of X and Y preferably contains a fluorine atom.

The monomer represented by the general formula (3) is preferably at least one selected from the group consisting of a monomer represented by general formula (3a):

wherein n1 represents an integer of 1 to 10; and A is as defined above; and a monomer represented by the general formula (3b):

wherein n2 represents an integer of 1 to 5, and A is as defined above.

In general formulas (3a) and (3b), A is preferably —$SO_3$M or —COOM, and M is preferably H, a metal atom, $NR^7_4$, imidazolium optionally having a substituent, pyridinium optionally having a substituent, or phosphonium optionally having a substituent. $R^7$ represents H or an organic group.

In the general formula (3a), n1 is preferably an integer of 5 or less, and more preferably an integer of 2 or less. A is preferably —COOM, and M is preferably H or $NH_4$.

Examples of the monomer represented by the general formula (3a) include $CF_2FCF_2$COOM, wherein, M is as defined above.

In the general formula (3b), n2 is preferably an integer of 3 or less from the viewpoint of precipitation stability of the resulting composition, A is preferably —COOM, and M is preferably H or $NH_4$.

Next, a suitable configuration wherein m is an integer of 2 or more in the general formula (I) will now be described.

The polymer (I) is also preferably a polymer (4) containing a polymerization unit (4) based on at least one monomer selected from the group consisting of monomers represented by general formulas (4a) and (4b):

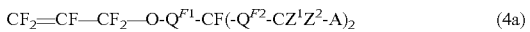

wherein $Z^1$, $Z^2$, and A are as defined above, and $Q^{F1}$ and $Q^{F2}$ are the same or different and are a single bond, a fluorine-containing alkylene group optionally containing an ether bond between carbon atoms, or a fluorine-containing oxyalkylene group optionally containing an ether bond between carbon atoms; and

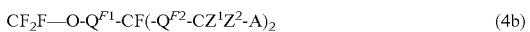

wherein $Z^1$, $Z^2$, A, $T^1$, and $T^2$ are as defined above.

Examples of the monomers represented by the general formulas (4a) and (4b) include:

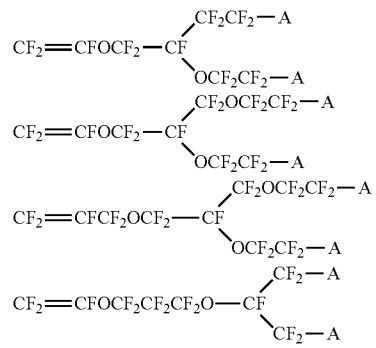

or the like.

The polymer (I) is preferably at least one selected from the group consisting of the polymer (1), the polymer (2), and the polymer (3), and the polymer (1) is more preferable.

The polymer (I) may be a homopolymer composed solely of the polymerization unit (I), or may be a copolymer containing the polymerization unit (I) and a polymerization unit based on a further monomer copolymerizable with the monomer represented by the general formula (I). From the viewpoint of solubility in an aqueous medium, a homopolymer composed solely of the polymerization unit (I) is preferable. The polymerization unit (I) may be the same or different at each occurrence, and may contain the polymerization unit (I) based on two or more different monomers represented by the general formula (I).

The further monomer is preferably a fluorine-containing ethylenic monomer having 2 or 3 carbon atoms, such as $CF_2$=$CF_2$, $CF_2$=CFCl, $CH_2$=$CF_2$, CFH=$CH_2$, CFH=$CF_2$, $CF_2$=CFCF$_3$, $CH_2$=CFCF$_3$, $CH_2$=CHCF$_3$, CHF=CHCF$_3$ (E-form), and CHF=CHCF$_3$ (Z-form).

Among these, from the viewpoint of good copolymerizability, at least one selected from the group consisting of tetrafluoroethylene ($CF_2=CF_2$), chlorotrifluoroethylene ($CF_2=CFCl$), and vinylidene fluoride ($CH_2=CF_2$) is preferable, and tetrafluoroethylene is more preferable. Accordingly, the polymerization unit based on the further monomer is preferably a polymerization unit based on tetrafluoroethylene. The polymerization unit based on a further monomer may be the same or different at each occurrence, and the polymer (I) may contain a polymerization unit based on two or more different further monomers.

Examples of the further monomer include a monomer represented by the general formula (n1-2):

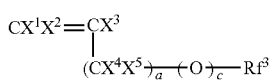  (n1-2)

wherein $X^1$ and $X^2$ are the same or different and H or F; $X^3$ is H, F, Cl, $CH_3$, or $CF_3$; $X^4$ and $X^5$ are the same or different and H or F; a and c are the same or different and 0 or 1; and $Rf^3$ is a fluorine-containing alkyl group having 1 to 40 carbon atoms or a fluorine-containing alkyl group having 2 to 100 carbon atoms and having an ether bond.

Specifically, preferable examples include $CH_2=CFCF_2-O-Rf^3$, $CF_2=CF-O-Rf^3$, $CF_2=CFCF_2-O-Rf^3$, $CF_2=CF-Rf^3$, $CH_2=CH-Rf^3$, and $CH_2=CH-O-Rf^3$ (wherein $Rf^3$ is as in the above formula (n1-2)).

Examples of the further monomer also include a fluorine-containing acrylate monomer represented by the formula (n2-1):

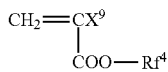  (n2-1)

wherein $X^9$ is H, F, or $CH_3$; and $Rf^4$ is a fluorine-containing alkyl group having 1 to 40 carbon atoms or a fluorine-containing alkyl group having 2 to 100 carbon atoms and having an ether bond. Examples of the $Rf^4$ group include:

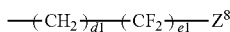

wherein $Z^8$ is H, F or Cl; d1 is an integer of 1 to 4; and e1 is an integer of 1 to 10;

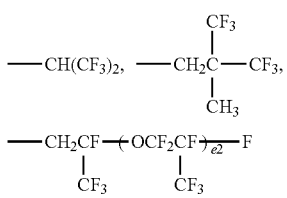

wherein e2 is an integer of 1 to 5; and

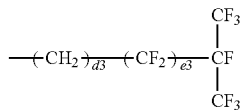

wherein d3 is an integer of 1 to 4; and e3 is an integer of 1 to 10.

Examples of the further monomer also include a fluorine-containing vinyl ether represented by the formula (n2-2):

$$CH_2=CHO-Rf^5 \quad (n2-2)$$

wherein $Rf^5$ is a fluorine-containing alkyl group having 1 to 40 carbon atoms or a fluorine-containing alkyl group having 2 to 100 carbon atoms and having an ether bond.

Specifically, preferable examples of the monomer represented by the general formula (n2-2) include:

wherein $Z^9$ is H or F; and e4 is an integer of 1 to 10;

wherein e5 is an integer of 1 to 10; and

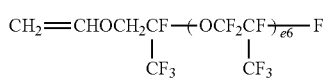

wherein e6 is an integer of 1 to 10.

More specific examples thereof include:

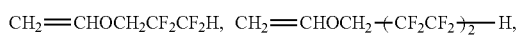
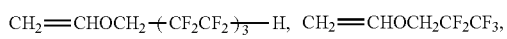
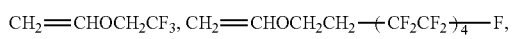
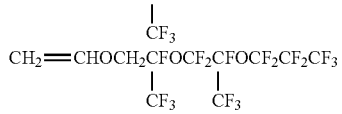

and the like.

In addition, examples also include a fluorine-containing allyl ether represented by the general formula (n2-3):

$$CH_2=CHCH_2O-Rf^6 \quad (n2-3)$$

wherein $Rf^6$ is a fluorine-containing alkyl group having 1 to 40 carbon atoms or a fluorine-containing alkyl group having 2 to 100 carbon atoms and having an ether bond; and a fluorine-containing vinyl monomer represented by the general formula (n2-4):

$$CH_2=CH-Rf^7 \quad (n2-4)$$

wherein $Rf^7$ is a fluorine-containing alkyl group having 1 to 40 carbon atoms or a fluorine-containing alkyl group having 2 to 100 carbon atoms and having an ether bond.

Specific examples of monomers represented by formulas (n2-3) and (n2-4) include monomers such as:

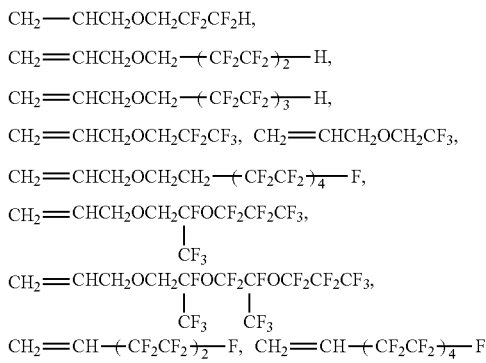

and the like.

The polymer (I) usually has a terminal group. The terminal group is a terminal group generated during polymerization, and a representative terminal group is independently selected from hydrogen, iodine, bromine, a linear or branched alkyl group, and a linear or branched fluoroalkyl group, and, additionally, may optionally contain at least one catenary heteroatom. The alkyl group or fluoroalkyl group preferably has 1 to 20 carbon atoms. These terminal groups are, in general, produced from an initiator or a chain transfer agent used to form the polymer (I) or produced during a chain transfer reaction.

The content of the polymerization unit (I) in the polymer (I) is preferably 1.0 mol % or more, more preferably 3.0 mol % or more, still more preferably 5.0 mol % or more, further preferably 10 mol % or more, still further preferably 20 mol % or more, and particularly preferably 30 mol % or more based on all polymerization units. The content is more preferably 40 mol % or more, still more preferably 60 mol % or more, further preferably 80 mol % or more, particularly preferably 90 mol % or more, still further preferably substantially 100 mol %, and most preferably consists of the polymerization unit (I) alone.

In the polymer (I), the content of a polymerization unit based on the further monomer copolymerizable with the monomer represented by the general formula (I) is preferably 99.0 mol % or less, more preferably 97.0 mol % or less, still more preferably 95.0 mol % or less, further preferably 90 mol % or less, still further preferably 80 mol % or less, and particularly preferably 70 mol % or less based on all polymerization units. The content thereof is more preferably 60 mol % or less, still more preferably 40 mol % or less, further preferably 20 mol % or less, particularly preferably 10 mol % or less, still further preferably substantially 0 mol %, and particularly still further preferably substantially free from a polymerization unit based on another monomer.

The number average molecular weight of the polymer (I) is preferably $0.1 \times 10^4$ or more, more preferably $0.2 \times 10^4$ or more, still more preferably $0.3 \times 10^4$ or more, further preferably $0.4 \times 10^4$ or more, still further preferably $0.5 \times 10^4$ or more, particularly preferably $1.0 \times 10^4$ or more, even more particularly preferably $3.0 \times 10^4$ or more, and most preferably $3.1 \times 10^4$ or more. The number average molecular weight of the polymer (I) is preferably $75.0 \times 10^4$ or less, more preferably $50.0 \times 10^4$ or less, still more preferably $40.0 \times 10^4$ or less, further preferably $30.0 \times 10^4$ or less, and particularly preferably $20.0 \times 10^4$ or less. The number average molecular weight, and the weight average molecular weight, are molecular weight values calculated by gel permeation chromatography (GPC) using monodisperse polystyrene as a standard. Further, when measurement by GPC is not possible, the number average molecular weight of the polymer (I) can be determined by the correlation between the number average molecular weight calculated from the number of terminal groups obtained by NMR, FT-IR, or the like, and the melt flow rate. The melt flow rate can be measured in accordance with JIS K 7210.

The lower limit of the weight average molecular weight of the polymer (I) is, in the order of preference, $0.2 \times 10^4$ or more, $0.4 \times 10^4$ or more, $0.6 \times 10^4$ or more, $0.8 \times 10^4$ or more, $1.0 \times 10^4$ or more, $2.0 \times 10^4$ or more, $5.0 \times 10^4$ or more, $10.0 \times 10^4$ or more, $15.0 \times 10^4$ or more, $20.0 \times 10^4$ or more, and $25.0 \times 10^4$ or more. The upper limit of the weight average molecular weight of the polymer (I) is, in the order of preference, $150.0 \times 10^4$ or less, $100.0 \times 10^4$ or less, $60.0 \times 10^4$ or less, $50.0 \times 10^4$ or less, and $40.0 \times 10^4$ or less.

The polymer (I) preferably has an ion exchange rate (IXR) of 53 or less. The IXR is defined as the number of carbon atoms in the polymer backbone relative to the ionic group. A precursor group that becomes ionic by hydrolysis (such as $-SO_2F$) is not regarded as an ionic group for the purpose of determining the IXR.

The IXR is preferably 0.5 or more, more preferably 1 or more, still more preferably 3 or more, further preferably 4 or more, still further preferably 5 or more, and particularly preferably 8 or more. Further, the IXR is more preferably 43 or less, still more preferably 33 or less, and particularly preferably 23 or less.

The ion exchange capacity of the polymer (I) is 0.80 meg/g or more, 1.50 meg/g or more, 1.75 meg/g or more, 2.00 meg/g or more, 2.50 meg/g or more, 2.60 meg/g or more, 3.00 meg/g or more, and 3.50 meg/g or more in the order of preference. The ion exchange capacity is the content of ionic groups (anionic groups) in the polymer (I) and can be calculated from the composition of the polymer (I).

In the polymer (I), the ionic groups (anionic groups) are typically distributed along the polymer backbone. The polymer (I) contains the polymer backbone together with a repeating side chain bonded to this backbone, and this side chain preferably has an ionic group.

The polymer (I) preferably contains an ionic group having a pKa of less than 10, more preferably less than 7. The ionic group of the polymer (I) is preferably selected from the group consisting of sulfonate, carboxylate, phosphonate, and phosphate.

The terms "sulfonate, carboxylate, phosphonate, and phosphate" are intended to refer to the respective salts or the respective acids that can form salts. A salt when used is preferably an alkali metal salt or an ammonium salt. A preferable ionic group is a sulfonate group.

The polymer (I) preferably has water-solubility. Water-solubility means the properly of being readily dissolved or dispersed in an aqueous medium. The particle size of a water-soluble polymer (I) cannot be measured by, for example, dynamic light scattering (DLS). On the other hand, the particle size of a non-water-soluble polymer (I) can be measured by, for example, dynamic light scattering (DLS).

The polymer (I) can be produced by a conventionally known method except that the above-described monomer is used.

The content of the polymer (I) in the composition is preferably 2,000 mass ppm or less, more preferably 1,500 mass ppm or less, still more preferably 1,000 mass ppm or less, particularly preferably 500 mass ppm or less, and most preferably 250 mass ppm or less based on the composition. Further, the content of the polymer (I) in the composition is preferably 0.1 mass ppm or more, and more preferably 0.5 mass ppm or more based on the composition.

The content of the polymer (I) in the composition is preferably 0.001% by mass or more, more preferably 0.005% by mass or more, still more preferably 0.01% by mass or more, particularly preferably 0.05% by mass or more, and most preferably 0.10% by mass or more based on PTFE. Further, the content of the polymer (I) in the composition is preferably 10% by mass or less, more preferably 5.0% by mass or less, still more preferably 2.0% by mass or less, particularly preferably 1.0% by mass or less, and most preferably 0.50% by mass or less based on PTFE.

Further, the content of the polymer (I) in the composition is preferably 0.30% by mass or less, more preferably 0.20% by mass or less, still more preferably 0.15% by mass or less, particularly preferably 0.10% by mass or less, and most preferably 0.05% by mass or less based on PTFE.

The content of the dimer and the trimer of the monomer represented by the general formula (I) in the composition is preferably 1.0% by mass or less, more preferably 0.1% by mass or less, still more preferably 0.01% by mass or less, particularly preferably 0.001% by mass, and most preferably 0.0001% by mass or less based on the polymer (I).

The content of the dimer and the trimer of the monomer represented by the general formula (I) in the composition can be measured by the same method as the method for measuring the content of the dimer and the trimer in the polymer (I) described below.

<Nonionic Surfactant>

The first composition and the third composition of the present disclosure contain a nonionic surfactant. The second composition of the present disclosure preferably contains a nonionic surfactant.

The nonionic surfactant is usually free from charged groups and has hydrophobic moieties that are long chain hydrocarbons. The hydrophilic moiety of the nonionic surfactant contains water-soluble functional groups such as chains of ethylene ether derived from polymerization with ethylene oxide.

Examples of the nonionic surfactant include the following.

Polyoxyethylene alkyl ether, polyoxyethylene alkyl phenyl ether, polyoxyethylene alkyl ester, sorbitan alkyl ester, polyoxyethylene sorbitan alkyl ester, glycerol ester, and derivatives thereof.

Specific examples of polyoxyethylene alkyl ethers: polyoxyethylene lauryl ether, polyoxyethylene cetyl ether, polyoxyethylene stearyl ether, polyoxyethylene oleyl ether, polyoxyethylene behenyl ether, and the like.

Specific examples of polyoxyethylene alkyl phenyl ether: polyoxyethylene nonylphenyl ether, polyoxyethylene octylphenyl ether, and the like.

Specific examples of polyoxyethylene alkyl esters: polyethylene glycol monolaurylate, polyethylene glycol monooleate, polyethylene glycol monostearate, and the like.

Specific examples of sorbitan alkyl ester: polyoxyethylene sorbitan monolaurate, polyoxyethylene sorbitan monopalmitate, polyoxyethylene sorbitan monostearate, polyoxyethylene sorbitan monooleate, and the like.

Specific examples of polyoxyethylene sorbitan alkyl ester: polyoxyethylene sorbitan monolaurate, polyoxyethylene sorbitan monopalmitate, polyoxyethylene sorbitan monostearate, and the like.

Specific examples of glycerol ester: glycerol monomyristate, glycerol monostearate, glycerol monooleate, and the like.

Specific examples of the derivatives: polyoxyethylene alkylamine, polyoxyethylene alkyl phenyl-formaldehyde condensate, and polyoxyethylene alkyl ether phosphate.

The ethers and esters may have an HLB value of 10 to 18.

Examples of nonionic surfactants include Triton X series (X15, X45, X100, etc.), Tergitol® 15-S series, and Tergitol® manufactured by Dow Chemical Company, TMN series (TMN-6, TMN-10, TMN-100, etc.), Tergitol® L series, Pluronic® R series (31R1, 17R2, 10R5, 25R4 (m to 22, n to 23), and Iconol® TDA series (TDA-6, TDA-9, TDA-10) manufactured by BASF.

The nonionic surfactant itself provides a polymerization field and can be a nucleation site by giving a large number of low-molecular-weight fluoropolymers by chain transfer of radicals in the initial stage.

The nonionic surfactant is preferably a nonionic surfactant containing no fluorine. Examples include ether-type nonionic surfactants such as polyoxyethylene alkyl phenyl ether, polyoxyethylene alkyl ether, and polyoxyethylene alkylene alkyl ether; polyoxyethylene derivatives such as ethylene oxide/propylene oxide block copolymers; ester-type nonionic surfactants such as sorbitan fatty acid esters, polyoxyethylene sorbitan fatty acid esters, polyoxyethylene sorbitol fatty acid esters, glycerin fatty acid esters, and polyoxyethylene fatty acid esters; and amine-based nonionic surfactants such as polyoxyethylene alkyl amine and alkylalkanolamide.

The hydrophobic group of the nonionic surfactant may be any of an alkylphenol group, a linear alkyl group, and a branched alkyl group.

The nonionic surfactant is preferably a nonionic surfactant represented by general formula (i):

$$R^6\text{—O—}A^1\text{-H} \quad (i)$$

wherein $R^6$ is a linear or branched primary or secondary alkyl group having 8 to 18 carbon atoms, and $A^1$ is a polyoxyalkylene chain.

In the general formula (I), the number of carbon atoms in $R^6$ is preferably 10 to 16, and more preferably 12 to 16. When the carbon number of $R^6$ is 18 or less, excellent precipitation stability of the composition is easily obtained. On the other hand, when the number of carbon atoms in $R^6$ exceeds 18, it is difficult to handle because of the high flow temperature. When $R^6$ has less than 8 carbon atoms, the surface tension of the composition becomes high, so that the permeability and wettability are likely to decrease.

The polyoxyalkylene chain may be composed of oxyethylene and oxypropylene. The polyoxyalkylene chain is preferably a polyoxyalkylene chain composed of an average repeating number of 5 to 20 oxyethylene groups and an average repeating number of 0 to 2 oxypropylene groups, and is a hydrophilic group. The number of oxyethylene units may have either a broad or narrow monomodal distribution as typically supplied, or a broader or bimodal distribution which may be obtained by blending. When the average repeating number of oxypropylene groups is more than 0, the oxyethylene groups and oxypropylene groups in the polyoxyalkylene chain may be arranged in blocks or randomly. From the viewpoint of viscosity and precipitation stability of the composition, a polyoxyalkylene chain composed of an average repeating number of 7 to 12 oxyethylene groups and an average repeating number of 0 to 2 oxypropylene groups is preferred. In particular, when $A^1$ has 0.5 to 1.5 oxypropylene groups on average, low foaming properties are good, which is preferable.

More preferably, $R^6$ is $(R')(R'')HC—$, wherein R' and R" are the same or different linear, branched, or cyclic alkyl groups, and the total amount of carbon atoms is at least 5, preferably 7 to 17. Preferably, at least one of R' and R" is a branched or cyclic hydrocarbon group.

Specific examples of the polyoxyethylene alkyl ether include $C_{13}H_{27}$—O—$(C_2H_4O)_{10}$—H, $C_{12}H_{25}$—O—$(C_2H_4O)_{10}$—H, $C_{10}H_{21}CH(CH_3)CH_2$—O—$(C_2H_4O)_9$—H, $C_{13}H_{27}$—O—$(C_2H_4O)_9$—$(CH(CH_3)CH_2O)$—H, $C_{16}H_{33}$—O—$(C_2H_4O)_{10}$—H, and $HC(C_5H_{11})(C_7H_{15})$—O—$(C_2H_4O)_9$—H. Examples of commercially available products of the polyoxyethylene alkyl ether include Genapol X080 (product name, manufactured by Clariant), NOIGEN TDS series (manufactured by DKS Co., Ltd.) exemplified by NOIGEN TDS-80 (trade name), LEOCOL TD series (manufactured by Lion Corp.) exemplified by LEOCOL TD-90 (trade name), LIONOL® TD series (manufactured by Lion Corp.), T-Det A series (manufactured by Harcros Chemicals Inc.) exemplified by T-Det A 138 (trade name), and TERGITOL® 15 S series (manufactured by The Dow Chemical Company).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all product names, manufactured by Dow Chemical Co., Ltd.).

The hydrophobic group of the nonionic surfactant may be any of an alkylphenol group, a linear alkyl group, and a branched alkyl group. Examples of the nonionic surfactant include a nonionic surfactant represented by the general formula (ii):

$$R^7—C_6H_4—O-A^2-H \quad (ii)$$

wherein $R^7$ is a linear or branched primary or secondary alkyl group having 4 to 12 carbon atoms, and $A^2$ is a polyoxyalkylene chain. Specific examples of the nonionic surfactant include Triton X-100 (trade name, manufactured by Dow Chemical Company).

Examples of the nonionic surfactant also include polyol compounds. Specific examples thereof include those described in International Publication No. WO2011/014715. Typical examples of the polyol compound include compounds having one or more sugar units as polyol unit. The sugar units may have been modified to contain at least one long chain. Examples of suitable polyol compounds containing at least one long chain moiety include alkyl glycosides, modified alkyl glycosides, sugar esters, and combinations thereof. Examples of the sugars include, but are not limited to, monosaccharides, oligosaccharides, and sorbitanes. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as the polyol compound include cyclic compounds containing a 5-membered ring of four carbon atoms and one heteroatom (typically oxygen or sulfur, preferably oxygen atom), or cyclic compounds containing a 6-membered ring of five carbon atoms and one heteroatom as described above, preferably, an oxygen atom. These further contain at least two or at least three hydroxy groups (—OH groups) bonded to the carbon ring atoms. Typically, the sugars have been modified in that one or more of the hydrogen atoms of a hydroxy group (and/or hydroxyalkyl group) bonded to the carbon ring atoms has been substituted by the long chain residues such that an ether or ester bond is created between the long chain residue and the sugar moiety. The sugar-based polyol may contain a single sugar unit or a plurality of sugar units. The single sugar unit or the plurality of sugar units may be modified with long chain moieties as described above. Specific examples of sugar-based polyol compound include glycosides, sugar esters, sorbitan esters, and mixtures and combinations thereof.

A preferred type of polyol compounds are alkyl or modified alkyl glucosides. These type of surfactants contains at least one glucose moiety. Examples of alkyl or modified alkyl glucosides include compounds represented by the formula:

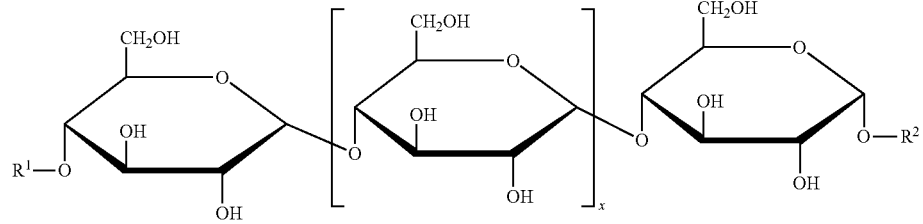

wherein x represents 0, 1, 2, 3, 4, or 5 and $R^1$ and $R^2$ each independently represent H or a long chain unit containing at least 6 carbon atoms, with the proviso that at least one of $R^1$ or $R^2$ is not H. Typical examples of $R^1$ and $R^2$ include aliphatic alcohol residues. Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. It is understood that the above formula represents specific examples of alkyl poly glucosides showing glucose in its pyranose form but other sugars or the same sugars but in different enantiomeric or diastereomeric forms may also be used.

Alkyl glucosides are available, for example, by acid-catalyzed reactions of glucose, starch, or n-butyl glucoside with aliphatic alcohols which typically yields a mixture of various alkyl glucosides (Alkyl polygylcoside, Rompp, Lexikon Chemie, Version 2.0, Stuttgart/New York, Georg Thieme Verlag, 1999). Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLU-COPON or DISPONIL from Cognis GmbH, Dusseldorf, Germany.

Examples of other nonionic surfactants include bifunctional block copolymers supplied from BASF as Pluronic® R series and tridecyl alcohol alkoxylates supplied from BASF as Iconol® TDA series.

The nonionic surfactant is preferably at least one selected from the group consisting of a nonionic surfactant represented by the general formula (i) and a nonionic surfactant represented by the general formula (ii), and more preferably a nonionic surfactant represented by the general formula (i).

Preferably, the nonionic surfactant does not contain an aromatic moiety.

The content of the nonionic surfactant in the composition is 1.0% by mass or more, preferably 1.5% by mass or more, more preferably 2.0% by mass or more, still more preferably 2.5% by mass or more, particularly preferably 3.0% by mass or more, and most preferably 4.0% by mass or more based on PTFE. Further, the content of the nonionic surfactant in the composition is preferably 40% by mass or less, more preferably 30% by mass or less, still more preferably 20% by mass or less, particularly preferably 15% by mass or less, and most preferably 12% by mass or less based on PTFE.

<Aqueous Medium>

The compositions of the present disclosure contain an aqueous medium. The aqueous medium means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

<Anionic Hydrocarbon Surfactant>

In one embodiment, the composition of the present disclosure contains an anionic hydrocarbon surfactant. By using the anionic hydrocarbon surfactant, it is possible to appropriately adjust the viscosity of the composition and improve the miscibility of the pigment, the filler, and the like while maintaining the excellent precipitation stability of the composition.

In another embodiment, the composition of the present disclosure is substantially free from an anionic hydrocarbon surfactant. The composition of the present disclosure is excellent in precipitation stability even when it is substantially free from an anionic hydrocarbon surfactant.

The expression "substantially free from an anionic hydrocarbon surfactant" as used herein means that the amount of the anionic hydrocarbon surfactant in the composition is 10 mass ppm or less, preferably 1 mass ppm or less, more preferably 100 mass ppb or less, still more preferably 10 mass ppb or less, and further preferably 1 mass ppb or less.

Anionic hydrocarbon surfactants usually have a hydrophilic moiety such as a carboxylate, a sulfonate or a sulfate and a hydrophobic moiety that is a long chain hydrocarbon moiety such as alkyl.

Examples of the anionic hydrocarbon surfactant include Versatic® 10 manufactured by Resolution Performance Products, and Avanel S series (S-70, S-74, etc.) manufactured by BASF.

Examples of the anionic hydrocarbon surfactant include an anionic surfactant represented by R-L-M, wherein R is a linear or branched alkyl group having one or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; L is $-ArSO_3^-$, $-SO_3^-$, $-SO_4-$, $-PO_3^-$ or $COO^-$, and, M is, H, a metal atom, $NR^5_4$, imidazolium optionally having a substituent, pyridinium optionally having a substituent, or phosphonium optionally having a substituent, wherein $R^5$ is H or an organic group, and $-ArSO_3^-$ is an aryl sulfonate.

Specific examples thereof include a compound represented by $CH_3-(CH_2)_n-L-M$, wherein n is an integer of 6 to 17, as represented by lauryl acid and lauryl sulfate, and L and M are the same as described above. Mixtures of those in which R is an alkyl group having 12 to 16 carbon atoms and L-M is sulfate can also be used.

Further, examples of the anionic hydrocarbon surfactant include an anionic surfactant represented by $R^6(-L-M)_2$, wherein $R^6$ is a linear or branched alkylene group having one or more carbon atoms and optionally having a substituent, or a cyclic alkylene group having 3 or more carbon atoms and optionally having a substituent, and optionally contains a monovalent or divalent heterocycle or optionally foams a ring when having 3 or more carbon atoms; L is $-ArSO_3^-$, $-SO_3^-$, $-SO_4-$, $-PO_3^-$ or $COO^-$, and, M is, H, a metal atom, $NR^5_4$, imidazolium optionally having a substituent, pyridinium optionally having a substituent, or phosphonium optionally having a substituent, wherein $R^5$ is H or an organic group, and $-ArSO_3^-$ is an aryl sulfonate.

Further, examples of the anionic hydrocarbon surfactant include an anionic surfactant represented by $R^7(-L-M)_3$, wherein $R^7$ is a linear or branched alkylidine group having one or more carbon atoms and optionally having a substituent, or a cyclic alkylidine group having 3 or more carbon atoms and optionally having a substituent, and optionally contains a monovalent or divalent heterocycle or optionally forms a ring when having 3 or more carbon atoms; L is $-ArSO_3^-$, $-SO_3^-$, $-SO_4-$, $-PO_3^-$ or $COO^-$, and, M is, H, a metal atom, $NR^5_4$, imidazolium optionally having a substituent, pyridinium optionally having a substituent, or phosphonium optionally having a substituent, $R^5$ is H or an organic group; and $-ArSO_3^-$ is an aryl sulfonate.

Further, examples of the anionic hydrocarbon surfactant include a siloxane hydrocarbon surfactant. Examples of the siloxane hydrocarbon surfactant include those described in Silicone Surfactants, R. M. Hill, Marcel Dekker, Inc., ISBN: 0-8247-00104. The structure of the siloxane hydrocarbon surfactant includes defined hydrophobic and hydrophilic moieties. The hydrophobic moiety contains one or more dihydrocarbyl siloxane units, where the substituents on the silicone atoms are completely hydrocarbon. In the sense that the carbon atoms of the hydrocarbyl groups are fully substituted with hydrogen atoms where they can be substituted by halogen such as fluorine, these siloxane surfactants can also be regarded as hydrocarbon surfactants, i.e. the monovalent substituents on the carbon atoms of the hydrocarbyl groups are hydrogen.

The hydrophilic moiety of the siloxane hydrocarbon surfactant may contain one or more polar moieties including ionic groups such as sulfate, sulfonate, phosphonate, phosphate ester, carboxylate, carbonate, sulfosuccinate, taurate (as the free acid, a salt or an ester), phosphine oxides, betaine, betaine copolyol, or quaternary ammonium salts. Ionic hydrophobic moieties may also contain ionically functionalized siloxane grafts. Examples of such siloxane hydrocarbon surfactants include polydimethylsiloxane-graft-(meth)acrylic acid salts, polydimethylsiloxane-graft-polyacrylate salts, and polydimethylsiloxane-grafted quaternary amines. The polar moieties of the hydrophilic moiety of the siloxane hydrocarbon surfactant may contain nonionic groups formed by polyethers, such as polyethylene oxide (PEO), and mixed polyethylene oxide/polypropylene oxide polyethers (PEO/PPO); mono- and disaccharides; and water-soluble heterocycles such as pyrrolidinone. The ratio of ethylene oxide to propylene oxide (EO/PO) may be varied in mixed polyethylene oxide/propylene oxide polyethers.

The hydrophilic moiety of the siloxane hydrocarbon surfactant may also contain a combination of ionic and nonionic moieties. Such moieties include, for example, ionically end-functionalized or randomly functionalized polyether or polyol. Preferred for the practice of the present disclosure is a siloxane having a nonionic moiety, i.e., a nonionic siloxane surfactant.

The arrangement of the hydrophobic and hydrophilic moieties of the structure of a siloxane hydrocarbon surfactant may take the form of a diblock polymer (AB), triblock polymer (ABA), wherein the "B" represents the siloxane portion of the molecule, or a multi-block polymer. Alternatively, the siloxane surfactant may include a graft polymer.

The siloxane hydrocarbon surfactants also include those disclosed in U.S. Pat. No. 6,841,616.

Examples of the siloxane-based anionic hydrocarbon surfactant include Noveon® by Lubrizol Advanced Materials, Inc. and SilSense™ PE-100 silicone and SilSense™ CA-1 silicone available from Consumer Specialties.

Examples of the anionic hydrocarbon surfactant also include a sulfosuccinate surfactant Lankropol® K8300 by Akzo Nobel Surface Chemistry LLC. Examples of the sulfosuccinate surfactant include sodium diisodecyl sulfosuccinate (Emulsogen® SB10 by Clariant) and sodium diisotridecyl sulfosuccinate (Polirol® TR/LNA by Cesapinia Chemicals).

Examples of the anionic hydrocarbon surfactants also include PolyFox® surfactants by Omnova Solutions, Inc. (PolyFox™ PF-156A, PolyFox™ PF-136A, etc.).

The anionic hydrocarbon surfactant includes a compound (α) represented by the general formula (α):

$$R^{10}\text{—COOM} \quad (\alpha)$$

wherein $R^{10}$ is a monovalent organic group containing one or more carbon atoms; and M is H, a metal atom, $NR^{11}_4$, imidazolium optionally having a substituent, pyridinium optionally having a substituent, or phosphonium optionally having a substituent, wherein $R^{11}$ is H or an organic group and may be the same or different. $R^{11}$ is preferably H or a $C_{1-10}$ organic group, and more preferably H or a $C_{1-4}$ organic group. From the viewpoint of surfactant function, the number of carbon atoms in $R^{10}$ is preferably 2 or more, and more preferably 3 or more. From the viewpoint of water-solubility, the number of carbon atoms in $R^{10}$ is preferably 29 or less, and more preferably 23 or less. Examples of the metal atom as M include alkali metals (Group 1) and alkaline earth metals (Group 2), and preferred is Na, K, or Li. M is preferably H, a metal atom, or $NR^{11}_4$, more preferably H, an alkali metal (Group 1), an alkaline earth metal (Group 2), or $NR^{11}_4$, still more preferably H, Na, K, Li, or $NH_4$, further preferably Na, K, or $NH_4$, particularly preferably Na or $NH_4$, and most preferably $NH_4$.

Examples of the compound (α) include an anionic surfactant represented by $R^{12}$—COOM, wherein $R^{12}$ is a linear or branched, alkyl group, alkenyl group, alkylene group, or alkenylene group having 1 or more carbon atoms and optionally having a substituent, or a cyclic alkyl group, alkenyl group, alkylene group, or alkenylene group having 3 or more carbon atoms and optionally having a substituent, each of which optionally contains an ether bond; when having 3 or more carbon atoms, $R^{12}$ optionally contains a monovalent or divalent heterocycle, or optionally forms a ring; and M is as described above. Specific examples thereof include a compound represented by  $CH_3$—$(CH_2)_n$—COOM, wherein n is an integer of 2 to 28, and M is as described above.

From the viewpoint of emulsion stability, the compound (α) may be preferably free from a carbonyl group which is not in a carboxyl group. Preferable examples of the hydrocarbon-containing surfactant free from a carbonyl group include a compound of the following formula (A): R—COO-M (A) wherein R is an alkyl group, an alkenyl group, an alkylene group, or an alkenylene group, each of which optionally contains an ether bond; M is H, a metal atom, $NR^{11}_4$, imidazolium optionally having a substituent, pyridinium optionally having a substituent, or phosphonium optionally having a substituent; and $R^{11}$ is the same or different and is H or an organic group having 1 to 10 carbon atoms. In the formula R is preferably an alkyl group or an alkenyl group, each of which optionally contains an ether group. The alkyl group or alkenyl group for R may be linear or branched. The number of carbon atoms in R is, but is not limited to, 2 to 29.

When the alkyl group is linear, the number of carbon atoms in R is preferably 3 to 29, and more preferably 5 to 23. When the alkyl group is branched, the number of carbon atoms in R is preferably 5 to 35, and more preferably 11 to 23. When the alkenyl group is linear, the number of carbon atoms in R is preferably 2 to 29, and more preferably 9 to 23. When the alkenyl group is branched, the number of carbon atoms in R is preferably 2 to 29, and more preferably 9 to 23.

Examples of the alkyl group and the alkenyl group include a methyl group, an ethyl group, an isobutyl group, a t-butyl group, and a vinyl group.

Further, the anionic hydrocarbon surfactant may also be a carboxylic acid-type hydrocarbon surfactant. Examples of the carboxylic acid-type hydrocarbon surfactant include butylic acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienoic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, boseopentaenoic acid, eicosapentaenoic acid, osbond acid, sardine acid, tetracosapentaenoic acid, docosahexaenoic acid, nisinic acid, and salts thereof. Particularly, preferred is at least one selected from the group consisting of lauric acid, capric acid, myristic acid, pentadecylic acid, palmitic acid, and salts thereof. Examples of the salts include, but are not limited to, those in which hydrogen of the carboxyl group is a metal atom, $NR^{11}_4$, imidazolium optionally having a substituent, pyridinium optionally having a substituent, or phosphonium optionally having a substituent as M in the formula described above.

Further, the anionic hydrocarbon surfactants may be, for example, anionic hydrocarbon surfactants disclosed in International Publication No. WO2013/146950 and International Publication No. WO2013/146947. Examples thereof include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may contain a hetero atom such as oxygen, nitrogen, or sulfur.

Examples of the anionic hydrocarbon-based surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferred are alkyl sulfonates, alkyl sulfates, and aliphatic carboxylic acids, or salts thereof.

Preferable examples of the alkyl sulfates or salts thereof include ammonium lauryl sulfate and sodium lauryl sulfate.

Preferable examples of the aliphatic carboxylic acids or salts thereof include succinic acid, decanoic acid, undecanoic acid, undecenoic acid, lauric acid, hydrododecanoic acid, or salts thereof.

The content of the anionic hydrocarbon surfactant in the composition is preferably 10 to 5000 mass ppm, more preferably 50 to 5000 mass ppm, still more preferably 50 to 3000 mass ppm, and particularly preferably 50 to 2000 mass ppm, based on PTE. By setting the content of the anionic hydrocarbon surfactant within the above range, it is possible to appropriately adjust the viscosity of the composition and improve the miscibility of the pigment, the filler, and the like.

<Other Components>

The compositions of the present disclosure may contain other components. Examples of the other components include preservatives. Since the composition contains a preservative, even when the composition is stored for a long period of time, the decomposition of the composition and the growth of bacteria can be suppressed while the precipitation of PTFE is suppressed.

Examples of the preservative include isothiazolones, azoles, pronopol, chlorothalonil, methylsulfonyltetrachloropyrrolidine, carbendazim, fluoroforbet, sodium diacetate, and diiodomethyl p-tolylsulfone.

The content of the preservative in the composition is preferably 0.01 to 0.5% by mass and more preferably 0.05 to 0.2% by mass based on PTFE.

Examples of the other components further include water soluble polymer compounds. Examples of the water soluble polymer compound include methyl cellulose, alumina sol, polyvinyl alcohol, carboxylated vinyl polymer, polyethylene oxide (dispersion stabilizer), polyethylene glycol (dispersion stabilizer), polyvinylpyrrolidone (dispersion stabilizer), phenol resin, urea resin, epoxy resin, melamine resin, polyester resin, polyether resin, acrylic silicone resin, silicone resin, silicone polyester resin, and polyurethane resin.

<Fluorine-Containing Surfactant>

In one embodiment, the composition of the present disclosure contains a fluorine-containing surfactant. By using the fluorine-containing surfactant, it is possible to appropriately adjust the viscosity of the composition and improve the miscibility of the pigment, the filler, and the like while maintaining the excellent precipitation stability of the composition.

In another embodiment, the composition of the present disclosure is substantially free from a fluorine-containing surfactant. The composition of the present disclosure is excellent in precipitation stability even when it is substantially free from a fluorine-containing surfactant.

In the present disclosure, "substantially free from a fluorine-containing surfactant" means that the content of the fluorine-containing surfactant in the composition is 10 mass ppm or less, preferably 1 mass ppm or less, more preferably 100 mass ppb or less, still more preferably 10 mass ppb or less, further more preferably 1 mass ppb or less, and particularly preferably equal to or less than the detection limit as measured by liquid chromatography-mass spectrometry (LC/MS/MS).

In another embodiment, the composition of the present disclosure is substantially free from an anionic fluorine-containing surfactant. The composition of the present disclosure is excellent in precipitation stability even when it is substantially free from an anionic fluorine-containing surfactant.

In the present disclosure, "substantially free from an anionic fluorine-containing surfactant" means that the content of the anionic fluorine-containing surfactant in the composition is 10 mass ppm or less, preferably 1 mass ppm or less, more preferably 100 mass ppb or less, still more preferably 10 mass ppb or less, further more preferably 1 mass ppb or less, and particularly preferably equal to or less than the detection limit as measured by liquid chromatography-mass spectrometry (LC/MS/MS).

In another embodiment, the composition of the present disclosure is substantially free from an anionic surfactant containing fluorine having an anionic moiety having a molecular weight of 800 or less. The composition of the present disclosure is excellent in precipitation stability even when it is substantially free from an anionic surfactant containing fluorine having an anionic moiety having a molecular weight of 800 or less.

In the present disclosure, "substantially free from an anionic surfactant containing fluorine having an anionic moiety having a molecular weight of 800 or less" means that the content of the anionic surfactant containing fluorine having an anionic moiety having a molecular weight of 800 or less in the composition is 10 mass ppm or less, preferably 1 mass ppm or less, more preferably 100 mass ppb or less, still more preferably 10 mass ppb or less, further more preferably 1 mass ppb or less, and particularly preferably equal to or less than the detection limit as measured by liquid chromatography-mass spectrometry (LC/MS/MS).

The content of the fluorine-containing surfactant can be determined by a known method. For example, it can be determined by LC/MS/MS analysis. First, the composition is extracted into an organic solvent of methanol, and the extract liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The composition is subjected to Soxhlet extraction with methanol, and the extracted liquid is subjected to LC/MS/MS analysis for quantitative measurement.

That is, the content of the fluorine-containing surfactant can be measured, for example, by adding methanol to the composition to perform extraction, and subjecting the obtained extracted liquid to LC/MS/MS analysis.

In order to further improve the extraction efficiency, treatment by Soxhlet extraction, ultrasonic treatment or the like may be performed.

From the obtained LC/MS/MS spectrum, the molecular weight information is extracted to confirm agreement with the structural formula of the candidate fluorine-containing surfactant.

Thereafter, aqueous solutions having five or more different content levels of the confirmed fluorine-containing surfactant are prepared, and LC/MS/MS analysis of the aqueous solution of each content is performed, and the relationship between the content and the area for the content is plotted, and a calibration curve is drawn.

Then, using the calibration curve, the area of the LC/MS/MS chromatogram of the fluorine-containing surfactant in the extract can be converged into the content of the fluorine-containing surfactant.

Examples of the fluorine-containing surfactant include anionic fluorine-containing surfactants. The anionic fluorine-containing surfactant may be, for example, a fluorine atom-containing surfactant having 20 or less carbon atoms in total in the portion excluding the anionic group.

Further, the fluorine-containing surfactant may also be a fluorine-containing surfactant having an anionic moiety having a molecular weight of 800 or less. The "anionic moiety" means the portion of the fluorine-containing surfactant excluding the cation. For example, in the case of $F(CF_2)_{n1}COOM$ represented by the formula (I) described later, the anionic moiety is the "$F(CF_2)_{n1}COO$" portion.

Examples of the fluorine-containing surfactant include fluorine-containing surfactants having a Log POW of 3.5 or less. The Log POW is a partition coefficient between 1-octanol and water, which is represented by Log P (wherein P is the ratio between the concentration of the fluorine-containing surfactant in octanol and the concentration of the fluorine-containing surfactant in water in a phase-separated octanol/water (1:1) liquid mixture containing the fluorine-containing surfactant). Log POW is determined as follows. Specifically, HPLC is performed on standard substances (heptanoic acid, octanoic acid, nonanoic acid, and decanoic acid) each having a known octanol/water partition coefficient using TOSOH ODS-120T (φ4.6 mm×250 mm, manufactured by Tosoh Corp.) as a column and acetonitrile/0.6% by mass $HClO_4$ aqueous solution (=1/1 (vol/vol %)) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO 2005/042593, International Publication No. WO 2008/060461, International Publication No. WO 2007/046377, International Publication No. WO 2007/119526, International Publication No. WO 2007/046482, International Publication No. WO 2007/046345, U.S. Patent Application Publication No. 2014/0228531, International Publication No. WO 2013/189824, and International Publication No. WO 2013/189826.

Examples of the anionic fluorine-containing surfactant include a compound represented by the general formula ($N^0$):

$$X^{n0}\text{—}Rf^{n0}\text{—}Y^0 \qquad (N^0)$$

wherein $X^{n0}$ is H, Cl, or F; $Rf^{n0}$ is a linear, branched, or cyclic alkylene group having 3 to 20 carbon atoms in which some or all of Hs are replaced by F; the alkylene group may contain one or more ether bonds, and some Hs may be replaced by Cl; and $Y^0$ is an anionic group.

The anionic group $Y^0$ may be —COOM, —$SO_2$M, or —$SO_3$M, and may be —COOM or —$SO_3$M. M is H, a metal atom, $NR^7_4$, imidazolium optionally having a substituent, pyridinium optionally having a substituent, or phosphonium optionally having a substituent, and $R^7$ is H or an organic group. Examples of the metal atom include alkali metals (Group 1) and alkaline earth metals (Group 2), such as Na, K, or Li. $R^7$ may be H or a $C_{1-10}$ organic group, may be H or a $C_{1-4}$ organic group, and may be H or a $C_{1-4}$ alkyl group. M may be H, a metal atom, or $NR^7_4$, may be H, an alkali metal (Group 1), an alkaline earth metal (Group 2), or $NR^7_4$, and may be H, Na, K, Li, or $NH_4$. $Rf^{n0}$ may be one in which 50% or more of H has been replaced by fluorine.

Examples of the compound represented by the general formula) ($N^0$) include:

a compound represented by the general formula ($N^1$):

$$X^{n0}\text{—}(CF_2)_{m1}\text{—}Y^0 \qquad (N^1)$$

wherein $X^{n0}$ is H, Cl, and F; m1 is an integer of 3 to 15; and $Y^0$ is as defined above;

a compound represented by the general formula ($N^2$):

$$Rf^{n1}\text{—}O\text{—}(CF(CF_3)CF_2O)_{m2}CFX^{n1}\text{—}Y^0 \qquad (N^2)$$

wherein $Rf^{n1}$ is a perfluoroalkyl group having 1 to 5 carbon atoms; m2 is an integer of 0 to 3; $X^{n1}$ is F or $CF_3$; and $Y^0$ is as defined above;

a compound represented by the general formula ($N^3$):

$$Rf^{n2}(CH_2)_{m3}\text{—}(Rf^{n3})_q\text{-}Y^0 \qquad (N^3)$$

wherein $Rf^{n2}$ is a partially or fully fluorinated alkyl group having 1 to 13 carbon atoms and optionally containing an ether bond; m3 is an integer of 1 to 3; $Rf^{n3}$ is a linear or branched perfluoroalkylene group having 1 to 3 carbon atoms; q is 0 or 1; and $Y^0$ is as defined above;

a compound represented by the general formula ($N^4$):

$$Rf^{n4}\text{—}O\text{—}(CY^{n1}Y^{n2})_pCF_2\text{—}Y^0 \qquad (N^4)$$

wherein $Rf^{n4}$ is a linear or branched partially or fully fluorinated alkyl group having 1 to 12 carbon atoms and optionally containing an ether bond and/or a chlorine atom; and $Y^{n1}$ and $Y^{n2}$ are the same or different and are each H or F; p is 0 or 1; and $Y^0$ is as defined above; and a compound represented by the general formula ($N^5$):

wherein $X^{n2}$, $X^{n3}$, and $X^{n4}$ may be the same or different and are each H, F, or a linear or branched partial or fully fluorinated alkyl group having 1 to 6 carbon atoms and optionally containing an ether bond; $Rf^{n5}$ is a linear or branched partially or fully fluorinated alkylene group having 1 to 3 carbon atoms and optionally containing an ether bond; L is a linking group; and $Y^0$ is as defined above, with the proviso that the total carbon number of $X^{n2}$, $X^{n3}$, $X^{n4}$, and $Rf^{n5}$ is 18 or less.

Examples of the compound represented by the general formula) ($N^0$) include a perfluorocarboxylic acid (I) represented by the general formula (I), an ω-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω-H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XIII) represented by the following general formula (XIII).

The perfluorocarboxylic acid (I) is represented by the general formula (I):

$$F(CF_2)_{n1}COOM \qquad (I)$$

wherein n1 is an integer of 3 to 14; and M is H, a metal atom, $NR^7_4$, imidazolium optionally having a substituent, pyridinium optionally having a substituent, or phosphonium optionally having a substituent, and $R^7$ is H or an organic group.

The ω-H perfluorocarboxylic acid (II) is represented by the general formula (II):

$$H(CF_2)_{n2}COOM \qquad (II)$$

wherein n2 is an integer of 4 to 15; and M is as defined above.

The perfluoropolyethercarboxylic acid (III) is represented by the general formula (III):

$$Rf^1-O-(CF(CF_3)CF_2O)_{n3}CF(CF_3)COOM \qquad (III)$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the general formula (IV):

$$Rf^2(CH_2)_{n4}Rf^3COOM \qquad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the general formula (V):

$$Rf^4-O-CY^1Y^2CF_2-COOM \qquad (V)$$

wherein $Rf^4$ is a linear or branched partially or fully fluorinated alkyl group having 1 to 12 carbon atoms and optionally containing an ether bond and/or a chlorine atom; $Y^1$ and $Y^2$ are the same or different and are each H or F; and M is as defined above.

The perfluoroalkylsulfonic acid (VI) is represented by the general formula (VI):

$$F(CF_2)_{n5}SO_3M \qquad (VI)$$

wherein n5 is an integer of 3 to 14; and M is as defined above.

The ω-H perfluorosulfonic acid (VII) is represented by the general formula (VII):

$$H(CF_2)_{n6}SO_3M \qquad (VII)$$

wherein n6 is an integer of 4 to 14; and M is as defined above.

The perfluoroalkylalkylenesulfonic acid (VIII) is represented by the general formula (VIII):

$$Rf^5(CH_2)_{n7}SO_3M \qquad (VIII)$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the general formula (IX):

$$Rf^6(CH_2)_{n8}COOM \qquad (IX)$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the general formula (X):

$$Rf^7-O-Rf^8-O-CF_2-COOM \qquad (X)$$

wherein $Rf^7$ is a linear or branched partially or fully fluorinated alkyl group having 1 to 6 carbon atoms and optionally containing an ether bond and/or a chlorine atom; $Rf^8$ is a linear or branched partially or fully fluorinated alkyl group having 1 to 6 carbon atoms; and M is as defined above.

The alkoxyfluorosulfonic acid (XI) is represented by the general formula (XI):

$$Rf^9-O-CY^1Y^2CF_2-SO_3M \qquad (XI)$$

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the general formula (XII):

wherein $X^1$, $X^2$, and $X^3$ may be the same or different and are H, F, or a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group. $Y^0$ may be —COOM, —SO$_2$M, or —SO$_3$M, and may be —SO$_3$M or COOM, wherein M is as defined above. Examples of L include a single bond, and a partially or fully fluorinated alkylene group having 1 to 10 carbon atoms and optionally containing an ether bond.

The compound (XIII) is represented by the following general formula (XIII):

$$Rf^{11}-O-(CF_2CF(CF_3)O)_{n9}(CF_2O)_{n10}CF_2COOM \qquad (XIII)$$

wherein $Rf^{11}$ is a fluoroalkyl group having 1 to 5 carbon atoms containing chlorine, n9 is an integer of 0 to 3, n10 is an integer of 0 to 3, and M is the same as defined above. Examples of the compound (XIII) include $CF_2ClO(CF_2CF(CF_3)O)_{n9}(CF_2O)_{n10}CF_2COONH_4$ (mixture having an average molecular weight of 750, in the formula, n9 and n10 are defined above).

Thus, examples of the anionic fluorine-containing surfactant include a carboxylic acid-based surfactant and a sulfonic acid-based surfactant.

The fluorine-containing surfactant may be one fluorine-containing surfactant, or may be a mixture containing two or more fluorine-containing surfactants.

Examples of the fluorine-containing surfactant include compounds represented by the following formulas. The fluorine-containing surfactant may be a mixture of these compounds. In one embodiment, the composition of the present disclosure is substantially free from a compound represented by the following formulas:

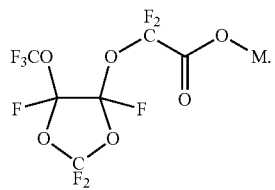

wherein M is H, a metal atom, $NR^7_4$, imidazolium optionally having a substituent, pyridinium optionally having a substituent, or phosphonium optionally having a substituent.

In the present disclosure, "substantially free from a compound represented by the above formula" means that the content of the compound represented by the above formula in the composition is, in total, 10 mass ppm or less, preferably 1 mass ppm or less, more preferably 100 mass ppb or less, still more preferably 10 mass ppb or less, further more preferably 1 mass ppb or less, and particularly preferably equal to or less than the detection limit as measured by liquid chromatography-mass spectrometry (LC/MS/MS).

The composition of the present disclosure may be used in the form of an aqueous coating material for coating by mixing with a known compounding agent such as a pigment, a thickener, a dispersant, a defoaming agent, an antifreezing agent, a film-forming aid, or by compounding another polymer compound.

Further, the composition of the present disclosure may be used for additive applications, for example, for a binder application for preventing the active material of an electrode from falling off, for a compound application such as a drip inhibitor, or for a dust suppressing treatment application for preventing floating of sand, dust, and the like.

In addition, by coating a substrate made of metal or ceramics with the composition of the present disclosure, a coating surface having non-stickiness and a low friction coefficient and excellent in gloss, smoothness, abrasion resistance, weather resistance, and heat resistance can be obtained, which is suitable for coating of rolls, cooking utensils, and the like, impregnation processing of glass cloth, and the like.

The composition of the present disclosure may also be used to prepare an organosol of PTFE. The organosol may contain the PTFE and an organic solvent, and examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone and dimethylacetamide. The organosol can be prepared, for example, by the method described in International Publication No. WO 2012/002038.

Fine powder can be produced by coagulating the composition of the present disclosure. The composition of the present disclosure can be used in various applications as a fine powder after coagulation, washing, and drying. Coagulation of the composition of the present disclosure is usually performed by diluting the polymerization dispersion obtained by polymerization with water to a PTE concentration of 5 to 20% by mass, optionally adjusting the pH to a neutral or alkaline, and stirring the polymer more vigorously than during the reaction in a vessel equipped with a stirrer. The coagulation may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. The coagulation may be continuously performed using a device such as an inline mixer.

The concentration of unaggregated PTFE in the discharge water produced by the aggregation is preferably low from the viewpoint of productivity, more preferably less than 0.4% by mass, and particularly preferably less than 0.3% by mass.

A pigment-containing or filler-containing PTFE fine powder in which pigments and fillers are uniformly mixed can be obtained by adding pigments for coloring and various fillers for improving mechanical properties before or during the coagulation.

The wet powder obtained by coagulating the composition of the present disclosure is usually dried by means of vacuum, high-frequency waves, hot air, or the like while keeping the wet powder in a state in which the wet powder is less fluidized, preferably in a stationary state. Friction between the powder particles especially at high temperature usually has unfavorable effects on the polymer in the foam of fine powder. This is because the particles made of such PTFE are easily formed into fibrils even with a small shearing force and lose its original, stable particulate structure.

The drying is performed at a drying temperature of 10 to 300° C., preferably 100 to 300° C. (preferably 100 to 250° C.).

The obtained PTFE fine powder is preferable for molding, and suitable applications include hydraulic systems such as aircraft and automobiles, fuel system tubes and the like, flexible hoses for chemicals, steam and the like, and electric wire coating applications.

The composition or PTFE fine powder of the present disclosure is also preferably used as a processing aid. When used as a processing aid, the composition or the PTFE fine powder of the present disclosure is mixed with a host polymer, for example, to improve the melt strength of the host polymer in melt fabrication and to improve the mechanical strength, electric properties, incombustibility, anti-drop performance during combustion, and slidability of the resulting polymer.

The composition or PTE fine powder of the present disclosure is also preferably used as a binder for batteries or used for dustproof applications.

The composition or the PTE fine powder of the present disclosure is also preferably combined with a resin other than PTE to form a processing aid before use. The composition or PTE fine powder of the present disclosure is suitable as a raw material of PTFE described in, for example, Japanese Patent Laid-Open No. 11-49912, U.S. Pat. No. 5,804,654, Japanese Patent Laid-Open No. 11-29679, and Japanese Patent Application Laid-Open No. 2003-2980. The processing aid using the composition or PTFE fine powder of the present disclosure is not inferior at all to the processing aids described in the above publications.

The composition of the present disclosure is also preferably mixed with an aqueous dispersion of a melt-fabricable fluororesin so that the components coagulate to form co-coagulated powder. The co-coagulated powder is suitable as a processing aid.

Examples of the melt-fabricable fluororesin include TFE/HFP copolymer (FEP), a TFE/PAVE copolymer (PFA), an ethylene/TFE copolymer (ETFE), and an ethylene/TFE/HFP copolymer (EFEP), of which is preferred.

The fluorine-free resin to which the co-coagulated powder is added may be in the foam of powder, pellets, or an emulsion. The addition is preferably performed while applying a shear force by a known method such as extrusion kneading or roll kneading from the viewpoint of sufficiently mixing each resin.

The composition of the present disclosure also preferably contains a melt-fabricable fluororesin. Examples of the melt-fabricable fluororesin include FEP, PFA, ETFE, and EFEP. The aqueous dispersion containing the melt-fabricable fluororesin can be used as a coating material. Since the melt-fabricable fluororesin can sufficiently fuse the particles of the TFE polymer to each other, the film-formability can be improved and the obtained coating film can exhibit gloss.

Examples of the applications of the composition of the present disclosure include coating achieved by applying the aqueous dispersion to a substrate, drying the dispersion, and optionally sintering the workpiece; impregnation achieved by impregnating a porous support such as nonwoven fabric or a resin molded article into the aqueous dispersion, drying the dispersion, and preferably sintering the workpiece; and casting achieved by applying the aqueous dispersion to a substrate such as glass, drying the dispersion, optionally immersing the workpiece into water to remove the substrate and to thereby provide a thin film. Examples of such applications include aqueous dispersion-type coating materials, tent membranes, conveyor belts, printed circuit boards (CCL), binders for electrodes, and water repellents for electrodes.

The composition of the present disclosure is also preferably used as a dust suppression treatment agent. The dust suppression treatment agent can be used in a method for suppressing dust of a dust-generating substance by fibrillating a polymer by mixing with a dust-generating substance and applying a compression-shearing action to the mixture at a temperature of 20 to 200° C., for example, methods disclosed in Japanese Patent No. 2827152 and Japanese Patent No. 2538783. The composition of the present disclosure can be suitably used for, for example, the dust suppression treatment agent composition described in International Publication No. WO2007/004250, and can be suitably used for the dust control treatment method described in International Publication No. WO 2007/000812.

The dust suppression treatment agent is suitably used in the fields of building-products, soil stabilizers, solidifying materials, fertilizers, landfill of incineration ash and harmful substance, explosion proof equipment, cosmetics, sands for pet excretion represented by cat sand, and the like.

The composition of the present disclosure is also preferably used as a raw material for producing TFE polymer fibers by a dispersion spinning method. The dispersion spinning method is a method in which the composition of the present disclosure and an aqueous dispersion of a matrix polymer are mixed and the mixture is extruded to form an intermediate fiber structure, and then the intermediate fiber structure is fired to decompose the matrix polymer and sinter the TFE polymer particles, thereby providing TFE polymer fibers.

When the PTFE contained in the composition of the present disclosure is high-molecular-weight PTFE, the high-molecular-weight PTFE powder obtained from the composition of the present disclosure has stretchability and non melt processability, and is also useful as a material for a stretched body (porous body). When the stretched body of the present disclosure is a film (PTFE stretched film or PTFE porous film), the stretched body can be formed by stretching by a known PTFE stretching method. Stretching allows easy formation of fibrils of high-molecular-weight PTFE, resulting in a PTFE porous body (film) including nodes and fibers. Preferably, roll-stretching a sheet-shaped or rod-shaped paste extrudate in an extruding direction can provide a uniaxially stretched film. Further stretching in a transverse direction using a tenter, for example, can provide a biaxially stretched film. Prebaking treatment is also preferably performed before stretching.

This PTFE stretched body is a porous body having a high porosity, and can suitably be used as a filter material for a variety of microfiltration filters such as air filters and chemical filters and a support member for polymer electrolyte films. The stretched body is also useful as a material of products used in the fields of textiles, of medical treatment, of electrochemistry, of sealants, of air filters, of ventilation/internal pressure adjustment, of liquid filters, and of consumer goods. The following provides examples of specific applications.

Electrochemical field: prepregs for dielectric materials, EMI-shielding materials, and heat conductive materials. More specifically, examples thereof include printed circuit boards, electromagnetic interference shielding materials, insulating heat conductive materials, and insulating materials. Sealant field: gaskets, packings, pump diaphragms, pump tubes, and sealants for aircraft.

Air filter field: ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/internal pressure adjustment field: materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

Liquid filter field: liquid filters for semiconductors (for production of semiconductors), hydrophilic PTFE filters (for production of semiconductors), filters for chemicals (for liquid chemical treatment), filters for pure water production lines (for production of pure water), and back-washing liquid filters (for treatment of industrial discharge water).

Consumer goods field: clothes, cable guides (movable wires for motorcycles), clothes for motor cyclists, cast liners (medical supporters), filters for cleaners, bagpipes (musical instrument), cables (signal cables for guitars, etc.), and strings (for string instrument).

Textile field: PTFE fibers (fiber materials), machine threads (textiles), weaving yarns (textiles), and ropes.

Medical treatment field: implants (stretched articles), artificial blood vessels, catheters, general surgical operations (tissue reinforcing materials), products for head and neck (dura mater alternatives), oral health (tissue regenerative medicine), and orthopedics (bandages).

When the PTE contained in the composition of the present disclosure is a low-molecular-weight PTFE, a low-molecular-weight PTFE powder can also be obtained from the composition of the present disclosure. The low-molecular-weight powder can also be produced by obtaining a high-molecular-weight PTFE powder from the composition of the present disclosure, and then reducing the molecular weight of the high-molecular-weight PTFE by a known method (thermal decomposition, radiation decomposition, or the like).

A low-molecular-weight PTFE having a molecular weight of 600,000 or less (also referred to as PTFE micropowder) has excellent chemical stability and a very low surface energy, and is less likely to generate fibrils, and is therefore suitably used as an additive for improving the lubricity and the texture of the coating surface in production of plastics, inks, cosmetics, coating materials, greases, parts of office automation equipment, and toners (e.g., see Japanese Patent Laid-Open No. 10-147617).

In the present disclosure, the high-molecular-weight PTFE means a non melt-processable and fibrillatable PTFE. On the other hand, the low-molecular-weight PTFE means a melt-fabricable and non-fibrillatable PTFE.

The non-melt processable means a property that the melt flow rate cannot be measured at a temperature higher than the crystal melting point, in conformity with ASTM D 1238 and D 2116.

The presence or absence of the fibrillation ability can be determined by "paste extrusion", a representative method of molding a "high-molecular-weight PTFE powder" which is a powder made from a polymer of TFE. Usually, the high-molecular-weight PTFE can be paste-extruded when it is fibrillatable. When a non-fired molded product obtained by paste extrusion shows substantially no strength or elongation (for example, when it shows an elongation of 0% and is broken when stretched), it can be regarded as non-fibrillatable.

The high-molecular-weight PTFE preferably has a standard specific gravity (SSG) of 2.130 to 2.280. The standard specific gravity is determined by the water replacement method in conformity with ASTM D 792 using a sample molded in conformity with ASTM D 4895-89. The "high-molecular-weight" in the present disclosure means that the standard specific gravity is within the above range.

The low-molecular-weight PTFE has a complex viscosity of $1\times10^2$ to $7\times10^5$ Pa·s at 380° C. The "low-molecular-weight" in the present disclosure means that the complex viscosity is within the above range.

The high-molecular-weight PTFE has a complex viscosity significantly higher than that of the low-molecular-weight PTFE, and the complex viscosity thereof is difficult to measure accurately. The complex viscosity of the low-molecular-weight PTFE is measurable, but the low-molecular-weight PTFE has difficulty in providing a molded article to be used in measurement of the standard specific gravity. Thus, it is difficult to measure its accurate standard specific gravity. Accordingly, in the present disclosure, the standard specific gravity is used as an index of the molecular weight of the high-molecular-weight PTFE, while the complex viscosity is used as an index of the molecular weight of the low-molecular-weight PTFE. It should be noted that there is no known measuring method for directly specifying the molecular weight of either the high-molecular-weight PTFE or the low-molecular-weight PTFE.

The high-molecular-weight PTE preferably has a peak temperature of 333 to 347° C., and more preferably 335 to 345° C. The low-molecular-weight PTFE preferably has a peak temperature of 322 to 333° C., and more preferably 324 to 332° C. The peak temperature is a temperature corresponding to the maximum value in the heat-of-fusion curve when PTFE having no history of being heated to a temperature of 300° C. or more is heated at a rate of 10° C./min using a differential scanning calorimeter (DSC). The peak temperature can be specified as a temperature corresponding to a maximum value appearing in a differential thermal analysis (DTA) curve obtained by raising the temperature of PTFE, which has no history of heating to a temperature of 300° C. or higher, under a condition of 10° C./min using TG-DTA (thermogravimetric-differential thermal analyzer).

Preferably, the high-molecular-weight PTFE has at least one peak in a range of 333 to 347° C. on a heat-of-fusion curve with a temperature-increasing rate of 10° C./min using a differential scanning calorimeter (DSC) for a PTE which has never been heated up to 300° C. or higher, and has an enthalpy of fusion of 62 mJ/mg or higher at 290 to 350° C. calculated from the heat-of-fusion curve.

The PTFE fine powder may also be used to produce unfired tape (green tape).

Next, the production method of the present disclosure will be specifically described.

<Method for Producing Composition>

A method for producing a composition of the present disclosure includes polymerizing a in an aqueous medium in the presence of a polymer (I) containing a polymerization unit (I) based on a monomer represented by the general formula (I) to obtain a polymerization dispersion containing a PTFE, the polymer (I) and the aqueous medium, and mixing the polymerization dispersion with a nonionic surfactant to obtain a composition containing the PTFE, the polymer (I), the nonionic surfactant, and the aqueous medium,

(I)

wherein $X^1$ and $X^3$ are each independently F, Cl, H, or $CF_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

By using the production method of the present disclosure, the composition of the present disclosure described above can be easily produced.

The polymerization temperature and the polymerization pressure in polymerizing are determined as appropriate in accordance with the types of the monomers used, the molecular weight of the target PTFE, and the reaction rate. For example, the polymerization temperature is preferably 10 to 150° C. The polymerization temperature is more preferably 30° C. or higher, and still more preferably 50° C. or higher. Further, the polymerization temperature is more preferably 120° C. or lower, and still more preferably 100° C. or lower. The polymerization pressure is preferably 0.05 to 10 MPaG. The polymerization pressure is more preferably 0.3 MPaG or more, and still more preferably 0.5 MPaG or more. The polymerization pressure is more preferably 5.0 MPaG or less, and still more preferably 3.0 MPaG or less.

The polymerization of is carried out in the presence of the polymer (I). As the polymer (I), those described above as the polymer (I) contained in the composition of the present disclosure can also be suitably used in the production method of the present disclosure.

In the polymerization, the amount of the polymer (I) at the initiation of polymerization is preferably 1 mass ppm or more based on the aqueous medium. The amount of the polymer (I) at the initiation of polymerization is preferably 10 mass ppm or more, more preferably 50 mass ppm or more, still more preferably 100 mass ppm or more, and further preferably 200 mass ppm or more. The upper limit thereof is preferably, but not limited to, 100,000 mass ppm, and more preferably 50,000 mass ppm, for example. When the amount of the polymer (I) at the initiation of polymerization is in the above range, it is possible to obtain a composition having even better precipitation stability.

It can be said that the polymerization started when the gas fluoromonomer in the reactor became PTFE and the pressure drop in the reactor occurred. U.S. Pat. No. 3,391,099 (Punderson) discloses a dispersion polymerization of in an aqueous medium comprising two separate steps of a polymerization process comprising: first the formation of a polymer nucleus as a nucleation site, and then the growth step comprising polymerization of the established particles. The polymerization is usually started when both the monomer to be polymerized and the polymerization initiator are charged in the reactor. Further, in the present disclosure, an additive related to the formation of a nucleation site is referred to as a nucleating agent.

The total amount of the polymer (I) added is preferably 0.0001 to 15% by mass based on 100% by mass of the aqueous medium. The lower limit thereof is more preferably 0.001% by mass, while the upper limit thereof is more preferably 1% by mass. Less than 0.0001% by mass of the polymer (I) may cause insufficient dispersibility. More than 15% by mass of the polymer (I) may fail to provide the effects corresponding to the amount. The amount of the polymer (I) added is appropriately determined depending on the type of monomer used, the molecular weight of the target PTFE, and the like.

The polymerization of TFE is carried out in an aqueous medium in the presence of the polymer (I). It is also preferable that the polymer (I) is continuously added to the polymer (I) during the polymerization of TFE. Continuously adding the polymer (I) means, for example, adding the polymer (I) not all at once, but adding over time and without interruption or adding in portions. By continuously adding the polymer (I), it is possible to obtain a composition having even better precipitation stability.

In the case of continuously adding the polymer (I), the amount of the polymer (I) added is preferably 0.001 to 10% by mass based on 100% by mass of the aqueous medium. The lower limit thereof is more preferably 0.005% by mass, still more preferably 0.01% by mass while the upper limit thereof is more preferably 5% by mass, still more preferably 2% by mass.

In the production method of the present disclosure, it is also preferable to polymerize and the modifying monomer. By polymerizing TFE and the modifying monomer, it is possible to obtain PTFE particles having a small particle size to thereby obtain a composition having excellent precipitation stability.

The total amount of the modifying monomer added in polymerizing is preferably 0.00001% by mass or more, more preferably 0.0001% by mass or more, still more preferably 0.001% by mass or more, and further preferably 0.005% by mass or more based on the resulting PTFE. Further, the total amount of the modifying monomer added during polymerization is 1.0% by mass or less, 0.90% by mass or less, 0.50% by mass or less, 0.40% by mass or less, 0.30% by mass or less, 0.20% by mass or less, 0.15% by mass or less, 0.10% by mass or less, and 0.05% by mass or less in the order of preference based on the resulting PTFE.

In the production method of the present disclosure, the modifying monomer that is copolymerizable with TFE is preferably added before the initiation of the polymerization reaction or before the concentration of PTFE in the polymerization dispersion reaches 10.0% by mass or preferably before the concentration reaches 5.0% by mass as the polymerization reaction proceeds. The modifying monomer is usually added to a reactor. By adding the modifying monomer at the initial stage of polymerization, a composition having a small average primary particle size and excellent precipitation stability can be obtained. The modifying monomer may be added before the initiation of the polymerization, or may be added at the same time as the initiation of the polymerization, or the modifying monomer may be added during the period in which the nuclei of PTFE particles are formed after the polymerization is initiated. The modifying monomer may be added at least before the initiation of the polymerization or before the concentration of PTFE in the polymerization dispersion reaches 10.0% by mass or less as the polymerization reaction proceeds, and the modifying monomer may be further added after the concentration of PTFE exceeds 10.0% by mass. For example, the modifying monomer may be continuously added from the time before the concentration of PTFE reaches 10.0% by mass or less and even when the concentration exceeds 10.0% by mass. Further, the modifying monomer may be added at least once before the concentration of PTFE particles reaches 10.0% by mass, and the modifying monomer may be further added at least once after the concentration exceeds 10.0% by mass. The method of adding the modifying monomer may be pushing the modifying monomer into the reactor by The amount of the modifying monomer added before the polymerization reaction is initiated or before the concentration of PTFE in the polymerization dispersion reaches 10.0% by mass or less or preferably before the concentration reaches 5.0% by mass or less as the polymerization reaction proceeds is preferably 0.00001% by mass or more, more preferably 0.0001% by mass or more, still more preferably 0.001% by mass or more, and particularly preferably 0.003% by mass or more based on the resulting PTFE. Further, the amount of the modifying monomer added before the polymerization reaction is initiated or before the concentration of PTFE in the aqueous dispersion reaches 10.0% by mass or less or preferably before the concentration reaches 5.0% by mass or less as the polymerization reaction proceeds is 1.0% by mass or less, 0.90% by mass or less, 0.50% by mass or less, 0.40% by mass or less, 0.30% by mass or less, 0.20% by mass or less, 0.15% by mass or less, 0.10% by mass or less, and 0.05% by mass or less in the order of preference based on the resulting PTFE.

As the modifying monomer, those described above as the modifying monomers constituting the PTFE contained in the composition of the present disclosure can also be suitably used in the production method of the present disclosure.

In the production method of the present disclosure, the polymerization of TFE may be terminated by adding a polymerization terminator (radical scavenger) to obtain a polymerization dispersion.

The polymerization terminator may be a compound having no reinitiation ability after addition or chain transfer to a free radical in the polymerization system. Specifically, a compound that readily undergoes a chain transfer reaction with a primary radical or propagating radical and then generates a stable radical that does not react with a monomer or a compound that readily undergoes an addition reaction with a primary radical or propagating radical to generate a stable radical is used. The activity of what is commonly referred to as a chain transfer agent is characterized by the chain transfer constant and the reinitiation efficiency, but among the chain transfer agents, those having almost 0% reinitiation efficiency are called polymerization terminators. The polymerization terminator is preferably at least one selected from the group consisting of aromatic hydroxy compounds, aromatic amines, N,N-diethylhydroxylamine, quinone compounds, terpenes, thiocyanates, and cupric chloride ($CuCl_2$). Examples of the aromatic hydroxy compound include unsubstituted phenols, polyhydric phenols, salicylic acid, m- or p-salicylic acid, gallic acid, and naphthol. Examples of the unsubstituted phenol include o-, m-, or p-nitrophenol, o-, m-, or p-aminophenol, and p-nitrosophenol. Examples of the polyhydric phenol include catechol, resorcin, hydroquinone, pyrogallol, phloroglucin, and naphthresorcinol. Examples of the aromatic amines include o-, m-, or p-phenylenediamine and benzidine. Examples of the quinone compound include hydroquinone, o-, m- or p-benzoquinone, 1,4-naphthoquinone, and alizarin. Examples of the thiocyanate include ammonium thiocyanate ($NH_4SCN$), potassium thiocyanate (KSCN), and sodium thiocyanate (NaSCN). In particular, the polymerization terminator is preferably a quinone compound, and more preferably hydroquinone.

From the viewpoint of reducing the standard specific gravity, the polymerization terminator is preferably added before 90% by mass of all tetrafluoroethylene consumed in the polymerization reaction is polymerized. More preferably, the polymerization terminator is added before 85% by mass, and still more preferably 80% by mass, of all tetrafluoroethylene consumed in the polymerization reaction is polymerized. Further, the polymerization terminator is preferably added after 5% by mass of all tetrafluoroethylene consumed in the polymerization reaction is polymerized, and more preferably after 10% by mass is polymerized. The amount of the polymerization terminator added is preferably an amount corresponding to 0.1 to 20 mass ppm and more preferably an amount corresponding to 3 to 10 mass ppm of the mass of the aqueous medium used.

In the production method of the present disclosure, it is also preferable to add a decomposer. By adding the decomposer, the concentration of a radical during polymerization can be adjusted. Examples of the decomposer include sulfite, bisulfite, bromate, diimine, oxalic acid, copper salts, and iron salts. Examples of the sulfite include sodium sulfite and ammonium sulfite. An example of the copper salt is copper (II) sulfate, and an example of the iron salt is iron(II) sulfate. The amount of the decomposer added is in the range of 25 to 300% by mass based on the amount of the oxidizing agent combined as a polymerization initiator (redox initiator described later). The amount of the decomposer added is preferably 25 to 150% by mass, and more preferably 50 to 100% by mass. Further, the decomposer is preferably added after 5% by mass of all tetrafluoroethylene consumed in the polymerization reaction is polymerized, and more preferably after 10% by mass is polymerized. The amount of the polymerization terminator added is preferably an amount corresponding to 0.1 to 20 mass ppm and more preferably an amount corresponding to 3 to 10 mass ppm of the mass of the aqueous medium used.

The polymerization of TFE can be efficiently carried out by using at least one polymer (I). Further, in the polymerization of TFE, two or more polymers (I) may be used at the same time, or a surfactant may also be used in combination as long as it is volatile or is allowed to remain in the final product.

The polymerization of may also be performed in the presence of a nucleating agent.

The nucleating agent is preferably at least one selected from the group consisting of, for example, fluoropolyether, a nonionic surfactant, and a chain transfer agent.

In addition, as the nucleating agent used in the production method of the present disclosure, a chain transfer agent is more preferable, and one or both of a chain transfer agent, a nonionic surfactant, and a fluoropolyether are further preferable, since even more particles can be generated during polymerization and primary particles having a smaller average primary particle size and aspect ratio can be obtained. When a chain transfer agent and one or both of a nonionic surfactant and fluoropolyether are used as the nucleating agent, the nucleating agent contains a combination of a chain transfer agent and a nonionic surfactant, a combination of a chain transfer agent and fluoropolyether, or a combination of a chain transfer agent, a nonionic surfactant, and fluoropolyether. In particular, the nucleating agent is preferably a combination of a chain transfer agent and a nonionic surfactant.

The fluoropolyether is preferably perfluoropolyether.

The fluoropolyether preferably has a repeating unit represented by the formulas (1a) to (1d):

$$(-CFCF_3-CF_2-O-)_n \qquad (1a)$$

$$(-CF_2-CF_2-CF_2-O-)_n \qquad (1b)$$

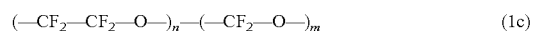

$$(-CF_2-CF_2-O-)_n-(-CF_2-O-)_m \qquad (1c)$$

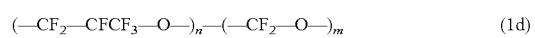

$$(-CF_2-CFCF_3-O-)_n-(-CF_2-O-)_m \qquad (1d)$$

wherein m and n are integers of 1 or more.

The fluoropolyether is preferably fluoropolyetheric acid or a salt thereof, and the fluoropolyetheric acid is preferably a carboxylic acid, a sulfonic acid, a sulfonamide, or a phosphonic acid, and more preferably a carboxylic acid. Among the fluoropolyetheric acid or a salt thereof, a salt of fluoropolyetheric acid is preferable, an ammonium salt of fluoropolyetheric acid is more preferable, and an ammonium salt of fluoropolyethercarboxylic acid is still more preferable.

The fluoropolyetheric acid or a salt thereof can have any chain structure in which oxygen atoms in the main chain of the molecule are separated by saturated fluorocarbon groups having 1 to 3 carbon atoms. Two or more types of fluorocarbon groups can be present in the molecule.

The fluoropolyether acid or its salt is preferably a compound represented by the following formula: $CF_3—CF_2—CF_2—O(—CFCF_3—CF_2—O—)_nCFCF_3—COOH$, $CF_3—CF_2—CF_2—O(—CF_2—CF_2—CF_2—O—)_n—CF_2—CF_2COOH$, or $HOOC—CF_2—O(—CF_2—CF_2—O—)_n—(—CF_2—O—)_mCF_2COOH$ (wherein m and n are the same as above) or a salt thereof.

These structures are described in J. Appl. Polymer Sci., 57, 797(1995) examined by Kasai. As disclosed herein, such fluoropolyethers can have a carboxylic acid group or a salt thereof at one end or both ends. Similarly, such fluoropolyethers may have a sulfonic acid or phosphonic acid group or a salt thereof at one end or both ends. In addition, fluoropolyethers having acid functional groups at both ends may have different groups at each end. Regarding monofunctional fluoropolyether, the other end of the molecule is usually perfluorinated, but may contain a hydrogen or chlorine atom.

Fluoropolyethers having acid groups at one or both ends have at least two ether oxygens, preferably at least four ether oxygens, and still more preferably at least six ether oxygens. Preferably, at least one fluorocarbon group separating ether oxygens, more preferably at least two of such fluorocarbon groups, has 2 or 3 carbon atoms. Still more preferably, at least 50% of the fluorocarbon groups separating ether oxygens has 2 or 3 carbon atoms. Also preferably, the fluoropolyether has at least 15 carbon atoms in total, and for example, a preferable minimum value of n or n+m in the repeating unit structure is preferably at least 5. Two or more fluoropolyethers having an acid group at one end or both ends can be used in the methods according to the present disclosure. Typically, fluoropolyethers may contain a plurality of compounds in varying proportions within the molecular weight range relative to the average molecular weight, unless special care is taken in the production of a single specific fluoropolyether compound.

The fluoropolyether preferably has a number average molecular weight of 800 g/mol or more. The fluoropolyether acid or the salt thereof preferably has a number average molecular weight of less than 6,000 g/mol, because the fluoropolyether acid or the salt thereof may be difficult to disperse in an aqueous medium. The fluoropolyether acid or the salt thereof more preferably has a number average molecular weight of 800 to 3,500 g/mol, and still more preferably 1,000 to 2,500 g/mol.

The amount of the fluoropolyether is preferably 5 to 3,000 mass ppm based on the aqueous medium, more preferably 5 to 2,000 mass ppm, still more preferably 10 mass ppm as a lower limit, and still more preferably 100 mass ppm as an upper limit.

Examples of the nonionic surfactant as the nucleating agent include the nonionic surfactant described above, and a fluorine-free nonionic surfactant is preferable. Examples include ether-type nonionic surfactants such as polyoxyethylene alkyl phenyl ether, polyoxyethylene alkyl ether, and polyoxyethylene alkylene alkyl ether; polyoxyethylene derivatives such as ethylene oxide/propylene oxide block copolymers; ester-type nonionic surfactants such as sorbitan fatty acid esters, polyoxyethylene sorbitan fatty acid esters, polyoxyethylene sorbitol fatty acid esters, glycerin fatty acid esters, and polyoxyethylene fatty acid esters; and amine-based nonionic surfactants such as polyoxyethylene alkyl amine and alkylalkanolamide.

The nonionic surfactant as the nucleating agent is preferably at least one selected from the group consisting of a nonionic surfactant represented by the general formula (i) and a nonionic surfactant represented by the general formula (ii).

Examples of the chain transfer agent include esters such as dimethyl malonate, diethyl malonate, methyl acetate, ethyl acetate, butyl acetate, and dimethyl succinate, as well as isopentane, methane, ethane, propane, isobutane, methanol, ethanol, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the general formula: $R^aI_xBr_y$, wherein x and y are each an integer of 0 to 2 and satisfy $1 \leq x+y \leq 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the bromine compound or the iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Among these, the chain transfer agent is preferably at least one selected from the group consisting of alkanes and alcohols from the viewpoints of polymerization reactivity, crosslinkablility, availability, and the like. The alkane preferably has 1 to 6, more preferably 1 to 5, still more preferably 2 to 4, and particularly preferably 3 to 4 carbon atoms. Further, the alcohol preferably has 1 to 5, more preferably 1 to 4, and still more preferably 3 to 4 carbon atoms. The chain transfer agent is particularly preferably at least one selected from the group consisting of methane, ethane, propane, isobutane, methanol, ethanol, and isopropanol. The chain transfer agent is preferably at least one selected from the group consisting of alcohols having 1 to 4 carbon atoms and alkanes having 2 to 4 carbon atoms, and more preferably at least one selected from the group consisting of isopropanol, sec-butanol, and tert-butanol. In particular, by using a chain transfer agent containing tertiary carbon, more particles can be generated during polymerization.

The amount of the chain transfer agent is preferably 0.001 to 10,000 mass ppm based on the aqueous medium. The amount of the chain transfer agent is more preferably 0.01 mass ppm or more, still more preferably 0.05 mass ppm or more, and particularly preferably 0.1 mass ppm or more based on the aqueous medium. The amount thereof is more preferably 1,000 mass ppm or less, still more preferably 500 mass ppm or less, and particularly preferably 100 mass ppm or less based on the aqueous medium.

The chain transfer agent may be added to the reaction vessel at once before initiation of the polymerization, may be added at once after initiation of the polymerization, may be added in multiple portions during the polymerization, or may be added continuously during the polymerization.

Next, a particularly preferred embodiment in which at least one selected from the group consisting of a fluoropolyether, a nonionic surfactant, and a chain transfer agent is used as the nucleating agent will be described.

In the polymerization, the nucleating agent is preferably added to the aqueous medium before the initiation of the polymerization reaction or before the concentration of PTFE in the aqueous dispersion reaches 5.0% by mass as the polymerization reaction proceeds. By adding a nucleating agent at the initial stage of polymerization, more particles can be generated during polymerization, and, moreover, primary particles having a smaller average primary particle size and aspect ratio can be obtained. In other words, the nucleating agent may be added before the initiation of the polymerization, may be added at the same time as the initiation of the polymerization, or may be added during the period in which the nuclei of PTFE particles are formed after polymerization is initiated.

The time when the nucleating agent is added is before the initiation of polymerization or before the concentration of PTFE in the aqueous dispersion reaches 5.0% by mass as the polymerization reaction proceeds, preferably before the initiation of polymerization or before the concentration of PTFE reaches 3.0% by mass, more preferably before the initiation of polymerization or before the concentration of PTFE reaches 1.0% by mass, still more preferably before the initiation of polymerization or before the concentration of PTFE reaches 0.5% by mass, and particularly preferably before the initiation of polymerization or at the same time as the initiation of polymerization.

The amount of the nucleating agent added is preferably 0.001 to 5000 mass ppm based on the resulting PTFE because more particles can be generated during polymerization, and, moreover, primary particles having a smaller average primary particle size and aspect ratio can be obtained. The lower limit of the amount of the nucleating agent is 0.01 mass ppm, 0.05 mass ppm, and 0.1 mass ppm in the order of preference. The upper limit of the amount of the nucleating agent is 2000 mass ppm, 1000 mass ppm, 500 mass ppm, 100 mass ppm, 50 mass ppm, and 10 mass ppm in the order of preference.

As described above, the nucleating agent is preferably at least one selected from the group consisting of a fluoropolyether, a nonionic surfactant, and a chain transfer agent.

The amount of the fluoropolyether is preferably 5 to 5,000 ppm based on the aqueous medium. The lower limit of the amount of the fluoropolyether is, in the order of preference, 10 mass ppm, 20 mass ppm, 30 mass ppm, and 50 mass ppm. The upper limit of the fluoropolyether is, in the order of preference, 3000 mass ppm, 2000 mass ppm, 1000 mass ppm, 500 mass ppm, or 100 mass ppm.

The amount of the nonionic surfactant is preferably 0.1 to 0.0000001% by mass based on the aqueous medium. The lower limit of the amount of the nonionic surfactant is 0.000001% by mass, 0.000005% by mass, and 0.00001% by mass in the order of preference. The upper limit of the amount of the nonionic surfactant is 0.01% by mass, 0.005% by mass, 0.001% by mass, 0.0005% by mass, and 0.0001% by mass in the order of preference.

The amount of the chain transfer agent is preferably 0.001 to 10,000 mass ppm based on the aqueous medium. The lower limit of the amount of the chain transfer agent is 0.01 mass ppm, 0.05 mass ppm, 0.1 mass ppm, and 0.5 mass ppm in the order of preference. The upper limit of the amount of the chain transfer agent is 1000 mass ppm, 500 mass ppm, 100 mass ppm, and 10 mass ppm in the order of preference.

When a chain transfer agent and a nonionic surfactant are used as the nucleating agent, the mass ratio of the chain transfer agent to the nonionic surfactant (chain transfer agent/nonionic surfactant) is preferably 1,000/1 to 1/5, more preferably 200/1 to 1/2, 100/1 to 1/1, and still more preferably 50/1 to 2/1 because more particles can be generated during polymerization, and, moreover, primary particles having a smaller average primary particle size and aspect ratio can be obtained.

The polymerization of TFE may also be performed in the presence of a nonionic surfactant. As the nonionic surfactant, those described above as the nonionic surfactant contained in the composition of the present disclosure can also be suitably used in the production method of the present disclosure.

The amount of the nonionic surfactant is preferably 0.1 to 0.0000001% by mass, and more preferably 0.01 to 0.000001% by mass based on the aqueous medium.

In the production method of the present disclosure, it is preferable that in obtaining the polymerization dispersion, an aqueous medium and a stabilizing aid are added to a reaction container, oxygen in the reaction container is removed, tetrafluoroethylene is added to the reaction container, and a polymerization initiator is added to the reaction container to initiate polymerization reaction of tetrafluoroethylene, and the stabilizing aid is removed from the polymerization dispersion obtained after completion of the polymerization reaction.

The stabilizing aid is preferably paraffin wax, fluorine-containing oil, a fluorine-containing solvent, silicone oil, or the like. The stabilizing aid may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid be sufficiently hydrophobic and be completely separated from the polymerization dispersion obtained after completion of the polymerization reaction, and does not serve as a contaminating component.

Further, in the production method of the present disclosure, an additive may be used to stabilize each compound when obtaining the polymerization dispersion. Examples of the additive include a buffer, a pH adjuster, and a dispersion stabilizer.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to foam a redox agent, which initiates the polymerization. The concentration of the polymerization initiator is appropriately determined depending on the types of the monomers, the molecular weight of the target PTFE, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroperfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulphuric acid, perboric acid, perchloric acid, perphosphoric acid, and percarbonic acid, organic peroxides of disuccinic acid peroxide and diglutaric acid peroxide, t-butyl permaleate, and t-butyl hydroperoxide. A reducing agent such as a sulfite may be contained together, and the amount thereof may be 0.1 to 20 times the amount of the peroxide.

For example, in a case where the polymerization is performed at a low temperature of 30° C. or lower, the polymerization initiator used is preferably a redox initiator obtained by combining an oxidizing agent and a reducing agent. Examples of the oxidizing agent include persulfates, organic peroxides, potassium permanganate, manganese triacetate, ammonium cerium nitrate, and bromate. Examples of the reducing agent include sulfites, bisulfites, bromates, diimine, and oxalic acid. Examples of the persulfates include ammonium persulfate and potassium persulfate. Examples of the sulfite include sodium sulfite and ammonium sulfite. In order to increase the decomposition rate of the initiator, the combination of the redox initiator preferably contains a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron (II) sulfate, ammonium persulfate/sulfite/iron(II) sulfate, ammonium persulfate/sulfite, ammonium persulfate/iron(II) sulfate, manganese triacetate/oxalic acid, ammonium cerium nitrate/oxalic acid, bromate/sulfite, and bromate/bisulfite, and potassium permanganate/oxalic acid and ammonium persulfate/sulfite/iron(II) sulfate are preferable. In the case of using a redox initiator, either an oxidizing agent or a reducing agent may be charged into a polymerization tank in advance, followed by adding the other continuously or intermittently thereto to initiate the polymerization. For example, in the case of potassium permanganate/oxalic acid, preferably, oxalic acid is charged into a polymerization tank and potassium permanganate is continuously added thereto.

The polymerization initiator may be added in any amount, and the initiator in an amount that does not significantly decrease the polymerization rate (e.g., several parts per million in water) or more may be added at once in the initial stage of polymerization, or may be added successively or continuously. The upper limit thereof falls within a range where the reaction temperature is allowed to increase while the polymerization reaction heat is removed through the device surfaces. The upper limit thereof is more preferably within a range where the polymerization reaction heat can be removed through the device surfaces.

The aqueous medium is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

In the production method of the present disclosure, TFE is preferably polymerized substantially in the absence of a fluorine-containing surfactant (excluding compounds having a functional group capable of reacting by radical polymerization and a hydrophilic group). Conventionally, a fluorine-containing surfactant has been used for polymerization of TFE, but in the production method of the present disclosure, by using the polymer (I), PTFE can be obtained without using a fluorine-containing surfactant. The expression "substantially in the absence of a fluorine-containing surfactant" as used herein means that the amount of the fluorine-containing surfactant in the aqueous medium is 10 mass ppm or less, preferably 1 mass ppm or less, more preferably 100 mass ppb or less, still more preferably 10 mass ppb or less, and further preferably 1 mass ppb or less.

Examples of the fluorine-containing surfactant include the fluorine-containing surfactants described above as the fluorine-containing surfactant that can be contained in the composition of the present disclosure.

Further, the polymer (I) may have a content of a dimer and a trimer of the monomer represented by the general formula (I) (hereinafter sometimes referred to as a monomer (I)) of 1.0% by mass or less based on the polymer (I).

In other words, the production method of the present disclosure also preferably includes:
polymerizing the monomer (I) represented by the general formula (I) in an aqueous medium to obtain a crude composition containing a polymer of the monomer (I);
removing from the crude composition a dimer and a trimer of the monomer (I) contained in the crude composition to obtain a polymer (I) in which the content of the dimer and the trimer of the monomer (I) is 1.0% by mass or less relative to the polymer (I);

polymerizing a in an aqueous medium in the presence of the polymer (I) to obtain a polymerization dispersion containing a PTE, the polymer (I) and the aqueous medium; and mixing the polymerization dispersion with a nonionic surfactant to obtain a composition containing the PTFE, the polymer (I), the nonionic surfactant, and the aqueous medium.

The polymer (I) used in the above production method is substantially free from the dimer and the trimer of the monomer (I). The dimer and the trimer of the monomer (I) are usually generated when polymerizing the monomer (I) to obtain the polymer (I). The content of the dimer and the trimer in the polymer (I) is 1.0% by mass or less, preferably 0.1% by mass or less, more preferably 0.01% by mass or less, still more preferably 0.001% by mass, and particularly preferably 0.0001% by mass based on the polymer (I).

The content of the dimer and trimer in the polymer (I) can be determined by performing gel permeation chromatography (GPC) analysis on the polymer (I) and calculating the total proportion of the peak areas (area percentages) of the dimer and the trimer to the total area of all peaks of the chromatogram obtained by the GPC analysis.

Further, when the content of the dimer and the trimer in the polymer (I) is less than 0.5% by mass based on the polymer (I), the content can be determined by liquid chromatography-mass spectrometry (LC/MS/MS) measurement.

Specifically, an aqueous solution having five or more content levels of the monomer (I) is prepared, the LC/MS/MS analysis is performed with respect to each content, the relationship between a content and an area relative to that content (the integral value of the peak) is plotted, and a calibration curve of the monomer (I) is created. Moreover, calibration curves of the dimer and the trimer of the monomer (I) are created from the calibration curve of the monomer (I).

Methanol is added to the polymer (I) to prepare a mixture, and an extract (supernatant) is recovered from the mixture by centrifugation, and the resulting extract is subjected to the LC/MS/MS analysis.

Then, using the calibration curves, the chromatographic area (the integral value of peaks) of the dimer and the trimer of the monomer (I) can be converted to the content of the dimer and the trimer.

A polymer dispersion substantially free from the dimer and the trimer of the monomer (I) can be produced by using the polymer (I) that is substantially free from the dimer and the trimer when polymerizing TFE in an aqueous medium.

The polymer (I) is a polymer containing a polymerization unit (I) based on the monomer (I). The polymer (I) used in the present disclosure is a polymer in which a dimer (a polymer containing two polymerization units (I)) and a trimer (a polymer containing three polymerization units (I)) are substantially removed from the polymer (I) containing two or more polymerization units (I).

The molecular weight of the monomer (I) is preferably 400 or less. In other words, the polymer (I) is preferably substantially free from a dimer and a trimer having a molecular weight of 1200 or less.

The dimer and the trimer of the polymer (I) may be a polymer formed of, as the monomer (I) represented by the general formula (I), one monomer (I) or may be a copolymer formed of two or more monomers (I) having different structures.

Polymerization of the monomer (I) can be carried out by a known method. By producing a crude composition by such a method, a crude composition in which the polymer (I) is dispersed or dissolved in an aqueous medium can be obtained.

Polymerization of the monomer (I) is preferably carried out substantially in the absence of a fluorine-containing surfactant in an aqueous medium (provided that the monomer (I) represented by the general formula (I) is excluded).

The expression "substantially in the absence of a fluorine-containing surfactant" as used herein means that the amount of the fluorine-containing surfactant is 10 mass ppm or less based on the aqueous medium. The amount of the fluorine-containing surfactant is preferably 1 mass ppm or less, more preferably 100 mass ppb or less, still more preferably 10 mass ppb or less, and further preferably 1 mass ppb or less based on the aqueous medium.

The fluorine-containing surfactant is as described above.

The crude composition thus obtained usually contains, as a polymer of the monomer (I), the dimer and the trimer in a total amount of more than 1.0% by mass based on the mass of the polymer of the monomer (I). The content of the dimer and the trimer in the polymer of the monomer (I), for example, may be 2.0% by mass or more, may be 3.0% by mass or more, may be 30.0% by mass or less, and may be 20.0% by mass or less based on the polymer of the monomer (I). The content of the dimer and trimer in the crude composition can be determined by performing a gel permeation chromatography (GPC) analysis on the crude composition and calculating the total proportion of the peak areas (area percentages) of the dimer and the trimer to the total area of all peaks of the chromatogram obtained by the GPC analysis.

Next, the dimer and the trimer of the monomer (I) contained in the crude composition obtained by the polymerization of the monomer (I) are removed from the crude composition. The means for removing the dimer and the trimer is not limited, and is preferably at least one means selected from the group consisting of ultrafiltration, microfiltration, and dialysis membrane treatment, more preferably at least one means selected from the group consisting of microfiltration and dialysis membrane treatment, and still more preferably ultrafiltration.

Previously, it was not known that the polymerization of the monomer (I) produces a dimer and a trimer of the monomer (I) and, as a result, the dimer and the trimer of the monomer (I) are contained in the polymer (I). The mechanism by which the dimer and the trimer of the monomer (I) are produced is not necessarily clear, but it is conjectured that by the polymerization reaction in the polymerization system which is composed mostly of the monomer (I) among the monomers present in the polymerization system in particular, dimerization and trimerization of the monomer (I) occurs with non-negligible frequency. The presence of the dimer and the trimer of the monomer (I) in the polymer (I) was discovered for the first time in the present disclosure, and it was found for the first time that the dimer and the trimer of the monomer (I) in the polymer (I) can be highly efficiently removed from the polymer (I) (a crude composition) by at least one means selected from the group consisting of ultrafiltration, microfiltration, and dialysis membrane treatment.

When removing the dimer and the trimer, usually the unreacted monomer (I) is also removed from the crude composition at the same time. The unreacted monomer (I) even when incorporated into PTFE by polymerization does not necessarily adversely affect the function of PTFE, and thus the unreacted monomer (I) does not necessarily need to be removed. However, removing the unreacted monomer (I) simultaneously with the dimer and the trimer has the advantage that the amount of monomer to be polymerized can be calculated without considering the presence of the unreacted monomer (I), and PTFE having a desired monomer composition can be readily produced. Even when the monomer (I) remains in the polymer (I), or even when the monomer (I) is newly added as a co-monomer, depending on the polymerization reaction in a polymerization system composed mostly of a fluoromonomer (excluding the monomer (I)) among the monomers present in the polymerization system, dimerization and trimerization of the monomer (I) barely proceed, and the dimer and the trimer of the monomer (I) barely remain in the resulting PTFE.

The crude composition obtained by the polymerization of the monomer (I) may be a composition as polymerized obtained from polymerization, may be what is obtained by diluting or concentrating a composition as polymerized obtained from polymerization, or may be what is obtained by dispersion stabilization treatment or the like. In order to facilitate ultrafiltration, microfiltration, or dialysis membrane treatment, it is also preferable to adjust the viscosity of the crude composition by these treatments.

The content of the polymer of the monomer (I) in the crude composition is not limited, and may be, for example, 0.1 to 20% by mass. The content of the polymer of the monomer (I) in the crude composition is, from the viewpoint of the removal efficiency of the dimer and the trimer, preferably 18.0% by mass or less, more preferably 15.0% by mass or less, still more preferably 12.0% by mass or less, particularly preferably 10.0% by mass or less, preferably 0.5% by mass or more, more preferably 1.0% by mass or more, still more preferably 1.2% by mass or more, and particularly preferably 1.5% by mass or more. The content of the polymer of the monomer (I) in the crude composition can be adjusted by, for example, a method involving adding water to the crude composition obtained by the polymerization of the monomer (I), or a method involving concentrating the crude composition obtained by the polymerization of the monomer (I).

The pH of the crude composition is preferably 0 to 11, more preferably 0.5 to 8.0, and still more preferably 1.0 to 7.0. The pH of the crude composition can be adjusted by adding a pH adjuster to the crude composition obtained by the polymerization of the monomer (I). The pH adjuster may be an acid or an alkali, such as a phosphoric acid salt, sodium hydroxide, potassium hydroxide, or aqueous ammonia.

The viscosity of the crude composition is preferably 25 mPa·s or less because ultrafiltration, microfiltration, or dialysis membrane treatment is facilitated. The viscosity of the crude composition can be adjusted by, for example, a method involving adjusting the number average molecular weight of the polymer of the monomer (I), a method involving adjusting the concentration of the polymer of the monomer (I) in the crude composition, or a method involving adjusting the temperature of the crude composition.

The ultrafiltration or microfiltration is not limited and may be performed by a cross-flow method or a dead-end method, but a cross-flow method is preferable from the viewpoint of reducing the clogging of a membrane.

The ultrafiltration can be performed using an ultrafiltration membrane. Ultrafiltration can be performed using, for example, an ultrafiltration apparatus having an ultrafiltration membrane, and a centrifugal ultrafiltration method, a batch-type ultrafiltration method, a circulation-type ultrafiltration method, and the like can be employed.

The molecular weight cut-off of the ultrafiltration membrane is usually about $0.1 \times 10^4$ to $30 \times 10^4$ Da. The molecular weight cut-off of the ultrafiltration membrane is preferably $1.5 \times 10^4$ Da or more because the clogging of the membrane can be suppressed and the dimer and the trimer can be efficiently reduced. The molecular weight cut-off is more preferably $2.0 \times 10^4$ Da or more, particularly preferably $3.0 \times 10^4$ Da or more, and most preferably $5.0 \times 10^4$ Da or more. The molecular weight cut-off may be $8.0 \times 10^4$ Da or more. Further, from the viewpoint of the removal efficiency of the dimer and the trimer, the molecular weight cut-off is preferably $20 \times 10^4$ Da or less, and more preferably $10 \times 10^4$ Da or less.

The molecular weight cut-off of the ultrafiltration membrane can be, for example, a molecular weight at which 90% of polystyrene having a known weight average molecular weight that is attempted to pass through the membrane is blocked. The quantification of polystyrene can be performed using gel permeation chromatography.

The ultrafiltration membrane is not limited and may be in a conventionally known form, and examples include a hollow fiber type, a flat membrane type, a spiral type, and a tubular type. From the viewpoint of suppressing clogging, a hollow fiber type is preferable.

The inner diameter of the hollow fiber type ultrafiltration membrane is not limited, and may be, for example, 0.1 to 2 mm, and is preferably 0.8 to 1.4 mm.

The length of the hollow fiber type ultrafiltration membrane is not limited, and may be, for example, 0.05 to 3 m, and is preferably 0.05 to 2 m.

The material of the ultrafiltration membrane is not limited, and examples include organic materials such as cellulose, cellulose ester, polysulfone, sulfonated polysulfone, polyethersulfone, sulfonated polyether sulfone, chlorinated polyethylene, polypropylene, polyolefin, polyvinyl alcohol, polymethylmethacrylate, polyacrylonitrile, polyvinylidene fluoride, and polytetrafluoroethylene, metals such as stainless steel, and inorganic materials such as ceramics.

The material of the ultrafiltration membrane is preferably an organic material, more preferably chlorinated polyethylene, polypropylene, polyvinylidene fluoride, polytetrafluoroethylene, polyacrylonitrile, polysulfone, or polyethersulfone, and still more preferably polyacrylonitrile or polyvinylidene fluoride.

Specific examples of the ultrafiltration membrane include G-5 type, G-10 type, G-20 type, G-50 type, PW type, and HWS UF type of DESAL; HEM-180, HEM-183, HEM-251, HEM-300, HEM-116, HEM-183, HEM-300, HFK-131, HFK-328, MPT-U20, MPS-U20P, and MPS-U20S of KOCH; SPE1, SPE3, SPE5, SPE10, SPE30, SPVS, SPV50, and SOW30 of Synder; Microza® UF series manufactured by Asahi Kasei Corporation; and NTR 7410 manufactured by Nitto Denko Corporation.

From the viewpoint of the removal efficiency of the dimer and the trimer, the ultrafiltration is preferably performed at a pressure of 0.01 MPa or more. More preferably, the pressure is 0.03 MPa or more, and still more preferably 0.05 MPa or more. Further, from the viewpoint of pressure resistance, the pressure is preferably 0.5 MPa or less, more preferably 0.25 MPa or less, and still more preferably 0.2 MPa or less.

From the viewpoint of the removal efficiency of the dimer and the trimer, the ultrafiltration is preferably performed at a flow rate of 10 mL/min or more and more preferably performed at a flow rate of 50 mL/min or more, and is preferably performed at a flow rate of 5,000 mL/min or less and more preferably performed at a flow rate of 1,000 mL/min or less.

The microfiltration can be performed using a microfiltration membrane. The microfiltration membrane usually has an average pore size of 0.05 to 1.0 µm.

The microfiltration membrane preferably has an average pore size of 0.1 µm or more because the dimer and the trimer can be efficiently removed. The average pore size is more preferably 0.075 µm or more, and still more preferably 0.1 µm or more. Further, the average pore size is preferably 1.00 µm or less. The average pore size is more preferably 0.50 µm or less, and still more preferably 0.25 µm or less.

The average pore size of the microfiltration membrane can be measured in accordance with ASTM F316 03 (bubble point method).

The microfiltration membrane is not limited and may be in a conventionally known form, and examples include a hollow fiber type, a flat membrane type, a spiral type, and a tubular type. From the viewpoint of suppressing clogging, a hollow fiber type is preferable.

The inner diameter of the hollow fiber type ultrafiltration membrane is not limited, and may be, for example, 0.1 to 2 mm, and is preferably 0.8 to 1.4 mm.

The length of the hollow fiber type ultrafiltration membrane is not limited, and may be, for example, 0.05 to 3 m, and is preferably 0.05 to 2 m.

Examples of the material of the microfiltration membrane include cellulose, aromatic polyamide, polyvinyl alcohol, polysulfone, polyether sulfone, polyvinylidene fluoride, polyethylene, polyacrylonitrile, polypropylene, polycarbonate, polytetrafluoroethylene, ceramics, and metal. Among these, aromatic polyamide, polyvinyl alcohol, polysulfone, polyvinylidene fluoride, polyethylene, polyacrylonitrile, polypropylene, polycarbonate, or polytetrafluoroethylene is preferable, and polyacrylonitrile or polyvinylidene fluoride is particularly preferable.

Specific examples of the microfiltration membrane include Cefilt manufactured by NGK Insulators, Ltd.; Microza U Series and Microza P Series manufactured by Asahi Kasei Corporation; Poreflon SPMW, Poreflon OPMW, and Poreflon PM manufactured by Sumitomo Electric Industries, Ltd.; Trayfil manufactured by Toray Industries, Inc.; NADIR MP005 and NADIR MV020 manufactured by Microdyn-Nadir; and X-Flow manufactured by Norit.

From the viewpoint of the removal efficiency of the dimer and the trimer, the microfiltration is preferably performed at a pressure of 0.01 MPa or more. The pressure is more preferably 0.03 MPa or more, and still more preferably 0.05 MPa or more. Further, from the viewpoint of pressure resistance, the pressure is preferably 0.5 MPa or less, more preferably 0.25 MPa or less, and still more preferably 0.2 MPa or less.

From the viewpoint of the removal efficiency of the dimer and the trimer, the microfiltration is preferably performed at a flow rate of 10 mL/min or more and more preferably performed at a flow rate of 50 mL/min or more, and is preferably performed at a flow rate of 5,000 mL/min or less and more preferably performed at a flow rate of 1,000 mL/min or less.

The dialysis membrane treatment is performed using a dialysis membrane. The dialysis membrane usually has a molecular weight cut-off of $0.05 \times 10^4$ to $100 \times 10^4$ Da.

The molecular weight cut-off of the dialysis membrane is preferably $0.3 \times 10^4$ Da or more because the clogging of the membrane can be suppressed and the dimer and the trimer can be efficiently removed. The molecular weight cut-off is more preferably $0.5 \times 10^4$ Da or more, still more preferably $1.0 \times 10^4$ Da or more, further preferably $1.5 \times 10^4$ Da or more, still further preferably $2.0 \times 10^4$ Da or more, particularly preferably $3.0 \times 10^4$ Da or more, and most preferably $5.0 \times 10^4$ Da or more. The molecular weight cut-off may be $8.0 \times 10^4$ Da or more.

Further, from the viewpoint of the removal efficiency of the dimer and the trimer, the molecular weight cut-off is preferably $20 \times 10^4$ Da or less, and more preferably $10 \times 10^4$ Da or less.

The molecular weight cut-off of the dialysis membrane can be measured by, for example, the same method as the ultrafiltration membrane.

The material of the dialysis membrane is not limited, and examples include cellulose, polyacrylonitrile, polymethylmethacrylate, ethylene vinyl alcohol copolymers, polysulfone, polyamide, and polyester polymer alloy.

Specific examples of the dialysis membrane include Spectra/Por® Float-A-Lyzer, Tube-A-Lyzer, Dialysis tubing, 6 Dialysis tubing, and 7 Dialysis tubing manufactured by Spectrum Laboratories Inc.

Ultrafiltration, microfiltration, or dialysis membrane treatment is preferably performed at a temperature of 10° C. or higher. The temperature is more preferably 15° C. or higher, still more preferably 20° C. or higher, and particularly preferably 30° C. or higher. By adjusting the temperature within the above range, the dimer and the trimer can be more efficiently reduced. The temperature is preferably 90° C. or lower, more preferably 80° C. or lower, still more preferably 70° C. or lower, and particularly preferably 60° C. or lower.

Ultrafiltration, microfiltration, or dialysis membrane treatment can be performed while adding water to the crude composition or adjusting the pH of the crude composition. Water may be added intermittently to the crude composition or continuously added to the crude composition.

The end point of ultrafiltration, microfiltration, or dialysis membrane treatment is suitably determined, and is not limited. Further, in the ultrafiltration, microfiltration, or dialysis membrane treatment, in order to improve the durability of the filtration membrane, the membrane may be backwashed once per a filtration time of 1 to 24 hours as a rough guide.

By removing the dimer and the trimer of the monomer (I) from the crude composition containing the polymer of the monomer (I), an aqueous solution containing the polymer (I) substantially free from the dimer and the trimer is usually obtained. The polymer (I) used in the production method may be the polymer (I) contained in the obtained aqueous solution, or may be the polymer (I) obtained by being separated from the aqueous solution. The method for separating the polymer (I) from the aqueous solution is not limited. For example, the polymer (I) can be separated by a method such as coagulation, washing, or drying of the polymer (I) in the aqueous solution.

The polymer (I) may be an aqueous solution containing the polymer (I). A preferable content of the dimer and the trimer of the monomer (I) based on the polymer (I) in the aqueous solution is the same as the content of the dimer and the trimer in the polymer (1).

In the production method of the present disclosure, TFE is polymerized to obtain a polymerization dispersion, and then the obtained polymerization dispersion is mixed with a nonionic surfactant. As the nonionic surfactant, those described above as the nonionic surfactant contained in the composition of the present disclosure can also be suitably used in the production method of the present disclosure.

The mixing ratio of the polymerization dispersion and the nonionic surfactant is not limited, but it is preferable to mix the polymerization dispersion and the nonionic surfactant at such a ratio that a suitable content of the nonionic surfactant in the composition of the present disclosure is obtained.

The production method of the present disclosure preferably further includes concentrating the composition to obtain a concentrated composition. By concentrating the composition, the content of PTFE in the composition can be appropriately adjusted, and it becomes possible to produce a composition containing a large amount of PTFE.

Examples of the concentration method include phase separation and concentration, an ion exchanger method, and membrane concentration. The phase separation and concentration, ion exchanger method and membrane concentration can be carried out under conventionally known treatment conditions, and can be carried out, but are not limited, by the method disclosed in International Publication No. WO 2004/050719 Pamphlet, National Publication of International Patent Application No. 2002-532583, and Japanese Patent Laid-Open No. 55-120630. The concentration method is particularly preferably phase separation and concentration. The phase separation and concentration is usually performed by adding a nonionic surfactant.

The phase separation and concentration can be performed, for example, by heating a composition containing PTFE, the polymer (I), a nonionic surfactant, and an aqueous medium to cause phase separation into a fluoropolymer-free phase (supernatant phase) and a fluoropolymer-containing phase (condensed phase), removing the fluoropolymer-free phase, and recovering the fluoropolymer-containing phase (condensed phase).

The recovered fluoropolymer-containing phase (condensed phase) contains the fluoropolymer and the aqueous medium, and also contains the polymer (1) whose content is lower than that before the concentration.

The phase separation and concentration may be carried out by allowing to stand at temperature equal to or higher than a temperature lower by 10° C. than the cloud point of the nonionic surfactant used. In addition, the phase separation and concentration may be performed by allowing to stand at a temperature equal to or lower than a temperature higher by 10° C. than the cloud point.

In the production method of the present disclosure, it is also preferable to repeat the phase separation and concentration. The number of repetitions is not limited, but is preferably 2 or more, and more preferably 3 or more. The upper limit of the number of times is not limited, but may be, for example, 10 times or less. By repeating the phase separation and concentration, the content of the polymer (1) can be further reduced.

In the case where the phase separation and concentration is repeated two or more times, the first phase separation and concentration is preferably performed by heating the composition to a temperature equal to or higher than a temperature lower by 5° C. than a cloud point of the nonionic surfactant and then allowing to stand to separate a supernatant phase and a condensed phase. The heating temperature is more preferably a temperature equal to or higher than a temperature lower by 3° C. than the cloud point, still more preferably the cloud point or higher, and particularly preferably the heating temperature exceeds the cloud point. The second or subsequent phase separation and concentration is preferably performed by heating the composition to a temperature equal to or higher than a temperature lower by 5° C. than the cloud point of the nonionic surfactant and then allowing to stand to separate a supernatant phase and a condensed phase. The heating temperature is more preferably a temperature equal to or higher than a temperature lower by 3° C. than the cloud point, and particularly preferably heating to the cloud point.

By the production method of the present disclosure described above, the first composition of the present disclosure can be suitably produced.

The second composition of the present disclosure can be suitably produced by a production method including polymerizing a in an aqueous medium in the presence of a polymer (I) containing a polymerization unit (I) based on a monomer represented by the general formula (I) to obtain a polymerization dispersion containing a PTFE, the polymer (I) and the aqueous medium, and concentrating the polymerization dispersion by phase separation and concentration to obtain the composition.

The step of obtaining the polymerization dispersion can be configured as described above, except that a nonionic surfactant is optionally added.

In the production method of the second composition the present disclosure, is polymerized to obtain a polymerization dispersion, and then the polymerization dispersion is concentrated by phase separation and concentration.

The phase separation and concentration can be performed, for example, by heating a polymer dispersion containing PTFE, the polymer (I) and an aqueous medium to cause phase separation into a fluoropolymer-free phase (supernatant phase) and a fluoropolymer-containing phase (condensed phase), removing the fluoropolymer-free phase, and recovering the fluoropolymer-containing phase (condensed phase).

A composition containing the PTFE, the polymer (I), the nonionic surfactant, and the aqueous medium may be prepared by mixing the polymerization dispersion and the nonionic surfactant before the phase separation and concentration, and the obtained composition may be subjected to the phase separation and concentration. In this case, the phase separation and concentration can be performed by heating the composition to a temperature equal to or higher than a temperature lower by 10° C. than a cloud point of the nonionic surfactant to phase-separate the composition into a supernatant phase and a condensed phase, and recovering the condensed phase to obtain the concentrated composition.

The recovered fluoropolymer-containing phase (condensed phase) contains the fluoropolymer and the aqueous medium, and also contains the polymer (1) whose content is lower than that before the concentration.

The phase separation and concentration may be carried out by allowing to stand at temperature equal to or higher than a temperature lower by 10° C. than the cloud point of the nonionic surfactant. In addition, the phase separation and concentration may be performed by allowing to stand at a temperature equal to or lower than a temperature higher by 10° C. than the cloud point.

It is also preferable to repeat the phase separation and concentration. The number of repetitions is not limited, but is preferably 2 or more, and more preferably 3 or more. The upper limit of the number of times is not limited, but may be, for example, 10 times or less. By repeating the phase separation and concentration, the content of the polymer (1) can be further reduced.

In the case where the phase separation and concentration is repeated two or more times, the first phase separation and concentration is preferably performed by heating the composition to a temperature equal to or higher than a temperature lower by 5° C. than a cloud point of the nonionic surfactant and then allowing to stand to separate a supernatant phase and a condensed phase. The heating temperature is more preferably a temperature equal to or higher than a temperature lower by 3° C. than the cloud point, still more preferably the cloud point or higher, and particularly preferably the heating temperature exceeds the cloud point. The second or subsequent phase separation and concentration is preferably performed by heating the composition to a temperature equal to or higher than a temperature lower by 5° C. than the cloud point of the nonionic surfactant and then allowing to stand to separate a supernatant phase and a condensed phase. The heating temperature is more preferably a temperature equal to or higher than a temperature lower by 3° C. than the cloud point, and particularly preferably heating to the cloud point.

The production method of the present disclosure may further include mixing the concentrated composition and an anionic hydrocarbon surfactant. By adding an anionic surfactant to the concentrated composition, even when the composition contains a large amount of PTE, it is possible to appropriately adjust the viscosity of the composition and improve the miscibility of the pigment, the filler, and the like.

The third composition of the present disclosure can be suitably produced by a production method including polymerizing a in an aqueous medium in the presence of a polymer (I) containing a polymerization unit (I) based on a monomer represented by the general formula (I) to obtain a polymerization dispersion containing a PTFE, the polymer (I) and the aqueous medium, and mixing the polymerization dispersion with a nonionic surfactant to obtain a composition containing the PTFE, the polymer (I), the nonionic surfactant, and the aqueous medium, concentrating the composition by phase separation and concentration to obtain the composition, and adding an anionic hydrocarbon surfactant to the concentrated composition.

As the anionic hydrocarbon surfactant, those described above as the anionic hydrocarbon surfactant that may be contained in the composition of the present disclosure can also be suitably used in the production method of the present disclosure.

The mixing ratio of the concentrated composition and the anionic hydrocarbon surfactant is not limited, but it is preferable to mix the concentrated composition and the anionic hydrocarbon surfactant at a ratio such that a suitable content of the anionic hydrocarbon surfactant in the composition of the present disclosure is obtained.

The production method of the present disclosure may further include mixing the concentrated composition and a preservative. By adding a preservative to the concentrated composition, it is possible to produce a composition in which putrefaction and bacterial growth are suppressed even when stored for a long period of time.

The production method of the present disclosure may include bringing the composition containing a PTFE, the polymer (I), a nonionic surfactant, and an aqueous medium into contact with an anion exchange resin or a mixed bed containing an anion exchange resin and a cation exchange resin. Such an ion exchange treatment is preferably performed before concentrating the composition.

Examples of the anion exchange resin include known ones such as a strongly basic anion exchange resin containing as a functional group a —N⁺X⁻(CH$_3$)$_3$ group (wherein X represents Cl or OH) or a strongly basic anion exchange resin containing a —N⁺X⁻(CH$_3$)$_3$(C$_2$H$_4$OH) group (wherein X is as described above). Specific examples thereof include those described in International Publication No. WO 99/062858, International Publication No. WO 03/020836, International Publication No. WO 2004/078836, International Publication No. WO 2013/027850, and International Publication No. WO 2014/084399.

Examples of the cation exchange resin include, but are not limited to, known ones such as a strongly acidic cation exchange resin containing as a functional group a —SO$_3$⁻ group and a weakly acidic cation exchange resin containing as a functional group a —COO⁻ group. Of these, from the viewpoint of achieving good removal efficiency, a strongly acidic cation exchange resin is preferred, a H⁺ foam strongly acidic cation exchange resin is more preferred.

The "mixed bed containing a cation exchange resin and an anion exchange resin" encompasses, but is not limited to, those in which the resins are filled into a single column, those in which the resins are filled into different columns, and those in which the resins are dispersed in an aqueous dispersion.

Although the embodiments have been described above, it will be understood that various changes in foam and details are possible without departing from the gist and scope of the claims.

According to the present disclosure, there is provided a composition containing a polytetrafluoroethylene, a polymer (I) containing a polymerization unit (I) based on a monomer represented by the general formula (I), a nonionic surfactant, and an aqueous medium, wherein a content of the polytetrafluoroethylene in the composition is 10% by mass or more based on the composition, and a content of the nonionic surfactant in the composition is 1.0% by mass or more based on the polytetrafluoroethylene (in the present disclosure, sometimes referred to as "first composition"),

$$CX^1X^3 \!=\! CX^2R(\!-\!CZ^1Z^2\!-\!A^0)_m \qquad (I)$$

wherein $X^1$ and $X^3$ are each independently F, Cl, H, or CF$_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

The stability retention time as measured by mechanical stability test of the composition of the present disclosure is preferably 1.0 minutes or more.

The content of the polytetrafluoroethylene in the composition of the present disclosure is preferably 40% by mass or more based on the composition.

In the composition of the present disclosure, the nonionic surfactant is preferably represented by the general formula (i):

$$R^6\!-\!O\!-\!A^1\!-\!H \qquad (i)$$

wherein $R^6$ is a linear or branched primary or secondary alkyl group having 8 to 18 carbon atoms, and $A^1$ is a polyoxyalkylene chain.

The composition of the present disclosure is preferably substantially free from a fluorine-containing surfactant.

In the composition of the present disclosure, the polymer (I) preferably has a weight average molecular weight of 2.0×10$^4$ or more.

In the composition of the present disclosure, the polymer (I) preferably has a weight average molecular weight of 15.0×10$^4$ or more.

In the composition of the present disclosure, the polymer (I) preferably has an ion-exchange capacity of 1.75 meg/g or more.

In the composition of the present disclosure, the polymer (I) preferably has an ion-exchange capacity of 2.60 meg/g or more.

In the composition of the present disclosure, the polymer (I) is preferably water-soluble.

In the composition of the present disclosure, $A^0$ in the general formula (I) is preferably —SO$_3$M, —COOM, or —P(O)(OM)$_2$, wherein M is H, a metal atom, NR$^7_4$, imidazolium optionally having a substituent, pyridinium optionally having a substituent, or phosphonium optionally having a substituent, and R$^7$ is H or an organic group.

In the composition of the present disclosure, the polytetrafluoroethylene is preferably a modified polytetrafluoroethylene containing a tetrafluoroethylene unit and a modifying monomer unit.

In the composition of the present disclosure, the modifying monomer is preferably at least one selected from the group consisting of hexafluoropropylene, chlorotrifluoroethylene, vinylidene fluoride, fluoro(alkyl vinyl ether), (perfluoroalkyl)ethylene, ethylene, and a modifying monomer having a functional group capable of reacting by radical polymerization and a hydrophilic group.

According to the present disclosure, there is also provided a method for producing a composition, including polymerizing tetrafluoroethylene in an aqueous medium in the presence of a polymer (I) containing a polymerization unit (I) based on a monomer represented by the general formula (I) to obtain a polymerization dispersion containing a polytetrafluoroethylene, the polymer (I) and the aqueous medium, and mixing the polymerization dispersion with a nonionic surfactant to obtain a composition containing the polytetrafluoroethylene, the polymer (I), the nonionic surfactant, and the aqueous medium,

wherein $X^1$ and $X^3$ are each independently F, Cl, H, or CF$_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

In the production method of the present disclosure, the nonionic surfactant is preferably represented by the general formula (i):

wherein $R^6$ is a linear or branched primary or secondary alkyl group having 8 to 18 carbon atoms, and $A^1$ is a polyoxyalkylene chain.

In the production method of the present disclosure, further, tetrafluoroethylene is preferably polymerized substantially in the absence of a fluorine-containing surfactant (excluding a compound having a functional group capable of reacting by radical polymerization and a hydrophilic group).

In the production method of the present disclosure, it is preferable that in obtaining the polymerization dispersion, an aqueous medium and a stabilizing aid are added to a reaction container, oxygen in the reaction container is removed, tetrafluoroethylene is added to the reaction container, and a polymerization initiator is added to the reaction container to initiate polymerization reaction of tetrafluoroethylene, and the stabilizing aid is removed from the polymerization dispersion obtained after completion of the polymerization reaction.

In the production method of the present disclosure, the polymer (I) preferably has a weight average molecular weight of 2.0×10$^4$ or more.

In the production method of the present disclosure, the polymer (I) preferably has a weight average molecular weight of 15.0×10$^4$ or more.

In the production method of the present disclosure, the polymer (I) preferably has an ion-exchange capacity of 1.75 meq/g or more.

In the production method of the present disclosure, the polymer (I) preferably has an ion-exchange capacity of 2.60 meq/g or more.

In the production method of the present disclosure, the polymer (I) is preferably water-soluble.

In the production method of the present disclosure, $A^0$ in the general formula (I) is preferably —SO$_3$M, —COOM, or —P(O)(OM)$_2$, wherein M is H, a metal atom, NR$^7_4$, imidazolium optionally having a substituent, pyridinium optionally having a substituent, or phosphonium optionally having a substituent, and R$^7$ is H or an organic group.

The production method of the present disclosure preferably further includes concentrating the composition to obtain a concentrated composition.

In the production method of the present disclosure, it is preferable that in concentrating the composition, the concentrated composition is obtained by heating the composition at a temperature equal to or higher than a temperature lower by 5° C. than a cloud point of the nonionic surfactant to phase-separate the composition into a supernatant phase and a condensed phase, and recovering the condensed phase.

In the production method of the present disclosure, the tetrafluoroethylene and a modifying monomer copolymerizable with the tetrafluoroethylene are preferably polymerized.

In the production method of the present disclosure, it is preferable that a modifying monomer copolymerizable with the tetrafluoroethylene is added to a reaction container before the polymerization reaction is initiated or before the polymerization reaction proceeds and a concentration of the polytetrafluoroethylene in the polymerization dispersion reaches 5.0% by mass.

In the production method of the present disclosure, the modifying monomer is preferably at least one selected from the group consisting of hexafluoropropylene, chlorotrifluoroethylene, vinylidene fluoride, fluoro(alkyl vinyl ether), (perfluoroalkyl)ethylene, ethylene, and modifying monomers having a functional group capable of reacting by radical polymerization and a hydrophilic group.

The production method of the present disclosure preferably further includes contacting the composition with an anion exchange resin or a mixed bed containing an anion exchange resin and a cation exchange resin.

According to the present disclosure, there is also provided a composition containing a polytetrafluoroethylene, a polymer (I) containing a polymerization unit (I) based on a monomer represented by the general formula (I), and an aqueous medium, wherein a content of the polymer (I) is 2,000 mass ppm or less based on the composition(in the present disclosure, sometimes referred to as "second composition"),

wherein $X^1$ and $X^3$ are each independently F, Cl, H, or CF$_3$; $X^2$ is H, F, an alkyl group, or a fluorine-containing alkyl group; $A^0$ is an anionic group; R is a linking group; $Z^1$ and $Z^2$ are each independently H, F, an alkyl group, or a fluorine-containing alkyl group; and m is an integer of 1 or more.

In the second composition of the present disclosure, the content of the polymer (I) is preferably 0.1 mass ppm or more based on the composition.

In the second composition of the present disclosure, the content of the polytetrafluoroethylene is preferably 40% by mass or more based on the composition.

The second composition of the present disclosure preferably further contains an anionic hydrocarbon surfactant.

The second composition of the present disclosure preferably further contains a nonionic surfactant.

In the second composition of the present disclosure, the nonionic surfactant is preferably represented by the general formula (i):

$$R^6—O-A^1-H \qquad (1)$$

wherein $R^6$ is a linear or branched primary or secondary alkyl group having 8 to 18 carbon atoms, and $A^1$ is a polyoxyalkylene chain.

In the second composition of the present disclosure, the content of the nonionic surfactant is preferably 1.0% by mass or more based on the polytetrafluoroethylene.

According to the present disclosure, there is also provided a method for producing the second composition of the present disclosure, including polymerizing tetrafluoroethylene in an aqueous medium in the presence of a polymer (I) containing a polymerization unit (I) based on a monomer represented by the general formula (I) to obtain a polymerization dispersion containing a polytetrafluoroethylene, the polymer (I) and the aqueous medium, and concentrating the polymerization dispersion by phase separation and concentration to obtain the composition.

In the production method of the present disclosure, the phase separation and concentration is preferably repeated two or more times.

According to the present disclosure, there is also provided a method for producing the second composition of the present disclosure, including polymerizing tetrafluoroethylene in an aqueous medium in the presence of a polymer (I) containing a polymerization unit (I) based on a monomer represented by the general formula (I) to obtain a polymerization dispersion containing a polytetrafluoroethylene, the polymer (I) and the aqueous medium, mixing the polymerization dispersion with a nonionic surfactant to obtain a composition containing the polytetrafluoroethylene, the polymer (I), the nonionic surfactant, and the aqueous medium, and heating the composition at a temperature equal to or higher than a temperature lower by 5° C. than a cloud point of the nonionic surfactant to phase-separate the composition into a supernatant phase and a condensed phase, and recovering the condensed phase to obtain the concentrated composition.

In the production method of the present disclosure, the phase separation and concentration is preferably repeated two or more times.

According to the present disclosure, there is also provided a composition containing a polytetrafluoroethylene, a nonionic surfactant, an anionic hydrocarbon surfactant, and an aqueous medium, and being substantially free from a fluorine-containing surfactant (in the present disclosure, sometimes referred to as "third composition").

In the third composition of the present disclosure, the fluorine-containing surfactant is preferably an anionic fluorine-containing surfactant containing fluorine and having an anionic moiety having a molecular weight of 800 or less.

In the third composition of the present disclosure, the content of the fluorine-containing surfactant is preferably 100 mass ppb or less.

In the third composition of the present disclosure, the fluorine-containing surfactant is preferably a compound represented by $F(CF_2)_7COOM$,
$F(CF_2)_5COOM$,
$H(CF_2)_6COOM$,
$CF_3O(CF_2)_3OCHFCF_2COOM$,
$C_3F_7OCF(CF_3)CF_2OCF(CF_3)COOM$,
$CF_3CF_2CF_2OCF(CF_3)COOM$,
$CF_3CF_2OCF_2CF_2OCF_2COOM$,
$C_2F_5OCF(CF_3)CF_2OCF(CF_3)COOM$,
$CF_3OCF(CF_3)CF_2OCF(CF_3)COOM$,
$CF_2ClCF_2CF_2OCF(CF_3)CF_2OCF_2COOM$,
$CF_2ClCF_2CF_2OCF_2CF(CF_3)OCF_2COOM$,
$CF_2ClCF(CF_3)OCF(CF_3)CF_2OCF_2COOM$, and
$CF_2ClCF(CF_3)OCF_2CF(CF_3)OCF_2COOM$,

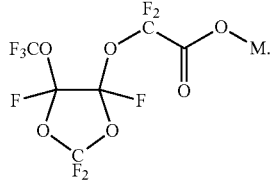

wherein M is H, a metal atom, $NR^7_4$, imidazolium optionally having a substituent, pyridinium optionally having a substituent, or phosphonium optionally having a substituent.

EXAMPLES

Next, embodiments of the present disclosure will be described with reference to examples, but the present disclosure is not intended to be limited by these examples.

The numerical values of the Examples were measured by the following methods.

<Average Primary Particle Size>

A PTFE aqueous dispersion was diluted with water to a solid concentration of 0.15% by mass. The transmittance of projected light at 550 nm relative to the unit length of the resulting diluted latex was determined and the number-based length average primary particle size was determined by measuring the Feret diameter with a transmission electron microscope image. Based on these values, a calibration curve was drawn. Using this calibration curve, the average primary particle size was determined from the measured transmittance of the projected light at 550 nm of each sample.

Also, the average primary particle size can be determined by dynamic light scattering. In dynamic light scattering, the average primary particle size was determined by preparing a fluoropolymer aqueous dispersion adjusted to a solid concentration of about 1.0% by mass, and performing a measurement by using ELSZ-1000S (manufactured by Otsuka Electronics Co., Ltd.) at 25° C. with 70 accumulations. The refractive index of the solvent (water) was 1.3328, and the viscosity of the solvent (water) was 0.8878 mPa·s.

<Standard Specific Gravity (SSG)>

Using a sample molded in conformity with ASTM D 4895-89, the SSG was determined by the water replacement method in conformity with ASTM D 792.

<Content of Modifying Monomer Unit>

The content of the PMVE unit was determined using the following formula from a spectrum obtained by solid-state $^{19}F$-MAS NMR measurement:

$$X=(4B/3)/(A+(B/3))\times 100$$

X: Content (mol %) of PMVE unit
A: Integral value of signal at −120 ppm
B: Integral value of CF signal at −52 ppm The chemical shift value used was a value obtained when the peak top of the signal derived from the backbone of PTFE was −120 ppm.

<Solid Concentration>

In an air dryer, 1 g of the PTFE aqueous dispersion was dried at 150° C. for 60 minutes, and the ratio of the mass of the non-volatile matter to the mass of the aqueous dispersion (1 g) was expressed in percentage and taken as the solid concentration thereof.

<Content of Polymer A and Polymer D>

The polymer A content and polymer D content contained in PTFE powder was determined using the following formula from a spectrum obtained by solid-state $^{19}$F-MAS NMR measurement:

$$Y=(4B/(5A+3B))\times 100$$

Y: Content (mol %) of polymer A or polymer D
A: Integral value of signal at −120 ppm
B: Sum of integral values of $CF_2$ and $CF_3$ signals at −83 ppm The chemical shift value used was a value obtained when the peak top of the signal derived from the backbone of PTFE was −120 ppm.

<Aspect Ratio>

The aspect ratio was determined by observing the diluted PTFE aqueous dispersion to have a solid concentration of about 1% by mass with a scanning electron microscope (SEM), performing image processing on 400 or more particles selected at random, and averaging the ratios of the major axis to the minor axis.

<Content of Nonionic Surfactant>

The content (N % by mass) of the nonionic surfactant was calculated from the formula: N=[(Y−Z)/X]×100 (% by mass) from the heating residue (Y g) obtained by heating about 1 g (X g) of a sample in a 5 cm aluminum cup at 110° C. for 30 minutes and the heating residue (Z g) obtained by heating the obtained heating residue (Y g) at 300° C. for 30 minutes.

<Mechanical Stability Test>

Figure 1A:
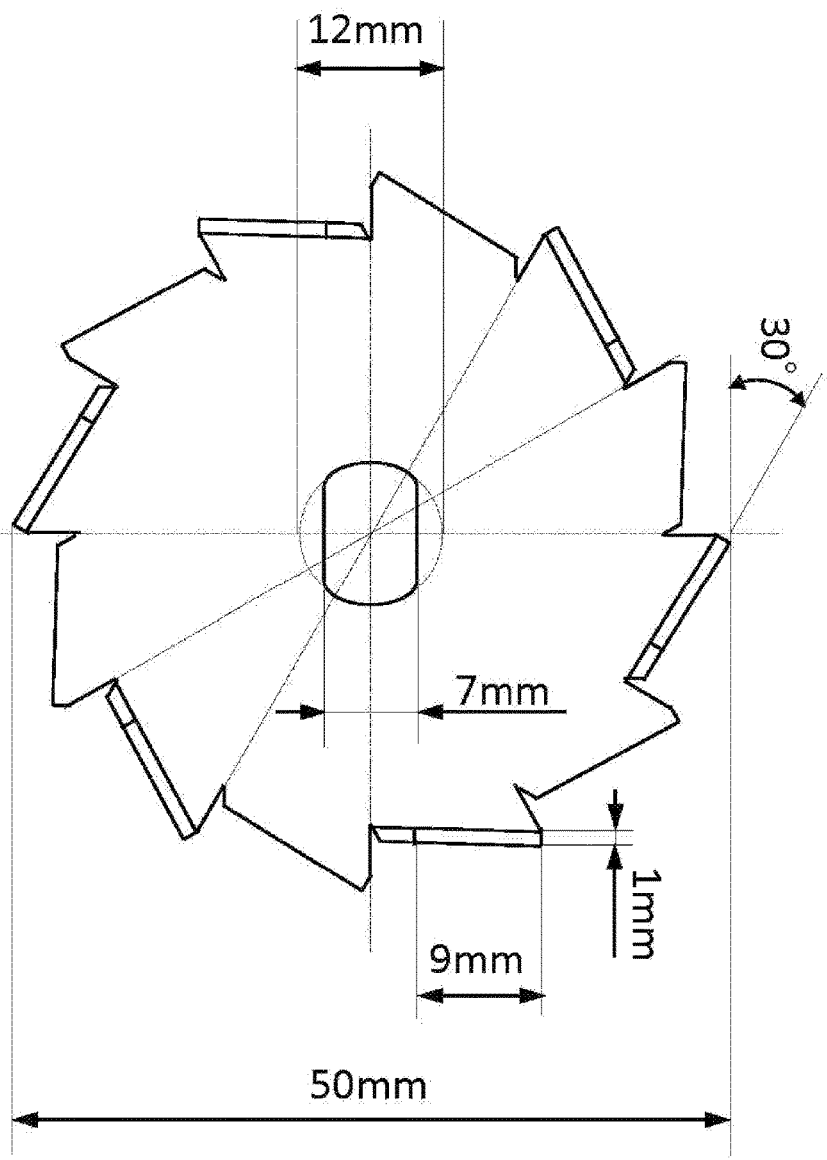
FIG. 1(a) is a front view of a stirring blade used in a mechanical stability test.

A plastic cup with a diameter of 67 mm and an internal volume of 300 ml was filled with 100 g of PTE aqueous dispersion, immersed in a water bath at 60° C., and a stirring blade with a diameter of 50 mm (FIG. 1(a) was set so that the height from the bottom of the plastic cup to the center of the stirring blade (in the axial direction of FIG. 1(b), 6 mm from the lower end of the stirring blade) was 20 mm, and rotated at 3000 rpm, and the time until the PTFE aqueous dispersion aggregated or solidified and scattered was measured as the stability holding time.

<Viscosity>

Using a B-type rotary viscometer (manufactured by Toki Sangyo Co., Ltd., rotor No. 2), the viscosity at 25° C. was measured under conditions of a rotation speed of 60 rpm and a measurement time of 120 seconds. In the case of 80 mPa·s or more, since a viscosity increasing phenomenon occurs with the measurement time in the viscosity measurement, the viscosity was measured 5 minutes after the start of the measurement and 10 minutes after the start of the measurement, and the average value was adopted.

<Precipitation Stability Test>

In a glass-stoppered test tube with a scale having a body diameter of 18 mm, a total height of 215 mm, and a volume of 25 ml, 25 ml of a PTFE aqueous dispersion was charged and left at 20° C. to 30° C. for 18 hours. Thereafter, a pipette was inserted into the test tube so that the tip of the pipette was positioned at the height of the liquid level of the PTFE aqueous dispersion, and 3 ml of the PTFE aqueous dispersion was collected to serve as an upper phase sample. Next, a pipette was inserted into the test tube so that the tip of the pipette was positioned at the height of the liquid level of the PTFE aqueous dispersion, and 19 ml of the PTFE aqueous dispersion was collected. The 3 ml of PTE aqueous dispersion remaining in the test tube was used as a lower phase sample. The solid concentration of the upper and lower phase samples was measured by the method described above, and the difference in the solid concentration between the upper and lower phase samples was calculated. The smaller the difference, the better the precipitation stability.

<Method for Measuring Contents of Dimers and Trimers of Monomer D in Polymer D and Method for Measuring Contents of Dimers and Trimers of Monomer E in Polymer E>

(1) Extraction from Aqueous Solution

The solid content of an aqueous solution of a polymer was measured, and the amount of the aqueous solution corresponding to 0.2 g of the solid content of the polymer was weighed. Thereafter, water and methanol were added such that the volume ratio of water, including the water contained in the aqueous solution, to methanol was 50/50 (vol %) to obtain a mixed solution containing the polymer, water, and methanol. Thereafter, the obtained mixed solution was centrifuged at 4,000 rpm for 1 hour, and the supernatant containing the polymer was recovered as an extract.

The extract was analyzed using a liquid chromatograph-mass spectrometer (Waters, LC-MS ACQUITY UPLC/TQD) to obtain a chromatogram of the extract.

The content of a dimer and a trimer of a monomer contained in the extract was obtained by converting the integral values of peaks derived from the dimer and the trimer of the monomer appearing in the chromatogram of the extract into the contents of the dimer and the trimer of the monomer using a calibration curve.

(2) Calibration Curve of Monomer

Five concentration levels of a methanol standard solution of a monomer having a known content of 1 ng/mL to 100 ng/mL were prepared, and measurement was made using a liquid chromatograph-mass spectrometer (Waters, LC-MS ACQUITY UPLC/TQD). The relationship between the content of each monomer and the integrated value of a peak corresponding to the content was plotted to create a calibration curve (first-order approximation) of each monomer. Next, the calibration curve (first-order approximation) of each monomer was used to create calibration curves of a dimer and a trimer of each monomer.

Measuring instrument configuration and LC-MS measurement conditions

TABLE 1

| LC unit | |
|---|---|
| Equipment | Acquity UPLC manufactured by Waters |
| Column | Acquity UPLC BEH C18 1.7 min (2.1 × 50 mm) manufactured by Waters |
| Mobile phase | A $CH_3CN$ |
| | B 20 mM $CH_3COONH_4/H_2O$ |
| | 0 → 1.5 min    A:B = 10:90 |
| | 1.5 → 8.5 min  A:B = 10:90 → A:B = 90:10 |
| |                Linear gradient |
| | 8.5 → 10 min   A:B = 90:10 |
| Flow rate | 0.4 mL/min |
| Column temperature | 40° C. |
| Sample injection amount | 5 μL |

TABLE 1-continued

| | MS unit |
|---|---|
| Equipment | TQ Detecter |
| Measurement mode | MRM (Multiple Reaction Monitoring) |
| Ionization method | Electrospray ionization SCAN |

The quantification limit in this measuring instrument configuration is 1 ng/mL.

The surfactants (a) and (b) used in the examples are as follows.

Surfactant (a): T-Det A 138 manufactured by Harcros Organics Inc.

Surfactant (b): NOIGEN TDS-80 manufactured by DKS Co., Ltd.

<Polymer A>

A homopolymer of a monomer represented by formula: $CH_2=CF(CF_2OCFCF_3COONH_4)$ (number-average molecular weight $9.0 \times 10^4$, weight-average molecular weight $19.0 \times 10^4$) (hereinafter referred to as polymer A) was used. The ion exchange capacity of polymer A is 3.67 meq/g.

<Method for Measuring Weight-Average Molecular Weight (Mw) and Number-Average Molecular Weight (Mn) of Polymer (Polymers A, D, E, etc.)>

The number average molecular weight and the weight average molecular weight of the polymer were measured by gel permeation chromatography (GPC) using GPC HLC-8020 manufactured by Tosoh Corporation and Showdex columns manufactured by Showa Denko K.K. (one GPC KF-801, one GPC KF-802, and two GPC KF-806M connected in series) while allowing tetrahydrofuran (THF) to flow as a solvent at a flow rate of 1 ml/min, and the molecular weights were calculated using monodisperse polystyrene as a standard.

Synthesis Example 1

To a reactor made of SUS with an internal volume of 6 L and equipped with a stirrer, 3,560 g of deionized water, 180 g of paraffin wax, and 5.37 g of the polymer A were added. Aqueous ammonia was added to adjust the pH to 9.1. Next, the contents of the reactor were suctioned while being heated to 70° C., and, at the same time, the reactor was purged with TFE to remove oxygen in the reactor, and the contents were stirred. After 0.54 g of PMVE was added to the reactor, TFE was added until the pressure was 0.73 MPaG. Then, 17.9 mg of an ammonium persulfate (APS) initiator dissolved in 20 g of deionized water was added to the reactor such that the pressure of the reactor was 0.83 MPaG. After the initiator was added, the pressure dropped, and the initiation of polymerization was observed. TFE was added to the reactor to maintain a constant pressure of 0.78 MPaG. When TFE consumed in the reaction reached about 180 g, the supply of TFE and stirring were stopped. Subsequently, the gas in the reactor was slowly released until the pressure of the reactor reached 0.02 MPaG. Thereafter, TFE was supplied until the pressure of the reactor was 0.78 MPaG, and stirring was started again to continue the reaction. When TFE consumed in the reaction reached about 1,250 g, the supply of TFE was stopped, stirring was stopped, and the reaction was terminated. Thereafter, the reactor was evacuated until the pressure in the reactor reached normal pressure, and the contents were taken out from the reactor and cooled. The supernatant paraffin wax was removed to obtain a PTE aqueous dispersion A.

The solid content of the PTFE aqueous dispersion A was 24.5% by mass, the average primary particle size was 375 nm, and the aspect ratio was 1.67. The concentration of the polymer A contained in the PTFE aqueous dispersion A based on PTFE was 0.43% by mass.

Production Example 1

The PTE aqueous dispersion A was diluted with deionized water to have a solid concentration of about 10% by mass and coagulated under a high-speed stirring condition. The obtained wet powder was dried at 210° C. for 18 hours. The obtained PTFE powder had an SSG of 2.182, a PMVE content of 0.011% by mass, and a polymer A content of 0.43% by mass.

Example 1

Phase Separation and Concentration

The surfactant (a) was added to the PTE aqueous dispersion A in an amount of 30 parts by mass based on 100 parts by mass of PTE, and the mixture was maintained at 47° C. for 3 hours to separate into a supernatant phase and a condensed phase. The condensed phase was recovered to obtain a PTE aqueous dispersion 1.

In the PTFE aqueous dispersion 1, the solid concentration was 56.7% by mass, and the content of the surfactant (a) was 3.0% by mass based on PTFE.

The PTFE aqueous dispersion 1 was diluted with deionized water to have a solid concentration of about 10% by mass and coagulated under a high-speed stirring condition. The obtained wet powder was dried at 210° C. for 18 hours.

The content of the polymer A was 0.15% by mass based on PTE. That is, the concentration of the polymer A based on the PTFE aqueous dispersion 1 was 0.15% by mass. Further, the concentration of the polymer A based on the PTFE was 0.26% by mass.

The viscosity of the PTFE aqueous dispersion 1 was 138.2 mPa·s, the stability retention time was 8.3 minutes, and the difference in solid concentration between the upper phase sample and the lower phase sample was 1.0% by mass.

Example 2

The surfactant (a) was added to the PTE aqueous dispersion A in an amount of 3.0 parts by mass based on 100 parts by mass of PTFE. The viscosity of the obtained PTFE aqueous dispersion was 6.2 mPa·s, the stability retention time was 1.5 minutes, and the difference in solid concentration between the upper phase sample and the lower phase sample was 31.7% by mass.

Preparation Example 1

To a reactor, 220 g of a monomer D represented by $CH_2=CF(CF_2OCFCF_3COOH)$ and 513 g of water were added, and, moreover, 0.5 mol % of ammonium persulfate (APS) based on the monomer D was added. The mixture was heated and stirred at 60° C. for 24 hours in a nitrogen atmosphere to obtain an aqueous solution D-1 of polymer D containing the polymer D that is a homopolymer of $CH_2=CF(CF_2OCFCF_3COOH)$. As a result of GPC analysis of the resulting aqueous solution D-1 of polymer D, the polymer D had a Mw of 180,000, a Mn of 86,000, and a content of the dimer and the trimer of 2.0% by mass based on the polymer D. The ion exchange capacity of polymer D is 3.67 meq/g.

Water was added to the resulting aqueous solution D-1 of polymer D to adjust the concentration of polymer D to 5.0% by mass, and then the aqueous solution was brought into contact with an ultrafiltration membrane (a molecular weight cut-off of 50,000 Da, made of polyethylene) at 30° C. at a water pressure of 0.1 MPa to carry out ultrafiltration. While suitably adding water, ultrafiltration was continued until a filtrate of water in an amount 7 times greater than the aqueous solution was eventually eluted, and thus an aqueous solution D-2 of polymer D was obtained. As a result of GPC analysis of the resulting aqueous solution D-2 of polymer D, the polymer D had a Mw of 180,000, a Mn of 140,000, and a content of the dimer and the trimer of less than 1 mass ppm based on the polymer D. The concentration of the resulting aqueous solution D-2 of polymer D was 5.0% by mass.

Synthesis Example 2

The amount of deionized water was changed to 3452.6 g, 107.4 g of aqueous solution D-2 of polymer D was added in place of 5.37 g of the polymer A, the pH was adjusted to 8.7 with ammonia water, 0.01 g of isopropyl alcohol was added, 2.4 g of HFP was added in place of 0.54 g of PMVE, 25.1 mg of ammonium persulfate (APS) and 537 mg of disuccinate peroxide (DSP) were added in place of 17.9 mg of ammonium persulfate (APS) initiator, polymerization was carried out in the same manner as Synthesis Example 1, supply of TFE was stopped when TFE was about 1,450 g, and PTE aqueous dispersion D was obtained in the same manner as Synthesis Example 1.

The solid content of the PTFE aqueous dispersion D was 29.1% by mass, the average primary particle size was 250 nm, and the aspect ratio was 1.61. The concentration of the polymer D contained in the PTFE aqueous dispersion D based on PTFE was 0.37% by mass.

Production Example 2

PTE powder was obtained in the same manner as in Production Example 1 using the PTFE aqueous dispersion D. The PTFE powder had an SSG of 2.201, an HFP content of 0.063% by mass, and a polymer D content of 0.37% by mass.

Example 3

The surfactant (b) was added to the PTE aqueous dispersion D in an amount of 15 parts by mass based on 100 parts by mass of PTE, and the mixture was maintained at 62° C. for 12 hours to separate into a supernatant phase and a condensed phase. The condensed phase was recovered to obtain a PTE aqueous dispersion 3.

In the PTFE aqueous dispersion 3, the solid concentration was 62.0% by mass, and the content of the surfactant (b) was 3.5% by mass based on PTFE.

The surfactant (b) was added to the PTFE aqueous dispersion 3 in an amount of 5.5% by mass based on PTFE, ammonium lauryl sulfate was further added in an amount of 1,000 mass ppm based on PTFE, and deionized water and ammonia water were further added to obtain a PTE aqueous dispersion 3-1.

In the PTFE aqueous dispersion 3-1, the solid concentration was 61.1% by mass, and the content of the surfactant (b) was 5.4% by mass based on PTFE.

The concentration of the polymer D based on the PTE aqueous dispersion 3-1 was 0.09% by mass. Further, the concentration of the polymer D based on the PTFE was 0.15% by mass.

A sample of PTFE aqueous dispersion 3-1 was weighed at about 5 g, 10 ml of methanol was added, the sample was flowed into a cylindrical filter paper, and Soxhlet extraction was carried out so that the total amount of methanol as an extraction solvent was 100 ml. The obtained extract was appropriately concentrated under nitrogen purge to obtain a concentrated extract. The resulting concentrated extract was subjected to LC/MS/MS measurements. The detection limit in the measurement was 0.5 mass ppb. All compounds represented by the following formulas and the monomer D were not detected.

$F(CF_2)_7COOM$, $F(CF_2)_5COOM$, $H(CF_2)_6COOM$, $CF_3O(CF_2)_3OCHFCF_2COOM$, $C_3F_7OCF(CF_3)CF_2OCF(CF_3)COOM$, $CF_3CF_2CF_2OCF(CF_3)COOM$, $CF_3CF_2OCF_2CF_2OCF_2COOM$, $C_2F_5OCF(CF_3)CF_2OCF(CF_3)COOM$, $CF_3OCF(CF_3)CF_2OCF(CF_3)COOM$, $CF_2ClCF_2CF_2OCF(CF_3)CF_2OCF_2COOM$, $CF_2ClCF_2CF_2OCF_2CF(CF_3)CF_2COOM$, $CF_2ClCF(CF3)OCF(CF3)CF2OCF2COOM$, and $CF_2ClCF(CF_3)OCF_2CF(CF_3)OCF_2COOM$,

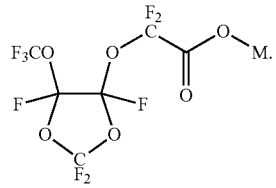

wherein M is H, a metal atom, $NR^7_4$, imidazolium optionally having a substituent, pyridinium optionally having a substituent, or phosphonium optionally having a substituent.

The viscosity of the PTFE aqueous dispersion 3-1 was 53.3 mPa·s, the stability retention time was 11.7 minutes, and the difference in solid concentration between the upper phase sample and the lower phase sample was 0.50% by mass.

Example 4

To the PTFE aqueous dispersion 3, deionized water was added in an amount of 239 parts by mass based on 100 parts by mass of PTFE, and the surfactant (b) was added to the PTFE aqueous dispersion 3 in an amount of 17 parts by mass based on 100 parts by mass of PTFE, and the mixture was maintained at 58° C. for 12 hours to separate into a supernatant phase and a condensed phase. The condensed phase was recovered to obtain a PTE aqueous dispersion 4.

The surfactant (b) was added to the obtained PTFE aqueous dispersion 4 in an amount of 5.5% by mass based on PTE, ammonium lauryl sulfate was further added in an amount of 2,000 ppm based on PTFE, and deionized water and ammonia water were further added to obtain a PTFE aqueous dispersion 4-1.

In the obtained PTE aqueous dispersion 4-1, the solid concentration was 60.3% by mass, and the content of the surfactant (b) was 5.5% by mass based on PTFE.

The concentration of the polymer D based on the PTFE aqueous dispersion 4-1 was 0.06% by mass. Further, the concentration of the polymer D based on the PTFE was 0.10% by mass.

The viscosity of the PTFE aqueous dispersion 4-1 was 36.1 mPa·s, the stability retention time was 10.8 minutes, and the difference in solid concentration between the upper phase sample and the lower phase sample was 0.67% by mass.

Preparation Example 2

10 g of a monomer E represented by $CF_2=CFOCF_2CF_2COOH$, 30 g of water, and ammonium persulfate (APS) (6.0 mol % of the monomer E) were added to a reactor, and heated and stirred at 80° C. for 23 hours under a nitrogen atmosphere to obtain an aqueous solution E-1 of polymer E containing polymer E which is a homopolymer of $CF_2=CFOCF_2CF_2COOH$. As a result of GPC analysis of the obtained aqueous solution E-1 of polymer E, the polymer E had a Mw of 7,000 and a Mn of 5,000. The ion exchange capacity of polymer E is 4.13 meq/g.

Water was added to the obtained aqueous solution E-1 of polymer E, the solution was brought into contact with a dialysis membrane (molecular weight cut-off of 35,000 Da, polyethylene) at 30° C., and filtration was carried out to obtain an aqueous solution E-2 of polymer E. As a result of GPC analysis of the resulting aqueous solution E-2 of polymer E, the polymer E had a Mw of 7,000, a Mn of 6,000, and a content of the dimer and the trimer of less than 1 ppm based on the polymer E. The concentration of the resulting aqueous solution E-2 of polymer E was 3.6% by mass.

Synthesis Example 3

To a reactor made of glass with an internal volume of 1 L and equipped with a stirrer, 515 g of deionized water, 30 g of paraffin wax, 15.28 g of aqueous solution E-2 of polymer E, and ammonia water were added and the pH was adjusted to 9.2. Next, the contents of the reactor were suctioned while being heated to 70° C., and, at the same time, the reactor was purged with TFE monomer to remove oxygen in the reactor. The contents were then stirred at 540 rpm. After 0.13 g of PMVE was added to the reactor, TFE monomer was added until the pressure was 0.73 MPaG.

Then, 2.75 mg of an ammonium persulfate (APS) initiator dissolved in 20 g of deionized water was added to the reactor such that the pressure of the reactor was 0.83 MPaG. After the initiator was added, the pressure dropped, and the initiation of polymerization was observed. TFE monomer was added to the reactor to maintain pressure and polymerization was continued until about 140 g of TFE monomer had reacted. Thereafter, the reactor was evacuated until the pressure in the reactor reached normal pressure, and the contents were taken out from the reactor and cooled. The supernatant paraffin wax was removed to obtain a PTFE aqueous dispersion E.

The solid content of the obtained PTFE aqueous dispersion E was 21.0% by mass, the average primary particle size was 216 nm, and the aspect ratio was 1.22. The concentration of the polymer E contained in the PTE aqueous dispersion E based on PTE was 0.35% by mass.

Production Example 3

PTFE powder was obtained in the same manner as in Production Example 1 using the obtained PTE aqueous dispersion E. The obtained PTFE powder had an SSG of 2.168, a PMVE modification amount of 0.072% by mass, and a polymer E content of 0.35% by mass.

Example 5

The surfactant (b) was added to the PTE aqueous dispersion E in an amount of 15 parts by mass based on 100 parts by mass of PTE, and the mixture was maintained at 62° C. for 12 hours to separate into a supernatant phase and a condensed phase. The condensed phase was recovered to obtain a PTFE aqueous dispersion 5. In the PTFE aqueous dispersion 5, the solid concentration was 63.2% by mass, and the content of the surfactant (b) was 2.9% by mass based on PTFE.

The surfactant (b) was added to the obtained PTFE aqueous dispersion 5 in an amount of 5.5% by mass based on PTE, ammonium lauryl sulfate was further added in an amount of 1,000 ppm based on PTFE, and deionized water and ammonia water were further added to obtain a PTFE aqueous dispersion 5-1.

In the obtained PTE aqueous dispersion 5-1, the solid concentration was 60.6% by mass, and the content of the surfactant (b) was 5.5% by mass based on PTFE.

The concentration of the polymer E based on the PTFE aqueous dispersion 5-1 was 0.08% by mass. Further, the concentration of the polymer E based on the PTFE was 0.13% by mass.

The viscosity of the PTFE aqueous dispersion 5-1 was 51.1 mPa·s, the stability retention time was 13.2 minutes, and the difference in solid concentration between the upper phase sample and the lower phase sample was 0.32% by mass.

What is claimed is:

1. A composition comprising:
  a polytetrafluoroethylene;
  a polymer (I) containing a polymerization unit (I) based on a monomer represented by the general formula (I);
  a nonionic surfactant; and
  an aqueous medium,
  wherein a content of the polytetrafluoroethylene in the composition is 10% by mass or more based on the composition,
  a content of the nonionic surfactant in the composition is 1.0% by mass or more based on the polytetrafluoroethylene, and
  a content of the polymerization unit (I) in the polymer (I) is 20 mol % or more based on all polymerization units, $$CX^1X^3=CX^2R(-CZ^1Z^2-A^0)_m \qquad (I)$$

wherein $X^1$ and $X^3$ are each independently F, Cl, H, or $CF_3$; $X^2$ is H, F, or $CF_3$; $A^0$ is an anionic group; R is a linking group; $Z^1$ and $Z^2$ are each independently F or $CF_3$; and m is 1.

2. The composition according to claim 1, wherein a stability retention time as measured by mechanical stability test of the composition is 1.0 minutes or more.

3. The composition according to claim 1, wherein a content of the polytetrafluoroethylene in the composition is 40% by mass or more based on the composition.

4. The composition according to claim 1, wherein the nonionic surfactant is represented by the general formula (i):

$$R^6-O-A^1-H \qquad (i)$$

wherein $R^6$ is a linear or branched primary or secondary alkyl group having 8 to 18 carbon atoms, and $A^1$ is a polyoxyalkylene chain.

5. The composition according to claim 1, which is substantially free from a fluorine-containing surfactant.

6. The composition according to claim 1, wherein the polymer (I) has a weight average molecular weight of $2.0 \times 10^4$ or more.

7. The composition according to claim 1, wherein the polymer (I) has a weight average molecular weight of $15.0 \times 10^4$ or more.

8. The composition according to claim 1, wherein the polymer (I) has an ion-exchange capacity of 1.75 meg/g or more.

9. The composition according to claim 1, wherein the polymer (I) has an ion-exchange capacity of 2.60 meg/g or more.

10. The composition according to claim 1, wherein the polymer (I) is water-soluble.

11. The composition according to claim 1, wherein A° in the general formula (I) is —$SO_3M$, —COOM, or —P(O)(OM)$_2$, wherein M is H, a metal atom, $NR^7_4$, imidazolium optionally having a substituent, pyridinium optionally having a substituent, or phosphonium optionally having a substituent, and $R^7$ is H or an organic group.

12. The composition according to claim 1, wherein the polytetrafluoroethylene is a modified polytetrafluoroethylene containing a tetrafluoroethylene unit and a modifying monomer unit.

13. The composition according to claim 12, wherein the modifying monomer is at least one selected from the group consisting of hexafluoropropylene, chlorotrifluoroethylene, vinylidene fluoride, fluoro (alkyl vinyl ether), (perfluoroalkyl) ethylene, ethylene, and a modifying monomer having a functional group capable of reacting by radical polymerization and a hydrophilic group.

* * * * *